US011560493B2

(12) United States Patent
Webster et al.

(10) Patent No.: US 11,560,493 B2
(45) Date of Patent: Jan. 24, 2023

(54) USE OF AMPHIPHILIC SURFACE MODIFYING ADDITIVES TO IMPROVE PERFORMANCE OF SILOXANE-POLYURETHANE FOULING-RELEASE COATINGS

(71) Applicant: NDSU RESEARCH FOUNDATION, Fargo, ND (US)

(72) Inventors: Dean C. Webster, Fargo, ND (US); Jackson Benda, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 0 days.

(21) Appl. No.: 16/376,144

(22) Filed: Apr. 5, 2019

(65) Prior Publication Data
US 2019/0309187 A1 Oct. 10, 2019

Related U.S. Application Data

(60) Provisional application No. 62/653,654, filed on Apr. 6, 2018.

(51) Int. Cl.
| | | |
|---|---|---|
| C09D 183/04 | (2006.01) |
| C09D 175/06 | (2006.01) |
| C09D 5/16 | (2006.01) |
| C08G 18/75 | (2006.01) |
| C08G 18/76 | (2006.01) |
| C08G 18/42 | (2006.01) |
| C08G 18/28 | (2006.01) |
| C08G 77/04 | (2006.01) |
| C08G 18/48 | (2006.01) |
| C08G 18/73 | (2006.01) |

(52) U.S. Cl.
CPC ......... *C09D 175/06* (2013.01); *C08G 18/289* (2013.01); *C08G 18/42* (2013.01); *C08G 18/48* (2013.01); *C08G 18/73* (2013.01); *C08G 18/757* (2013.01); *C08G 18/7692* (2013.01); *C08G 77/045* (2013.01); *C09D 5/1637* (2013.01); *C09D 5/1675* (2013.01)

(58) Field of Classification Search
CPC .... C08G 18/48; C08G 18/289; C08G 77/458; C08G 77/46; C09D 175/04; C09D 183/04
See application file for complete search history.

(56) References Cited

U.S. PATENT DOCUMENTS

| | | | | |
|---|---|---|---|---|
| 4,546,154 A * | 10/1985 | Robertson | ................ | B29C 33/64 |
| | | | | 264/328.6 |
| 6,685,952 B1 * | 2/2004 | Ma | ........................... | A61K 8/06 |
| | | | | 424/401 |
| 7,297,745 B2 * | 11/2007 | Amidaiji | .................. | C08K 3/36 |
| | | | | 524/588 |
| 7,799,434 B2 | 9/2010 | Webster et al. | | |
| 7,989,074 B2 * | 8/2011 | Webster | ................. | C08G 18/61 |
| | | | | 428/447 |
| 8,299,200 B2 * | 10/2012 | Webster | .............. | C08G 18/725 |
| | | | | 528/38 |
| 8,604,152 B2 | 12/2013 | Webster et al. | | |
| 8,629,210 B2 | 1/2014 | Webster et al. | | |
| 9,169,359 B2 | 10/2015 | Webster et al. | | |
| 9,938,432 B2 * | 4/2018 | Jaunky | .................... | C08L 63/00 |
| 10,647,878 B2 | 5/2020 | Webster et al. | | |
| 10,759,950 B2 | 9/2020 | Webster et al. | | |
| 2003/0069351 A1 * | 4/2003 | Kishihara | ............ | C09D 5/1675 |
| | | | | 524/588 |
| 2008/0213599 A1 * | 9/2008 | Webster | ............. | C08G 18/4277 |
| | | | | 428/423.1 |
| 2010/0003211 A1 * | 1/2010 | Sakamoto | ............ | C09D 183/04 |
| | | | | 424/78.09 |
| 2011/0182844 A1 * | 7/2011 | Wagner | .................. | A61Q 19/00 |
| | | | | 424/70.122 |
| 2012/0135244 A1 * | 5/2012 | Yuki | ..................... | C09D 5/1693 |
| | | | | 428/414 |
| 2013/0078460 A1 * | 3/2013 | Tasaka | ........................ | C09J 7/22 |
| | | | | 428/339 |
| 2014/0221549 A1 * | 8/2014 | Webster | ............... | C08G 77/458 |
| | | | | 525/450 |
| 2017/0247572 A1 * | 8/2017 | Jaunky | ................. | C09D 183/12 |

(Continued)

FOREIGN PATENT DOCUMENTS

| | | | |
|---|---|---|---|
| EP | 302467 | * | 5/2016 |
| JP | 63-043973 | * | 2/1988 |

OTHER PUBLICATIONS

English language abstract JP 63-043973 Feb. 1988.*

(Continued)

*Primary Examiner* — Margaret G Moore
(74) *Attorney, Agent, or Firm* — Raphael Bellum PLLC

(57) ABSTRACT

The invention relates to curable coating compositions containing at least one surface modifying amphiphilic additive; and at least one siloxane-polyurethane coating composition. The invention also relates to methods of making and using the curable coating compositions of the invention. The invention also relates to objects coated with the curable coating composition of the invention. The invention also relates to methods for reducing or preventing biofouling of a surface exposed to an aqueous environment comprising the steps of coating the surface with the curable coating composition of the invention to form a coated surface, and curing the coating composition on the coated surface. The invention also relates to a marine fouling-release coating containing the curable coating composition of the invention.

22 Claims, 55 Drawing Sheets

(56) References Cited

U.S. PATENT DOCUMENTS

| | | |
|---|---|---|
| 2021/0292573 A1 | 9/2021 | Webster et al. |
| 2021/0348021 A1 | 11/2021 | Webster et al. |
| 2022/0025209 A1 | 1/2022 | Webester et al. |
| 2022/0119651 A1 | 4/2022 | Webster et al. |
| 2022/0243091 A1 | 8/2022 | Webster et al. |

OTHER PUBLICATIONS

Andrade, J. D. et al. Surface characterization of poly (hydroxyethyl methacrylate) and related polymers. I. Contact angle methods in water. 1: Wiley Online Library, 1979. p. 313-336.

Bodkhe, R. B. et al. The Effect of Formulation Variables on Fouling-Release Performance of Stratified Siloxane-Polyurethane Coatings. Journal of Coatings Technology Research, v. 9, n. 3, p. 235, 2012.

Callow, J. A.; Callow, M. E. Trends in the development of environmentally friendly fouling-resistant marine coatings. Nature Communications, v. 2, p. 244, 03/22/online 2011. Available at: < http://dx.doi.org/10.1038/ncomms1251 >.

Callow, M. E.; Callow, J. A. Marine Biofouling: A Sticky Problem. Biologist, v. 49, n. 1, p. 10, 2002.

Callow, M. E. et al. Biofouling Methods. 2014. 291.

Casse, F. et al. Laboratory Screening of Coating Libraries for Algal Adhesion. Biofouling, v. 23, n. 4, p. 267, 2007.

Casse, F. et al. Combinatorial materials research applied to the development of new surface coatings V. Application of a spinning water-jet for the semi-high throughput assessment of the attachment strength of marine fouling algae. Biofouling, v. 23, n. 2, p. 121-130, 2007. ISSN 0892-7014.

Ekin, A.; Webster, D. C. Combinatorial and High-Throughput Screening of the Effect of Siloxane Composition on the Surface Properties of Crosslinked Siloxane-Polyurethane Coatings. J. Comb. Chem., v. 9, n. 1, p. 178, 2007.

Yebra, D. M.; Kiil, S. K.; Dam-Johansen, K. Antifouling Technology—Past, Present and Future Steps Towards Efficient and Environmentally Friendly Antifouling Coatings. Prog. Org. Coat., v. 50, n. 2, p. 75, 2004.

Krishnan, S. et al. Comparison of the Fouling Release Properties of Hydrophobic Fluorinated and Hydrophilic Pegylated Block Copolymer Surfaces: Attachment Strength of the Diatom Navicula and the Green Alga Ulva. Biomacromolecules, v. 7, n. 5, p. 1449, 2006.

Lejars, M. N.; Margaillan, A.; Bressy, C. Fouling release coatings: a nontoxic alternative to biocidal antifouling coatings. Chemical reviews, v. 112, n. 8, p. 4347-4390, 2012. ISSN 0009-2665.

Majumdar, P.; Ekin, A.; Webster, D. C. Thermoset Siloxane—Urethane Fouling Release Coatings. In: (Ed.): ACS Publications, 2007. ISBN 1947-5918.

Martinelli, E. et al. Amphiphilic modified-styrene copolymer films: Antifouling/fouling release properties against the green alga Ulva linza. Progress in Organic Coatings, v. 90, p. 235-242, 2016/Jan. 1, 2016. ISSN 0300-9440. Available at <http://www.sciencedirect.com/science/article/pii/S030094401530182X >.

Rufin, M. A. et al. Antifouling silicones based on surface-modifying additive amphiphiles. Green Materials, v. 5, n. 1, 3. p. 4-13, 2017 ISSN 2049-1220.

Schultz, M. P. et al. Economic Impact of Biofouling on a Naval Surface Ship. Biofouling, v. 27, n. 1, p. 87, 2011.

Sommer, S. et al. A Preliminary Study on the Properties and Fouling-Release Performance of Siloxane-Polyurethane Coatings Prepared from Pdms Macromers. Biofouling, v. 26, n. 8, p. 961, 2010.

Stafslien, S. J. et al. An Improved Laboratory Reattachment Method for the Rapid Assessment of Adult Barnacle Adhesion Strength to Fouling-Release Marine Coatings. Journal of Coatings Technology and Research, v. 9, n. 6, p. 651, 2012.

Stafslien, S. J. et al. Combinatorial materials research applied to the development of new surface coatings VI: An automated spinning waterjet apparatus for the high-throughput characterization of fouling-release marine coatings. Review of Scientific Instruments, v. 78, n. 7, p. 072204, 2007. ISSN 0034-6748.

Pieper, R. J. et al. "A Combinatorial Approach to Study the Effect of Acrylic Polyol Composition on the Properties of Crosslinked Siloxane-Polyurethane Fouling-Release Coatings," J Coatings Tech. & Res., 4(4), 453-461 (2007).

* cited by examiner

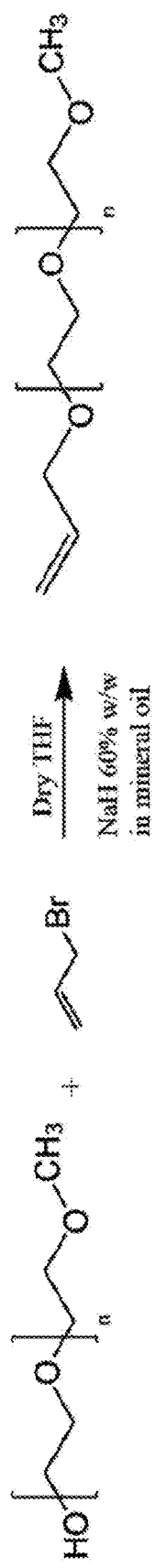
FIG. 1: General reaction scheme for the synthesis of allyl terminated polyethylene glycol monomethyl ether

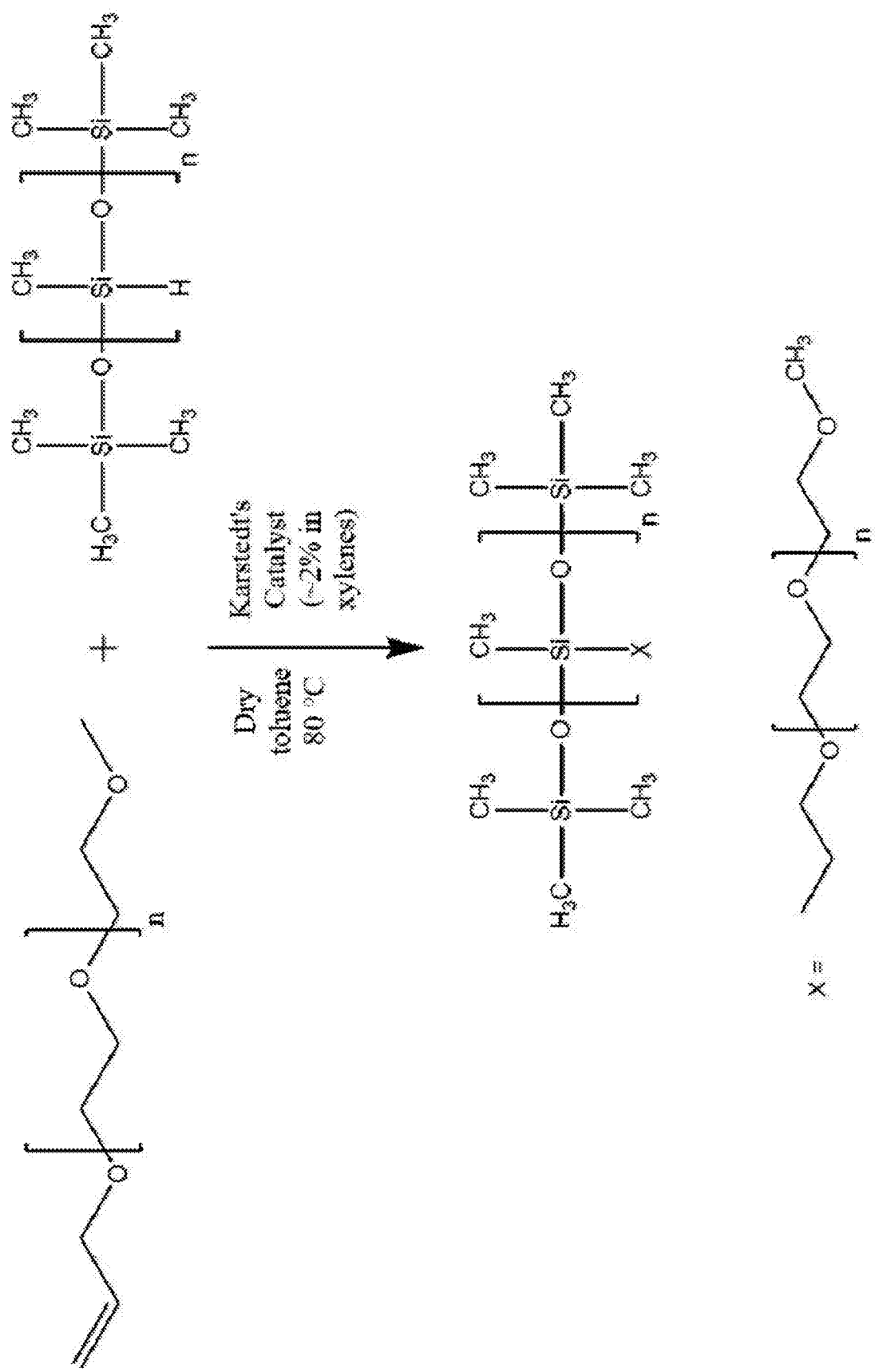
FIG. 2: General reaction scheme for SMAA's synthesis

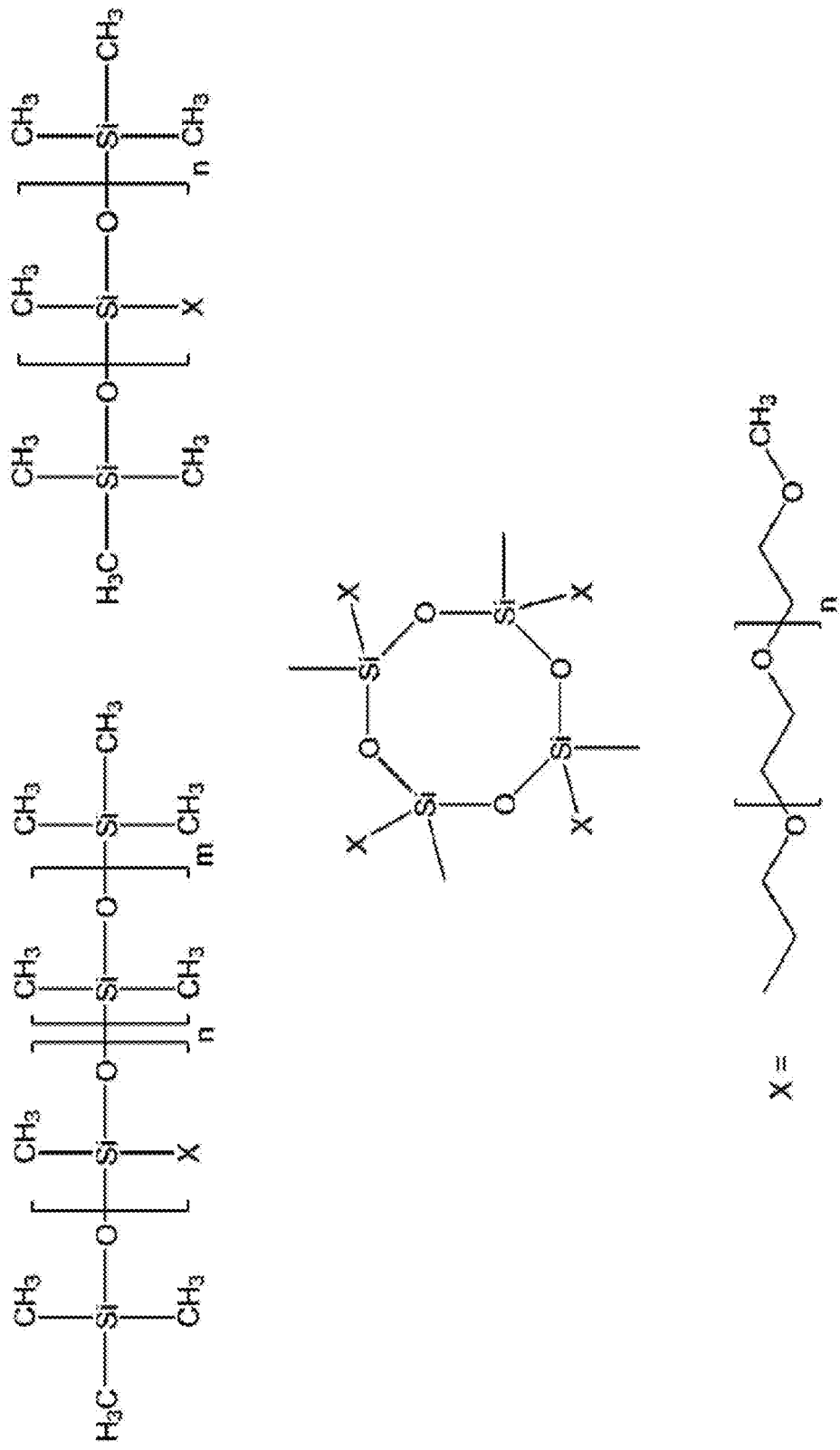
FIG. 3: Top (left to right): copolymer of methylhydro-dimethyl functional siloxane, polymethylhydrosiloxanes. Bottom: D'4 hydride functional cyclosiloxane, X=grafted PEG

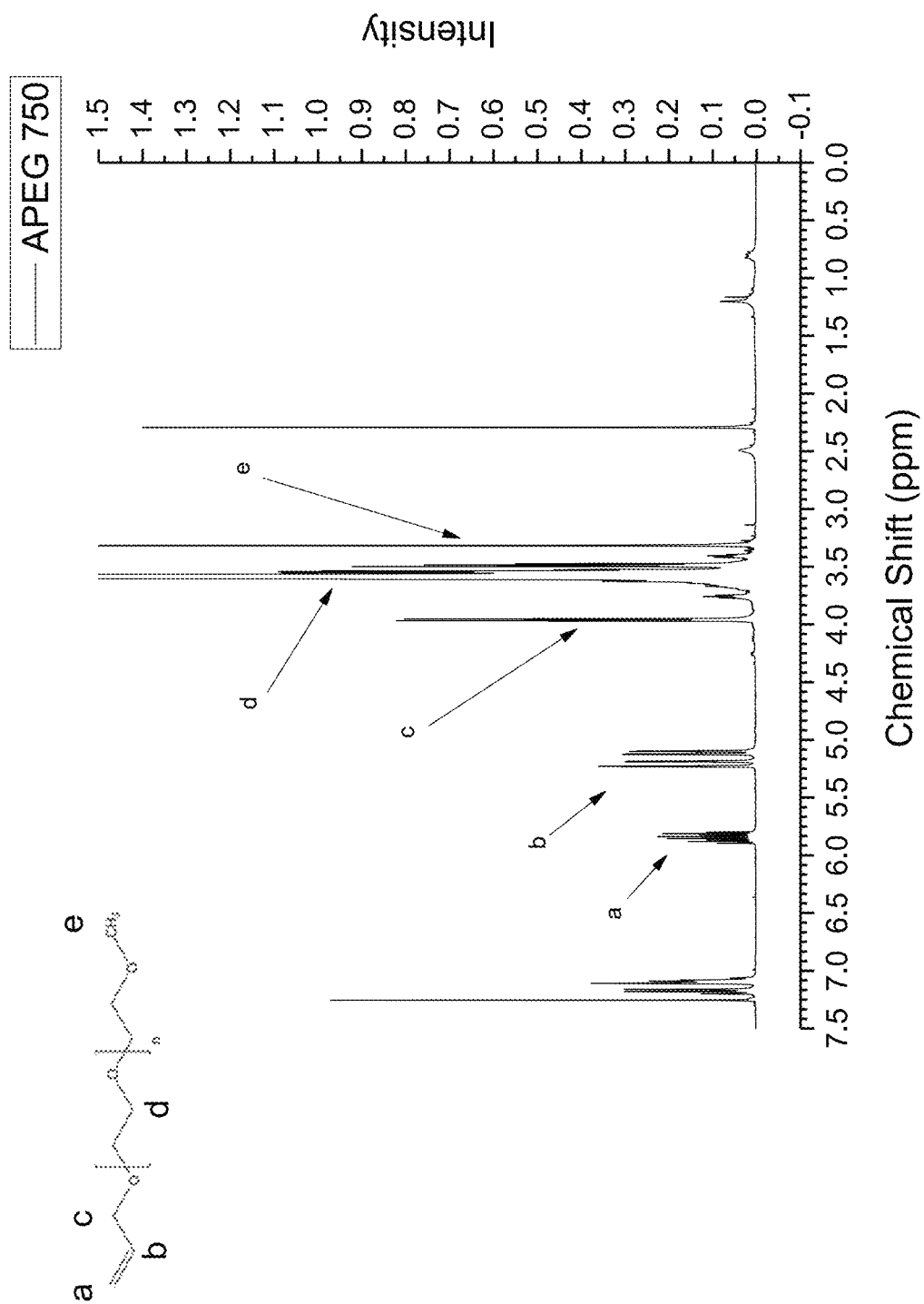
FIG. 4: ¹H-NMR spectrum of APEG 750 with peak assignments

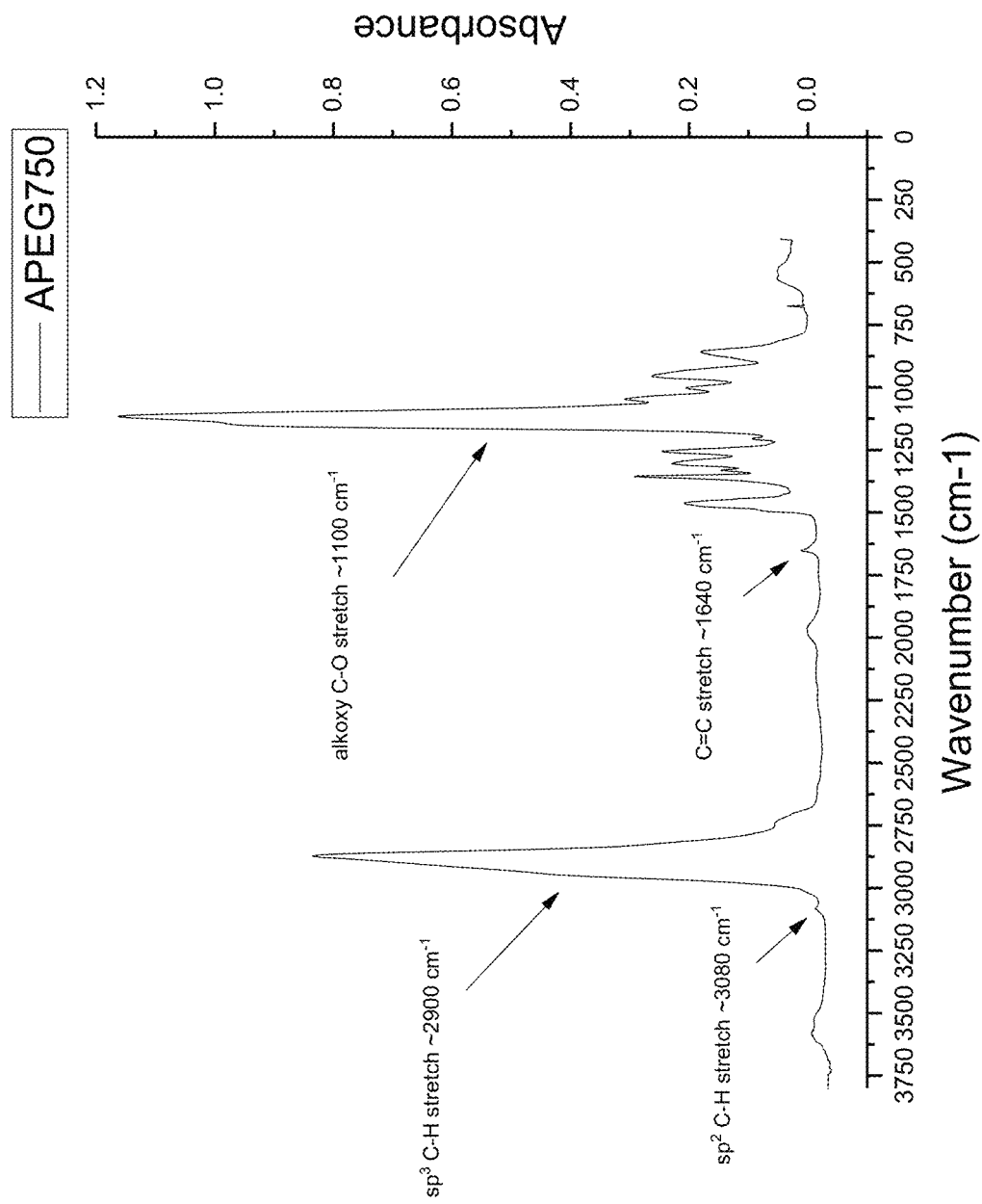
FIG. 5: FT-IR spectrum of APEG 750

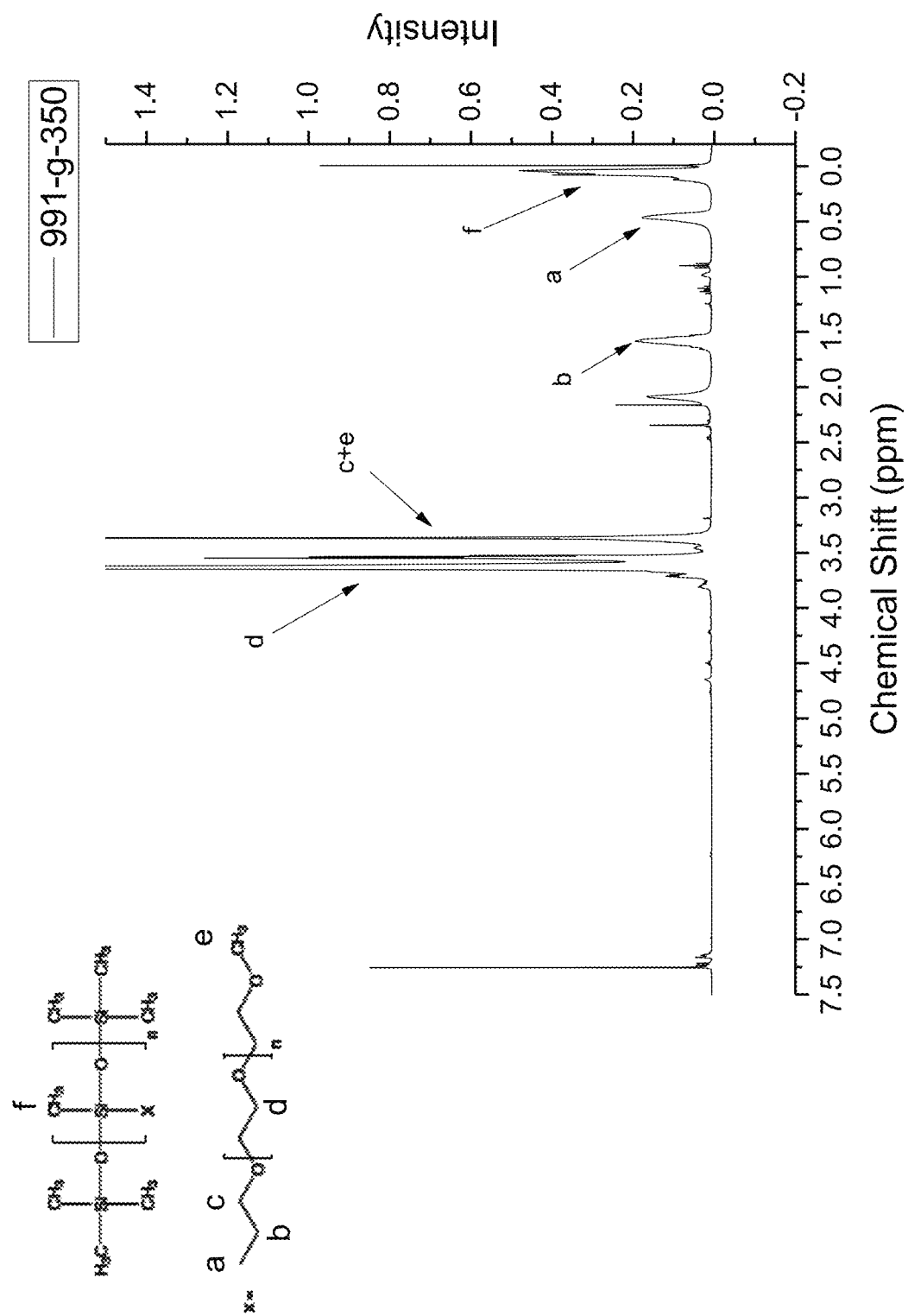
FIG. 6: ¹H-NMR spectrum for the SMAA 991-g-350

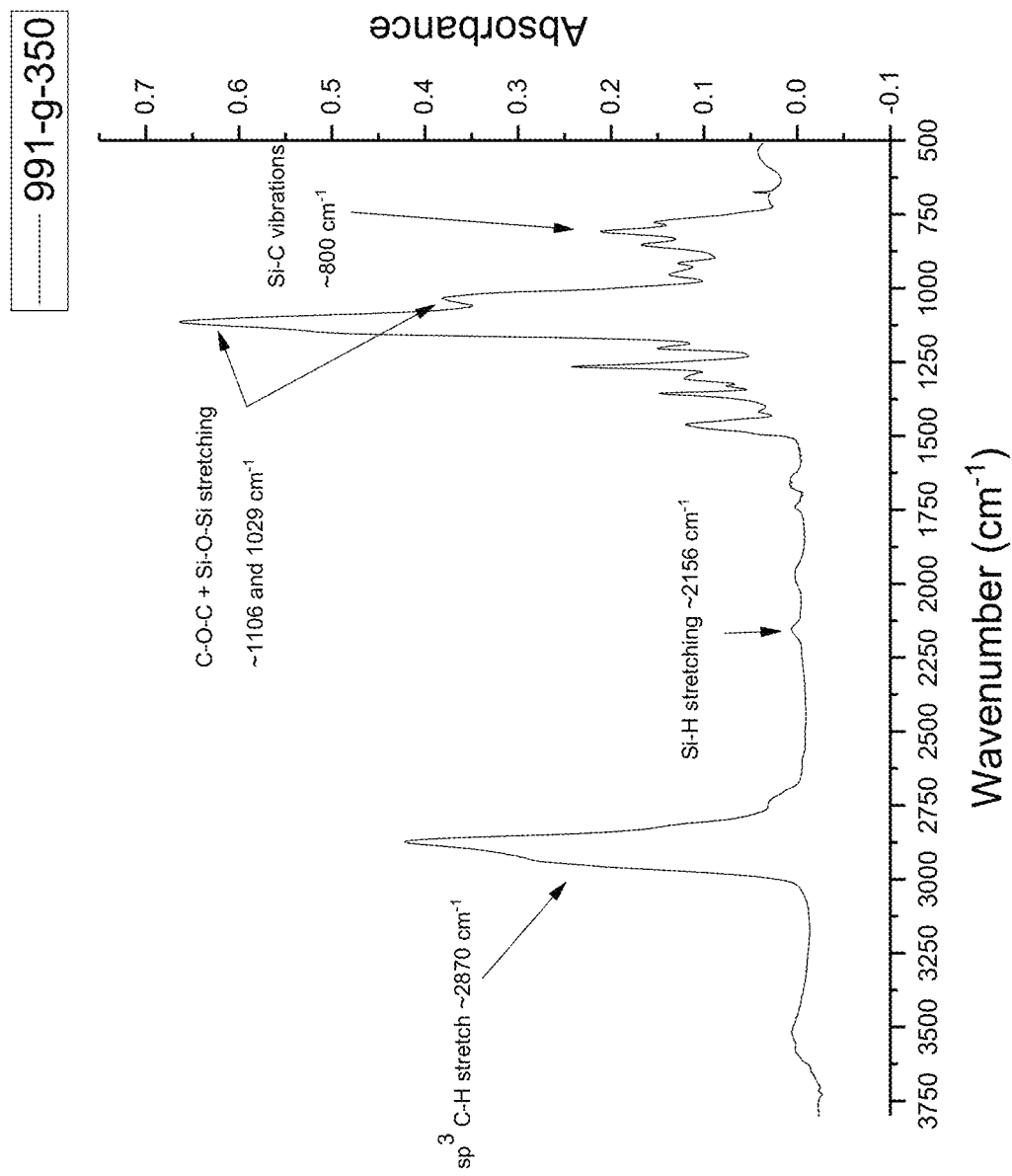
FIG. 7: FT-IR spectrum for the SMAA 991-g-350

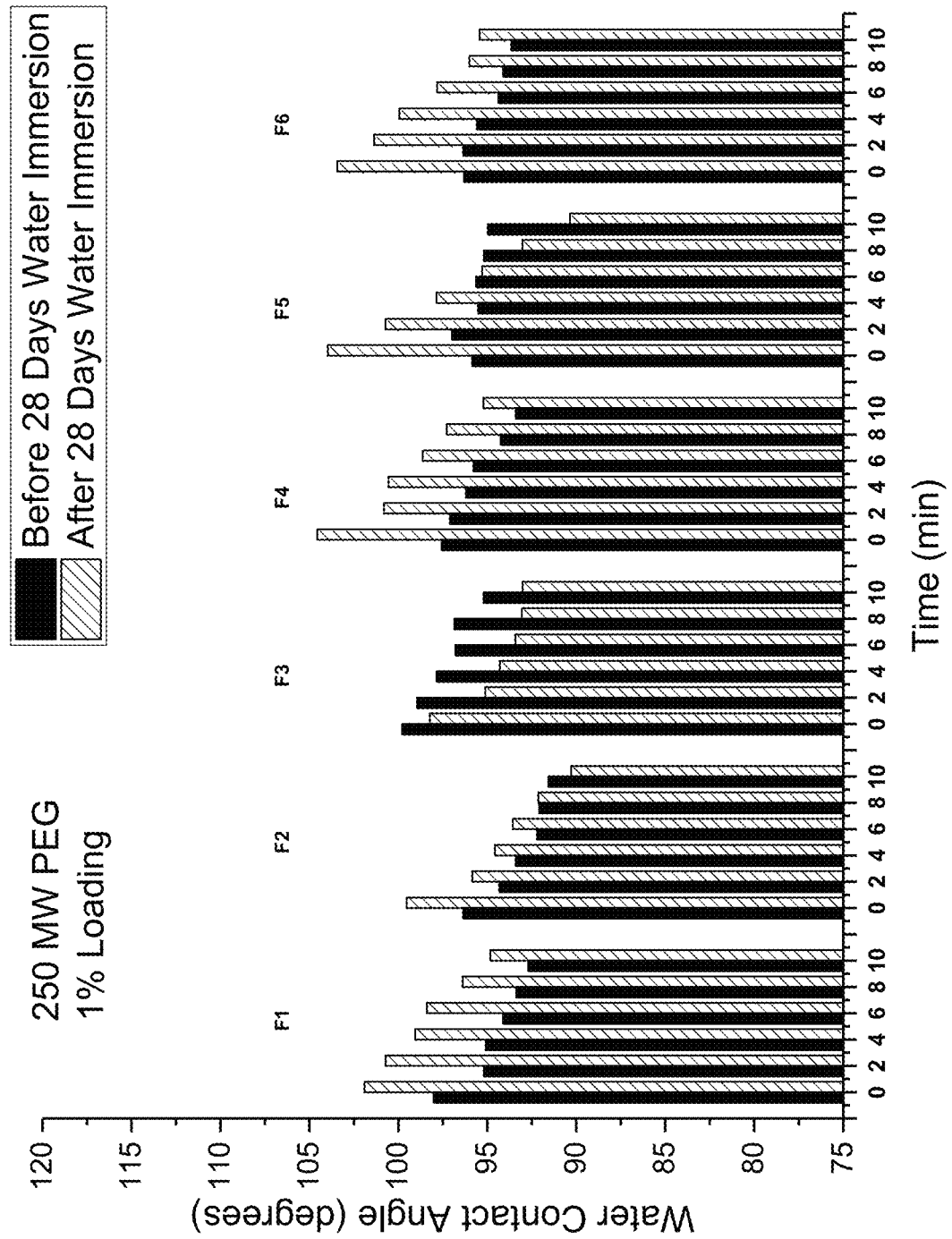
FIG. 8: Water contact angles for PMHS-g-PEG250 1%

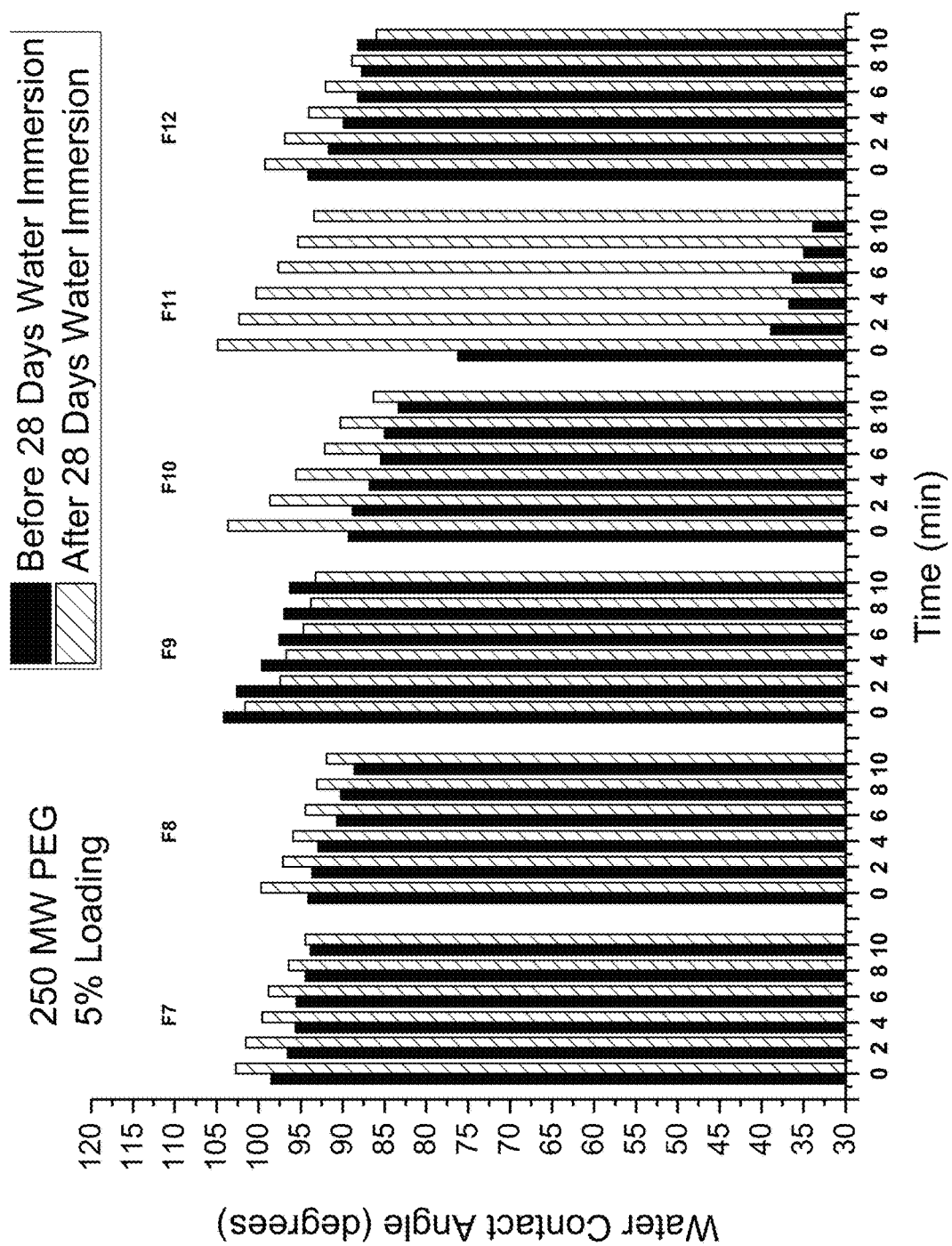
FIG. 9: Water contact angles for PMHS-g-PEG250 5%

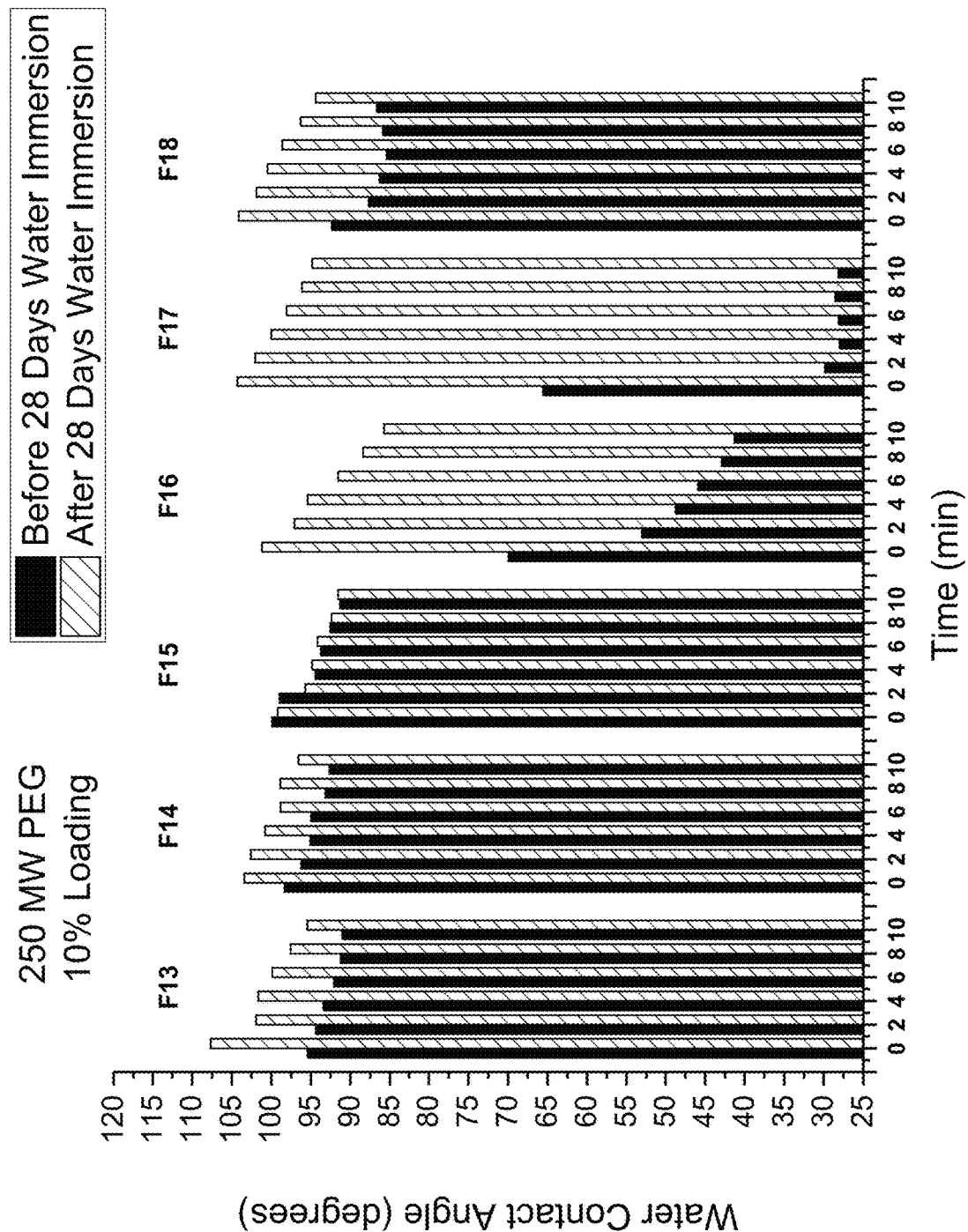
FIG. 10: Water contact angles for PMHS-g-PEG250 10%

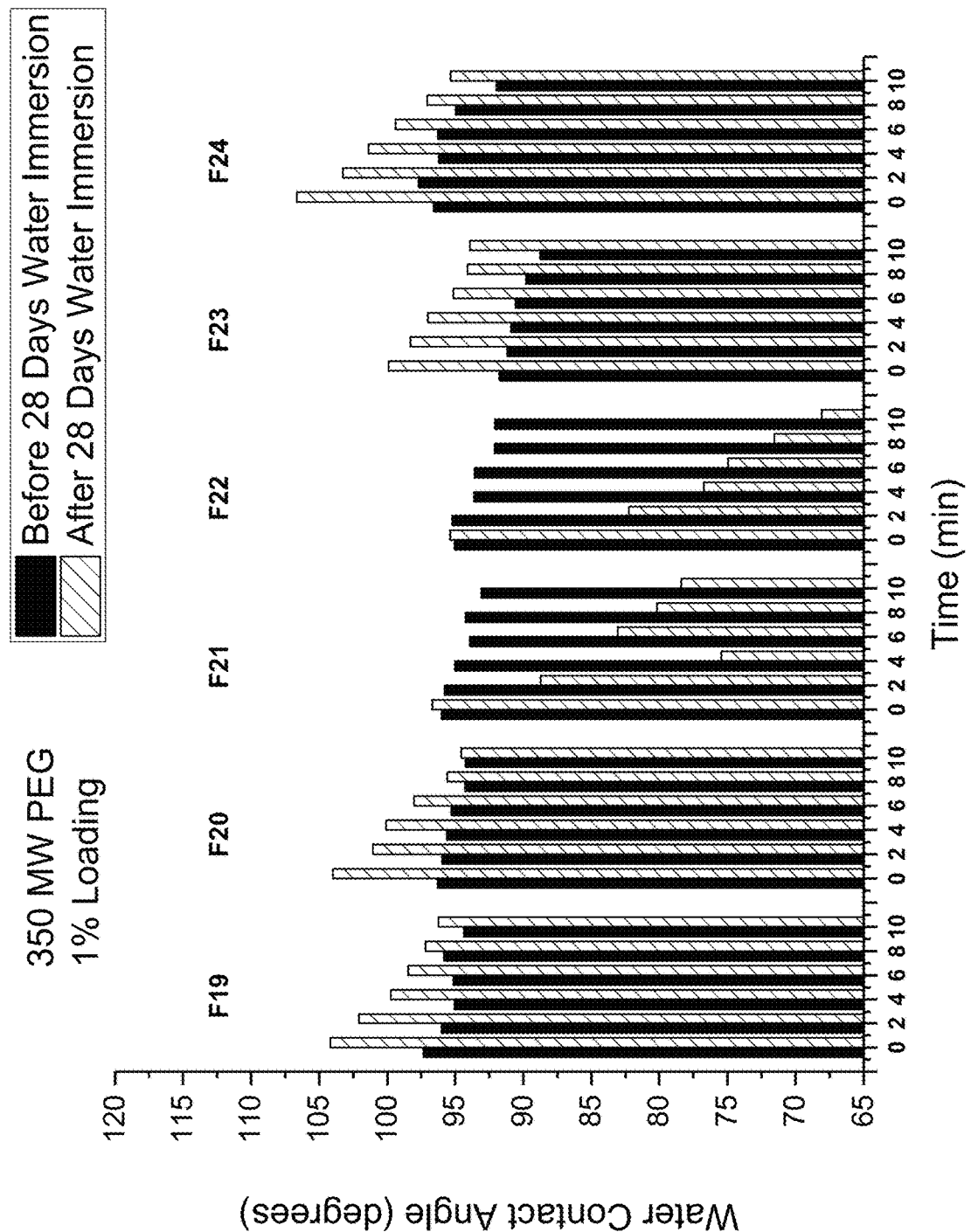
FIG. 11: Water contact angles for PMHS-g-PEG350 1%

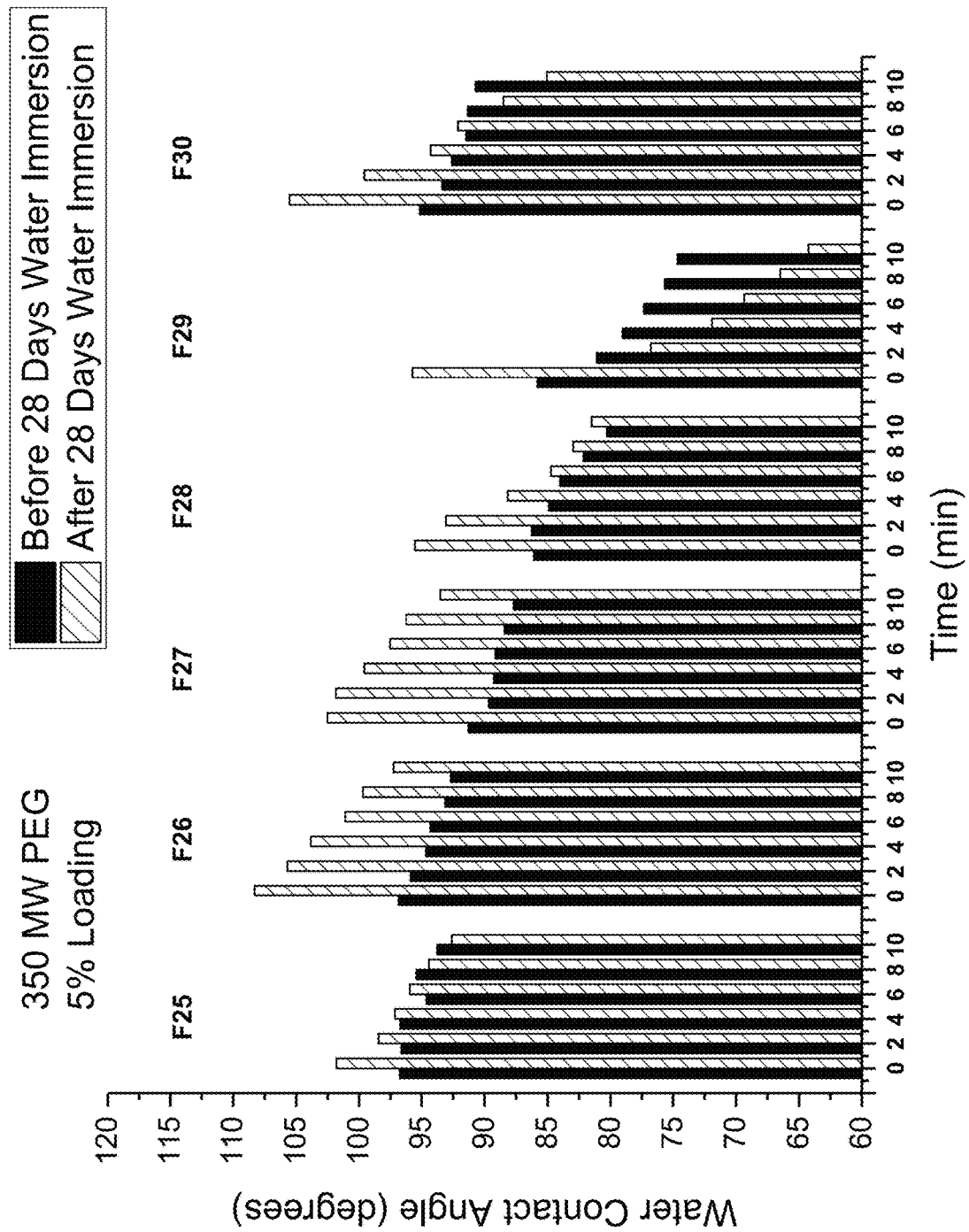
FIG. 12: Water contact angles for PMHS-g-PEG350 5%

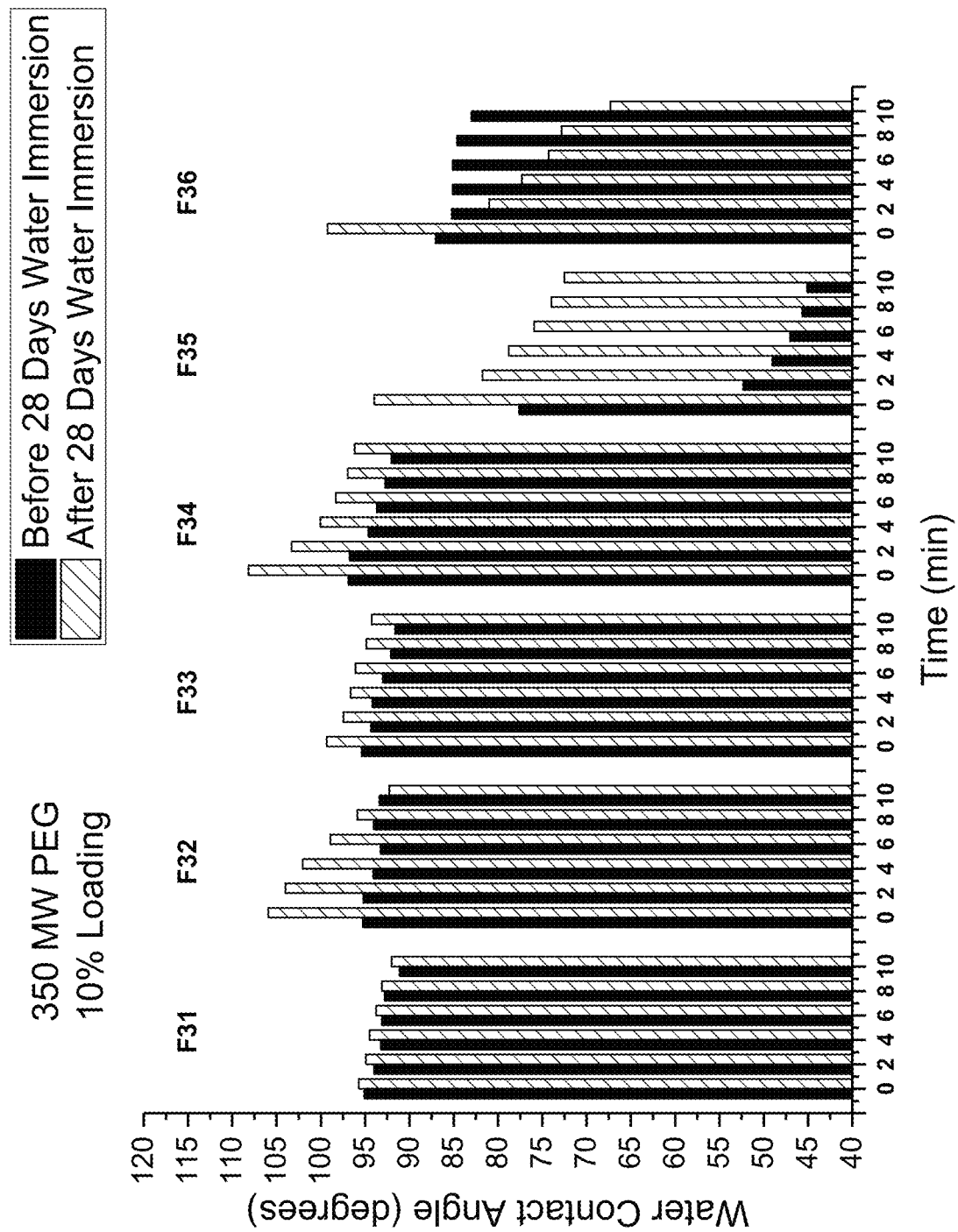
FIG. 13: Water contact angles for PMHS-g-PEG350 10%

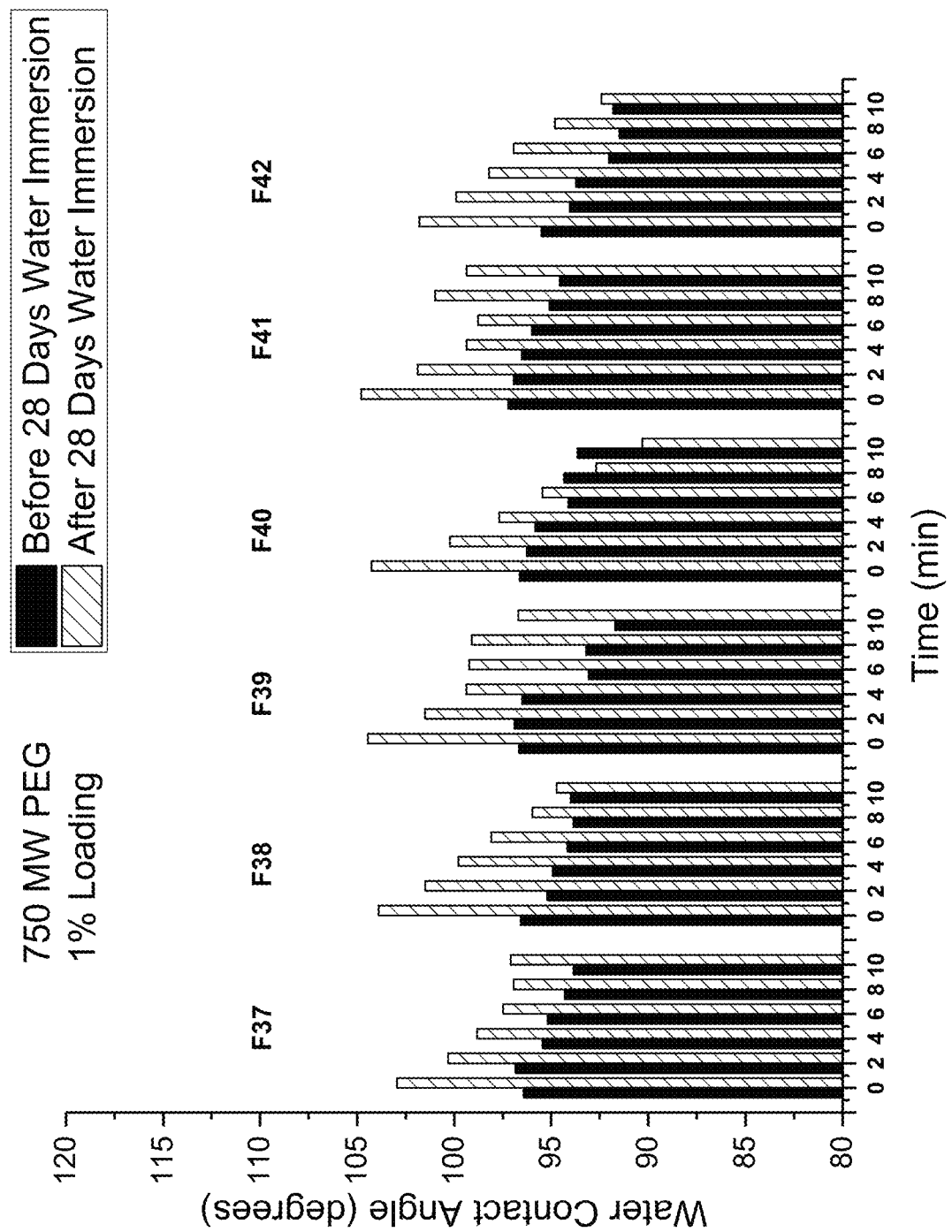
FIG. 14: Water contact angles for PMHS-g-PEG750 1%

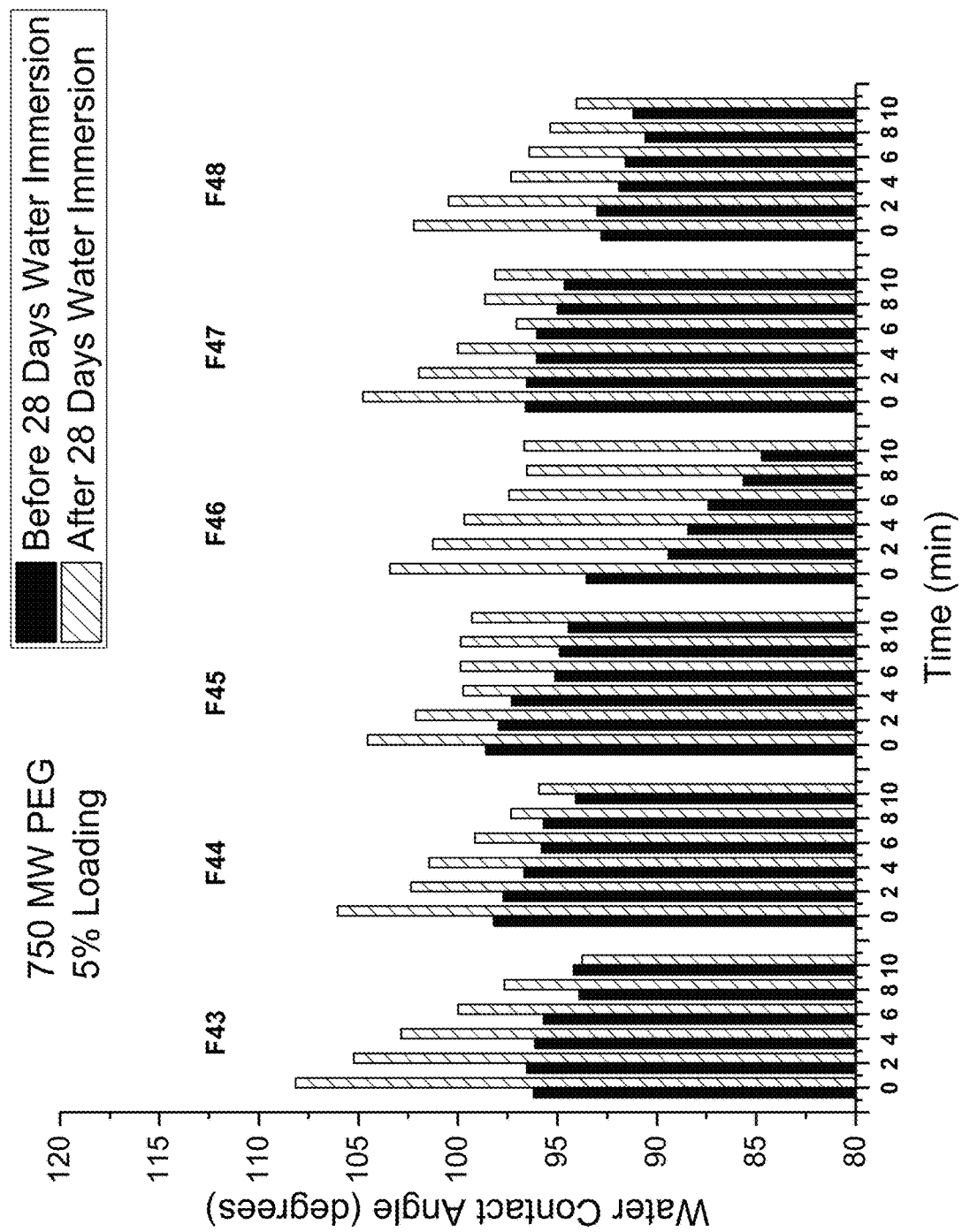
FIG. 15: Water contact angles for PMHS-g-PEG750 5%

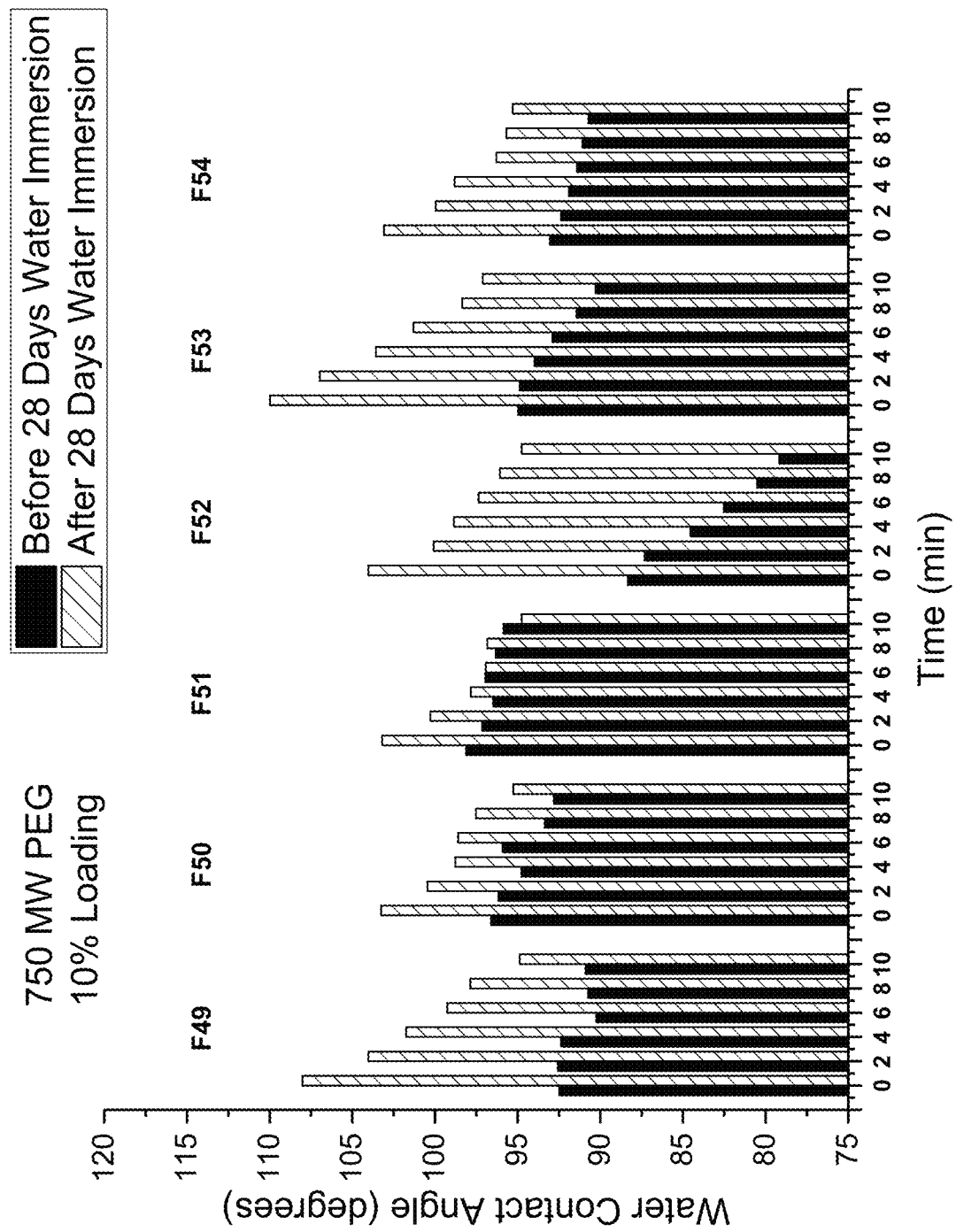
FIG. 16: Water contact angles for PMHS-g-PEG750 10%

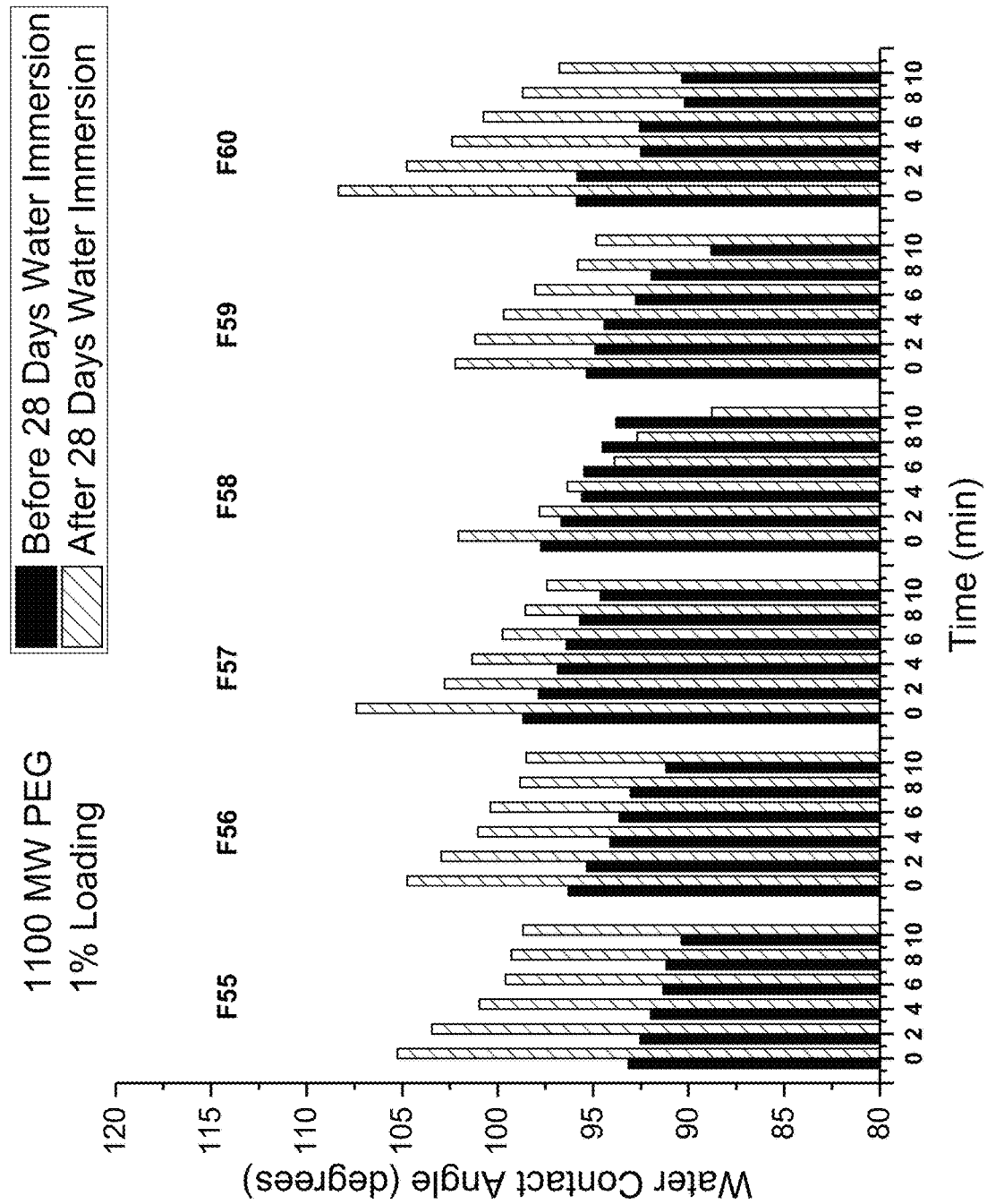
FIG. 17: Water contact angles for PMHS-g-PEG1100 1%

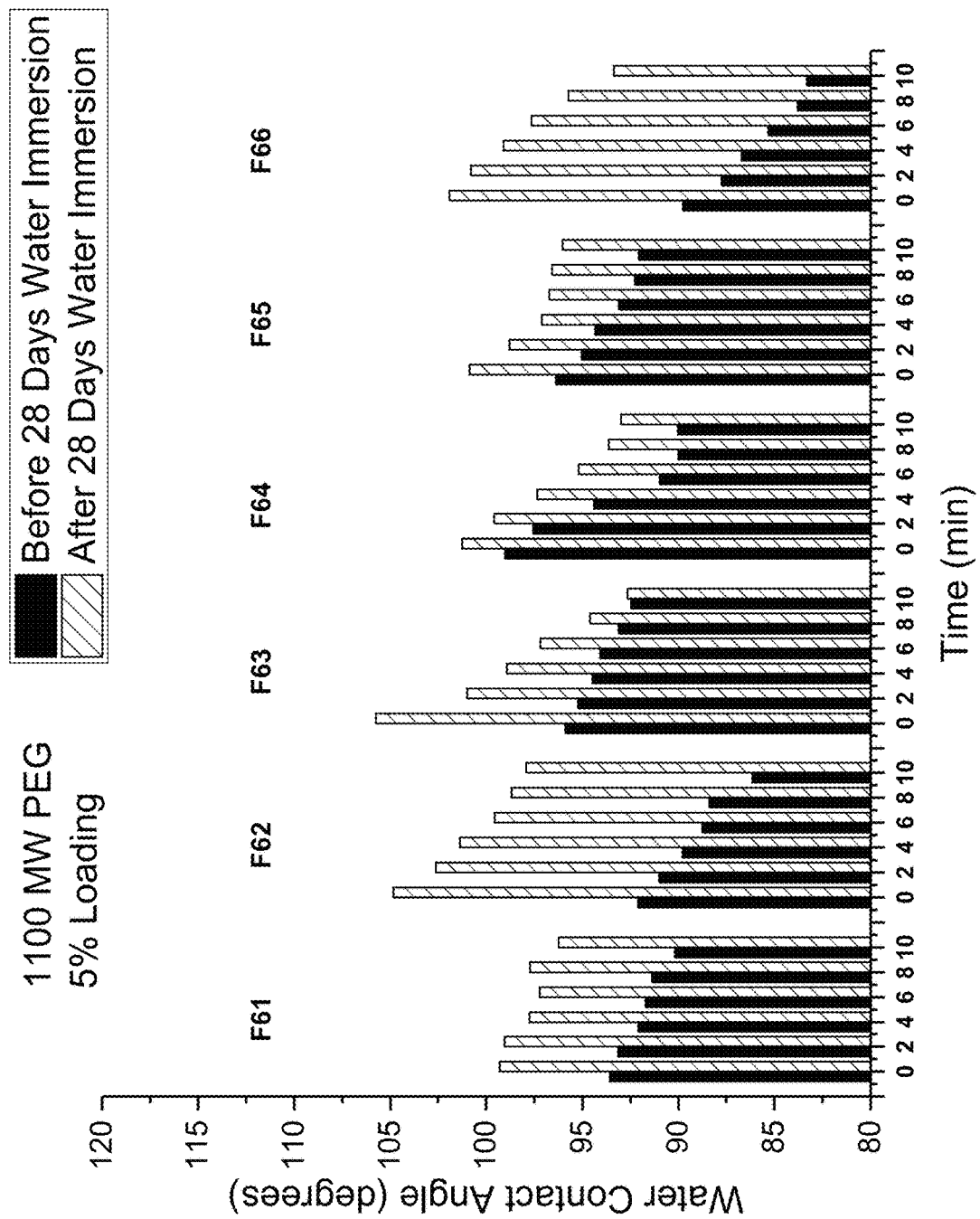
FIG. 18: Water contact angles for PMHS-g-PEG1100 5%

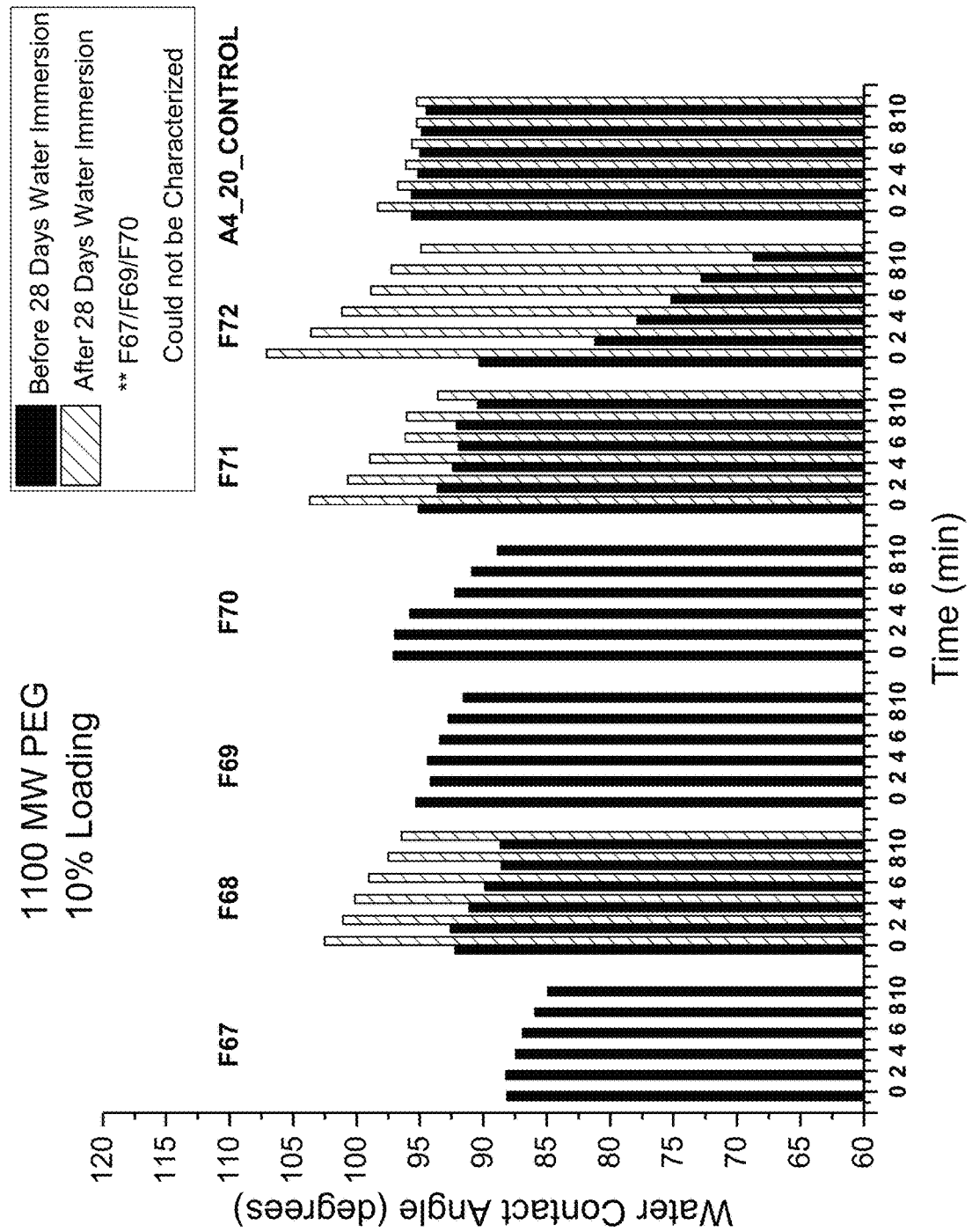
FIG. 19: Water contact angles for PMHS-g-PEG1100 5% and A4_20 SiPU control

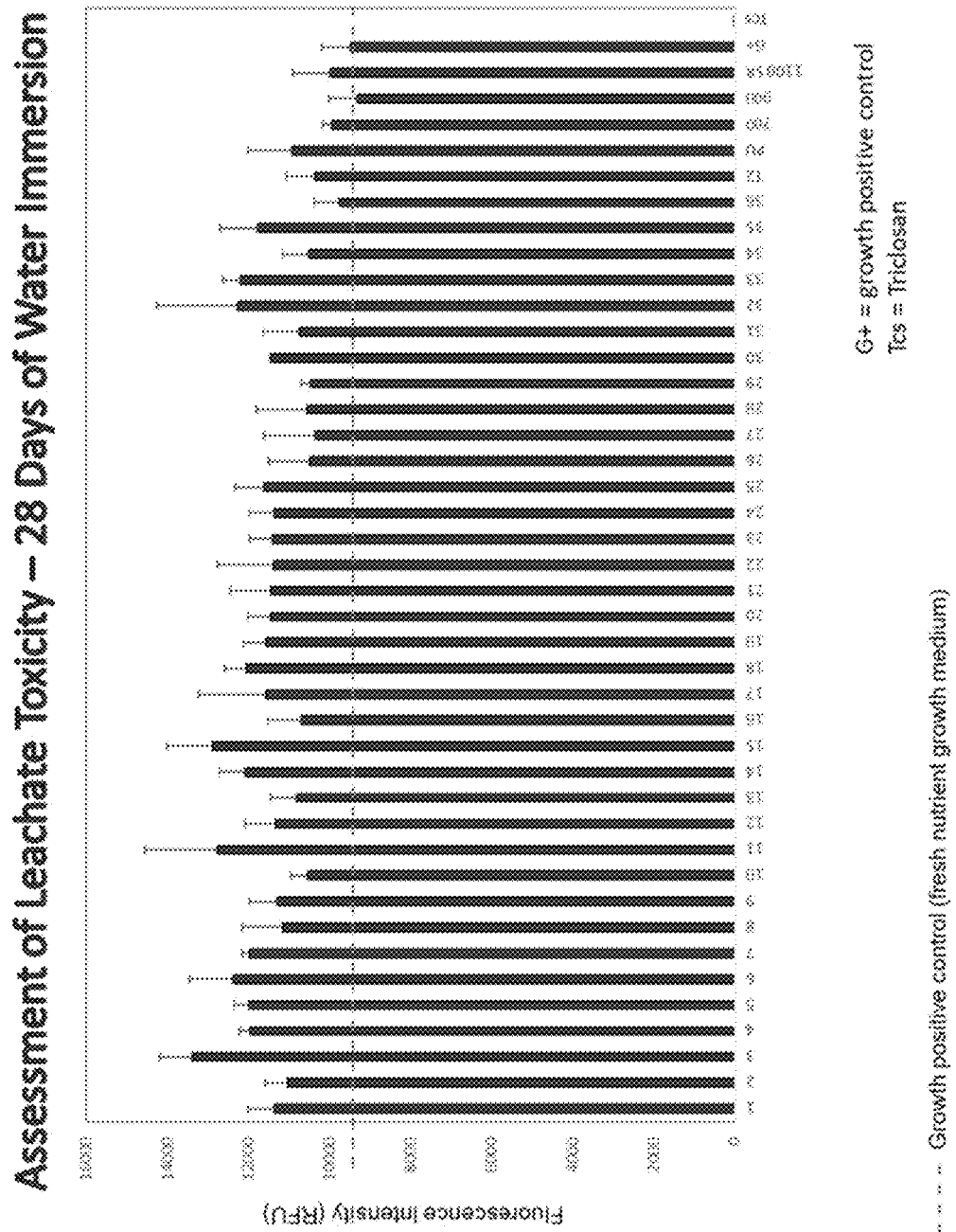
FIG. 20: Leachate toxicity for *N. incerta* on coatings formulations 1-36 from Table 3

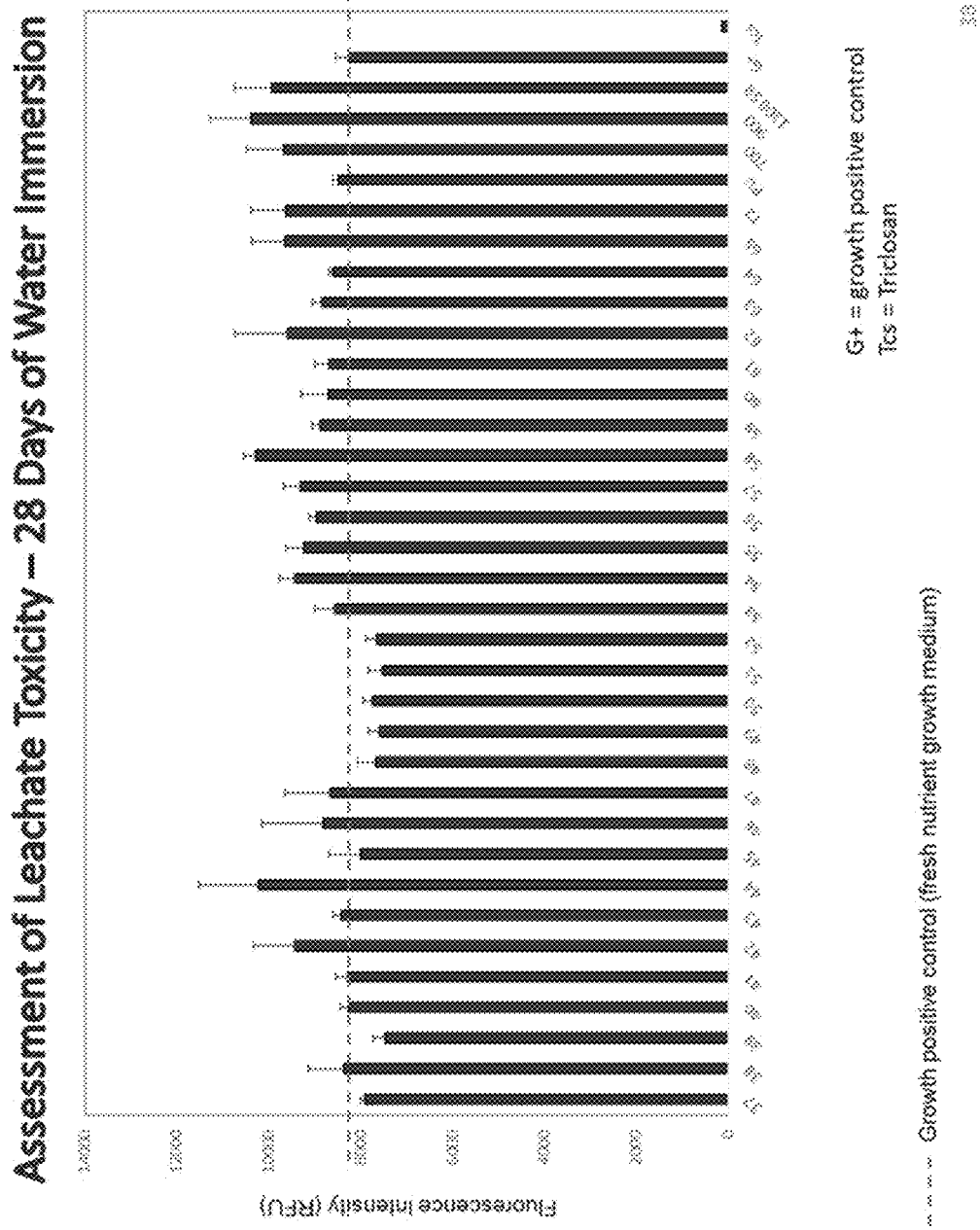
FIG. 21: Leachate toxicity for *N. incerta* on coatings formulations 37-65 from Table 3

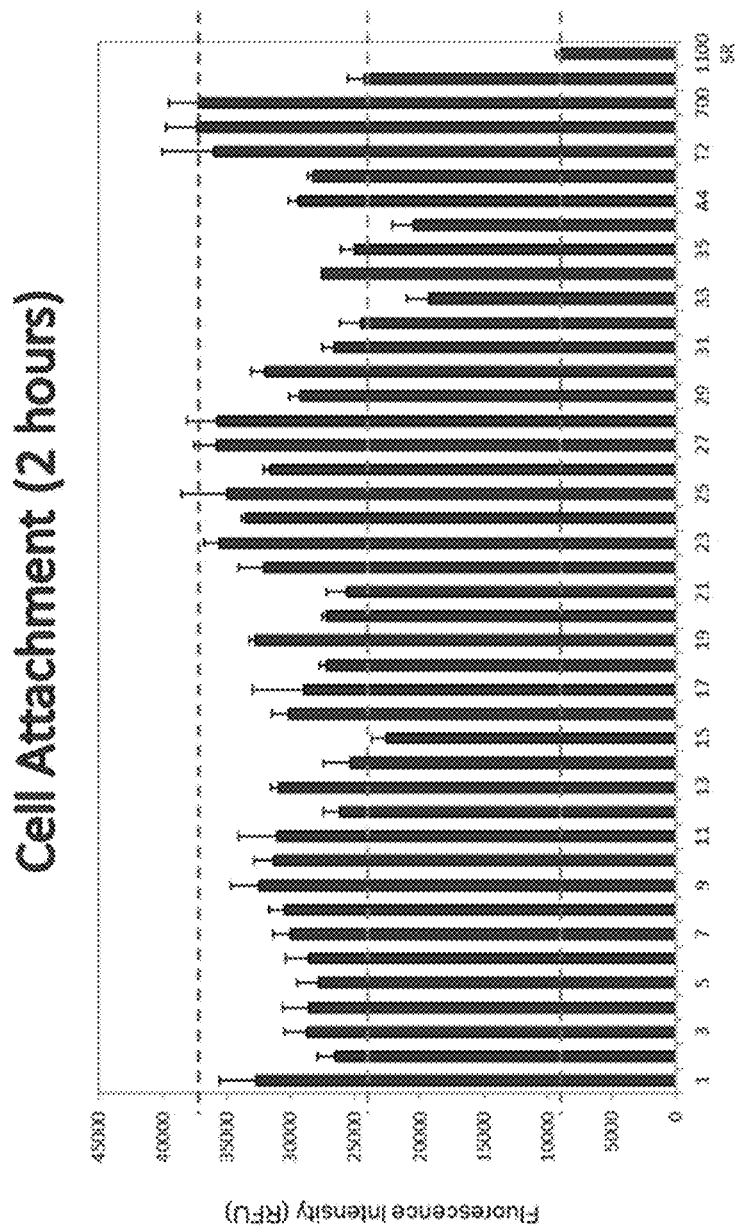
FIG. 22: Attachment of N. incerta cells on the coatings after two hours of settlement time for coatings formulations 1-36 from Table 3

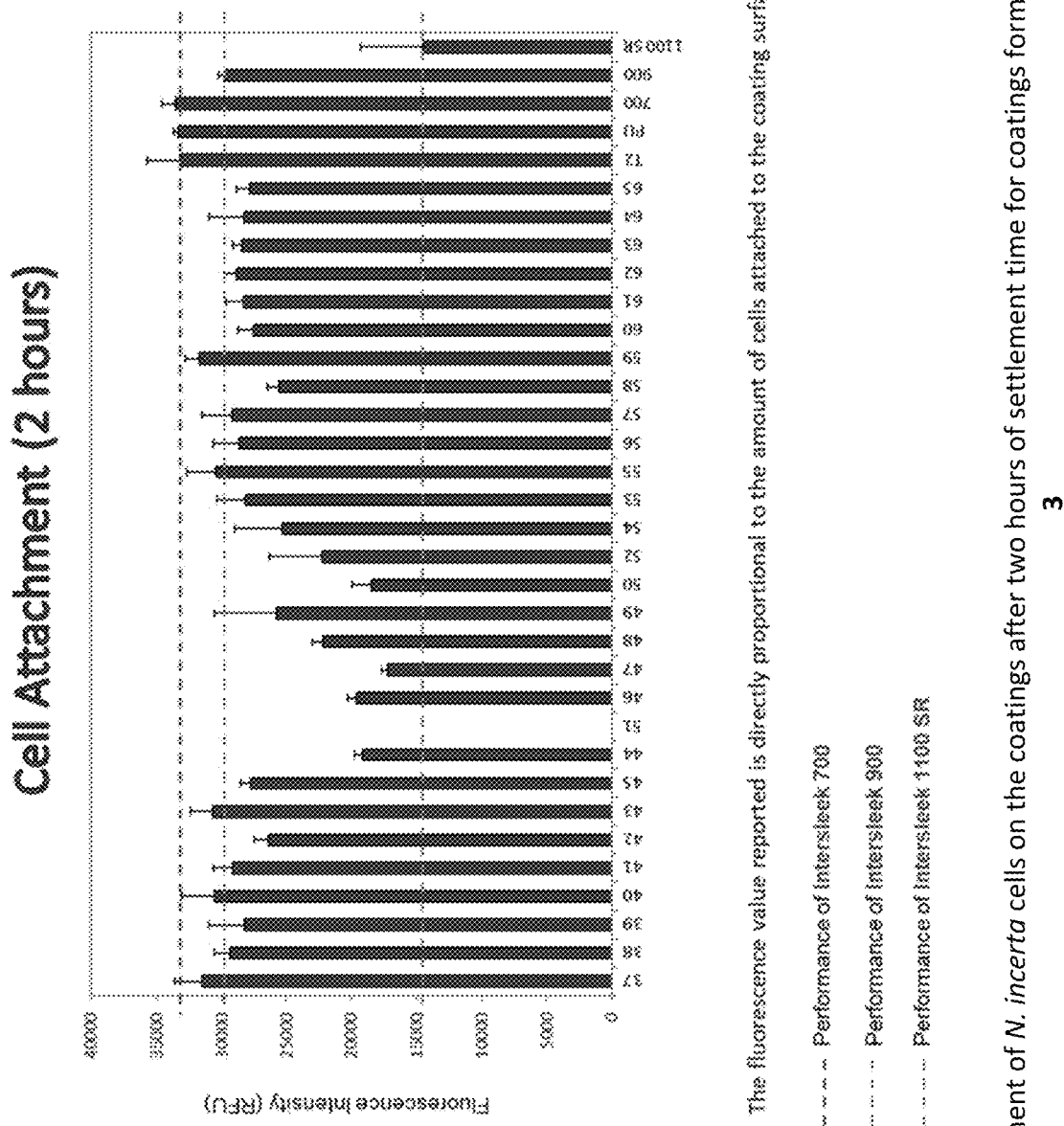
FIG. 23: Attachment of *N. incerta* cells on the coatings after two hours of settlement time for coatings formulations 37-65 from Table 3

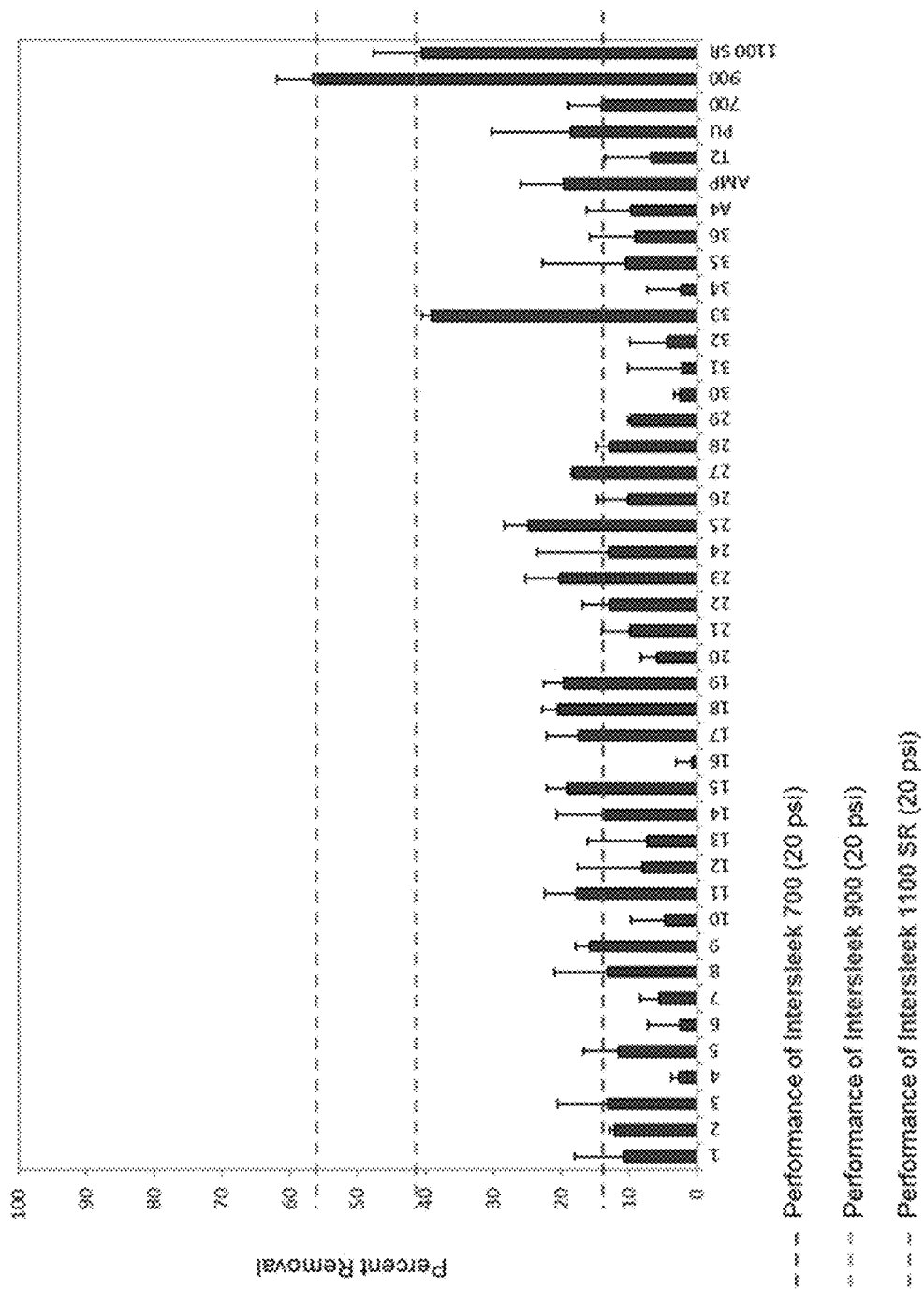
FIG. 24: Percent removal of *N. incerta* cells after water-jetting at 10 psi for coatings formulations

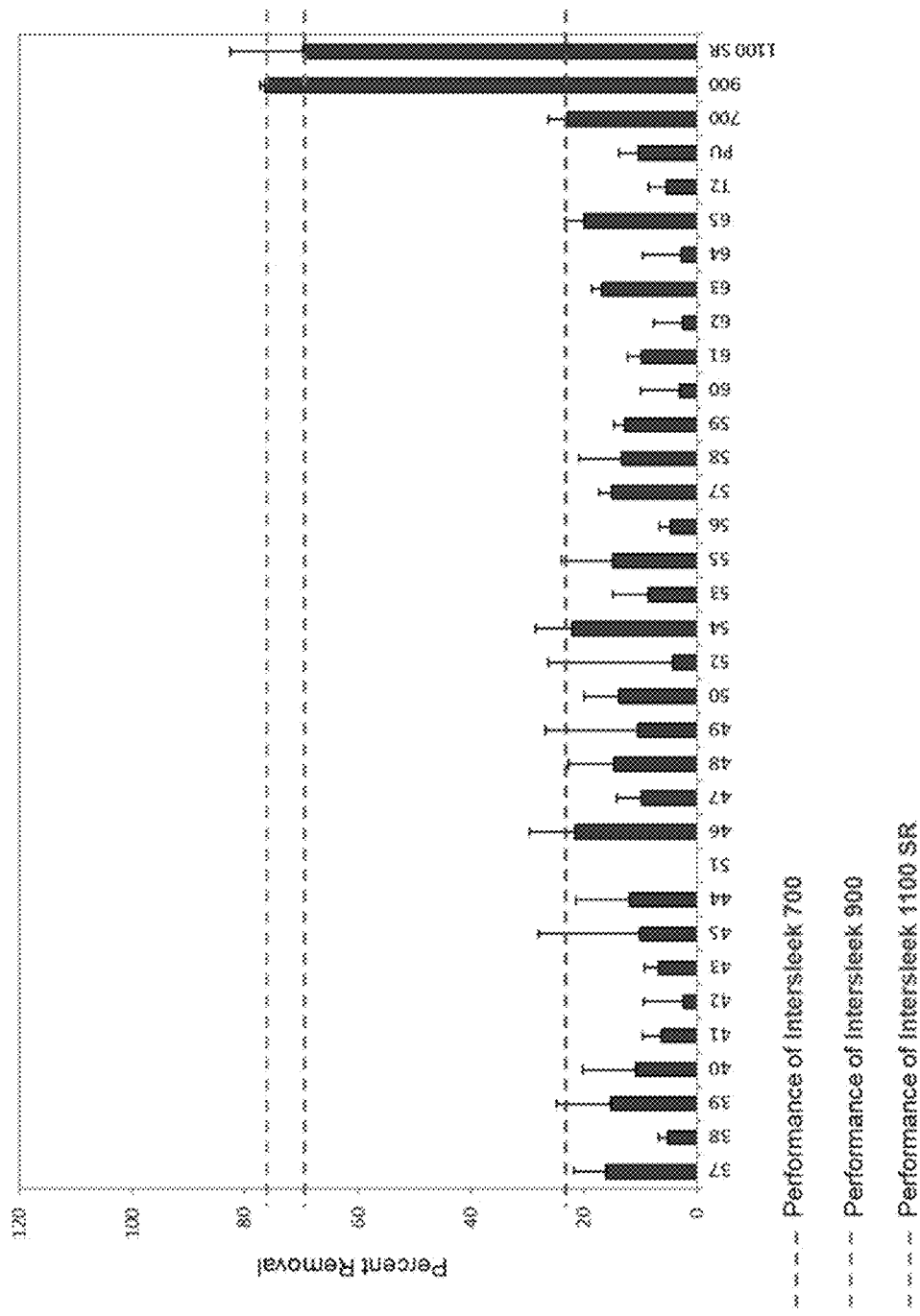
FIG. 25: Percent removal of *N. incerta* cells after water-jetting at 10 psi for coatings formulations 37

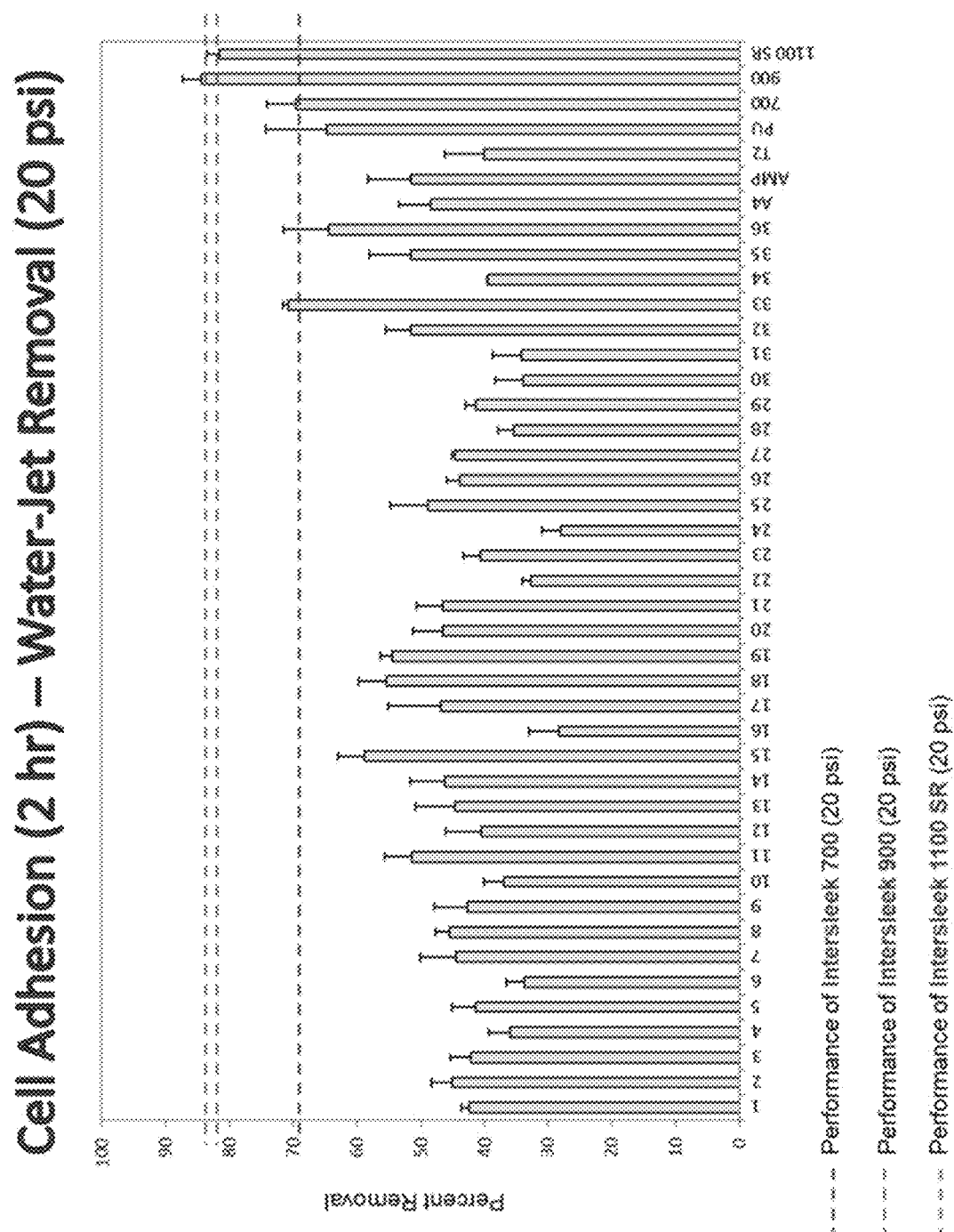
FIG. 26: Percent removal of *N. incerta* cells after water-jetting at 20 psi for coatings formulations 1-36 from Table 3

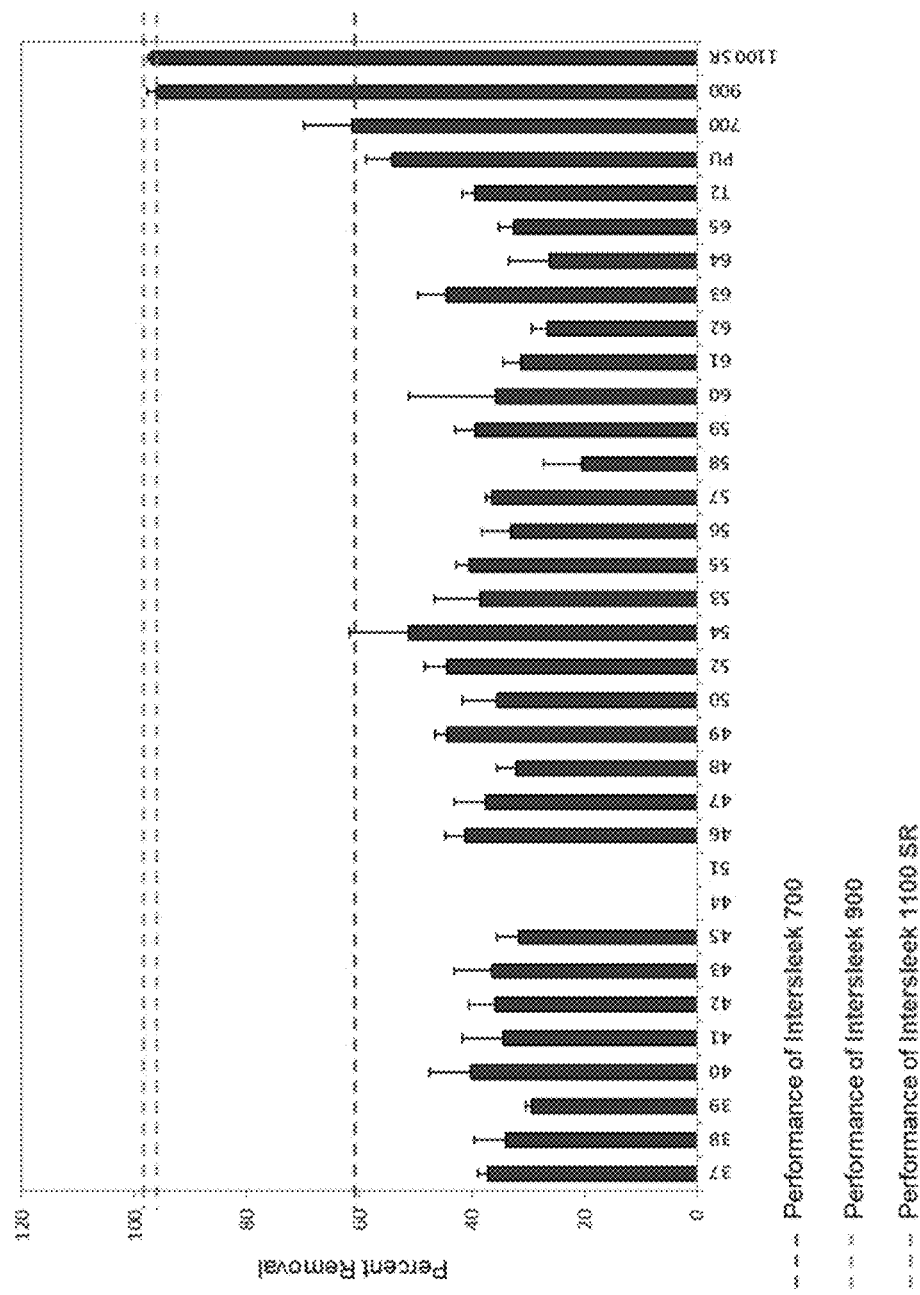
FIG. 27: Percent removal of *N. incerta* cells after water-jetting at 20 psi for coatings formulations 37-65 from Table 3

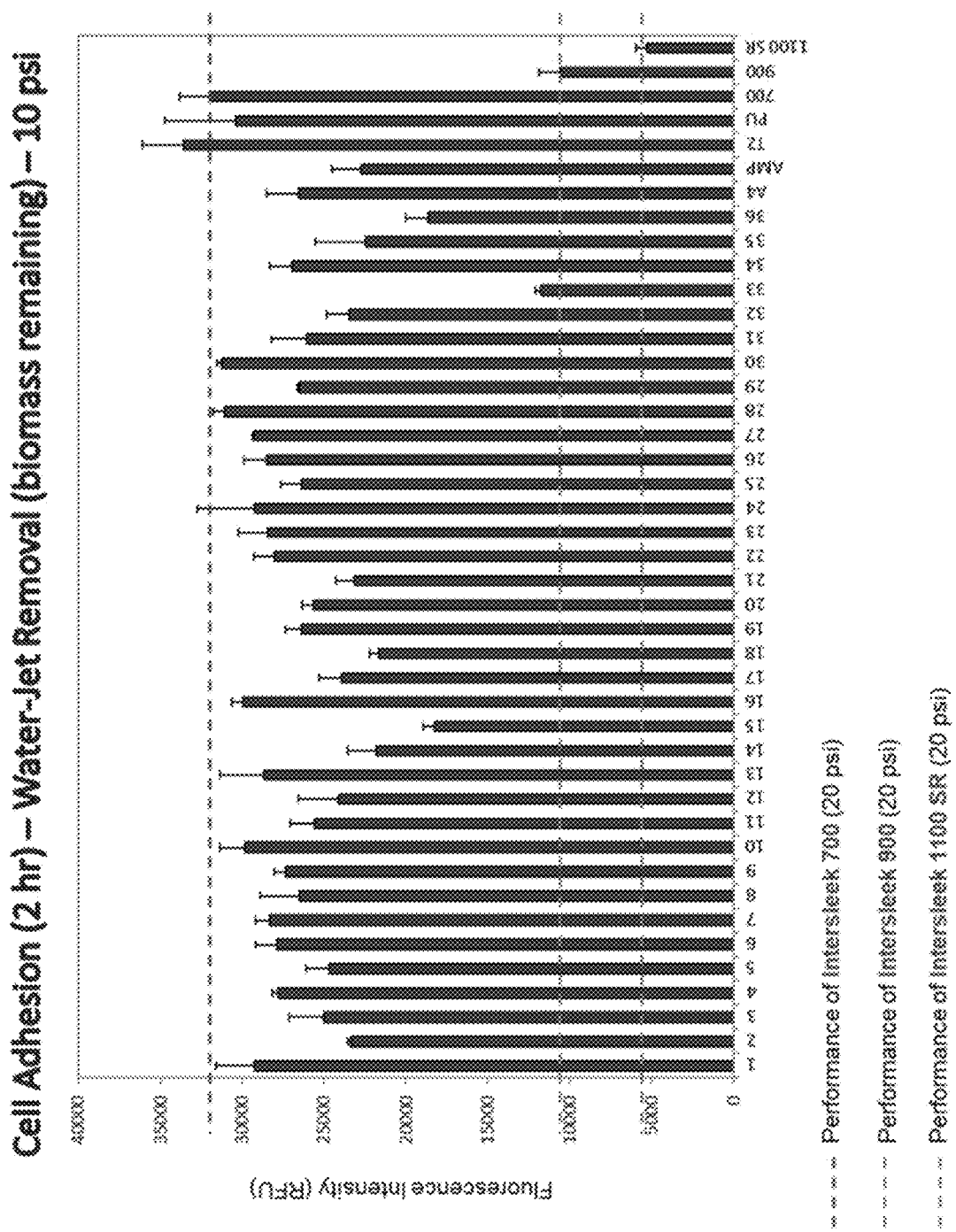
FIG. 28: Amount of *N. incerta* cells remaining after water-jetting at 10 psi for coatings formulations 1-36 from Table 3

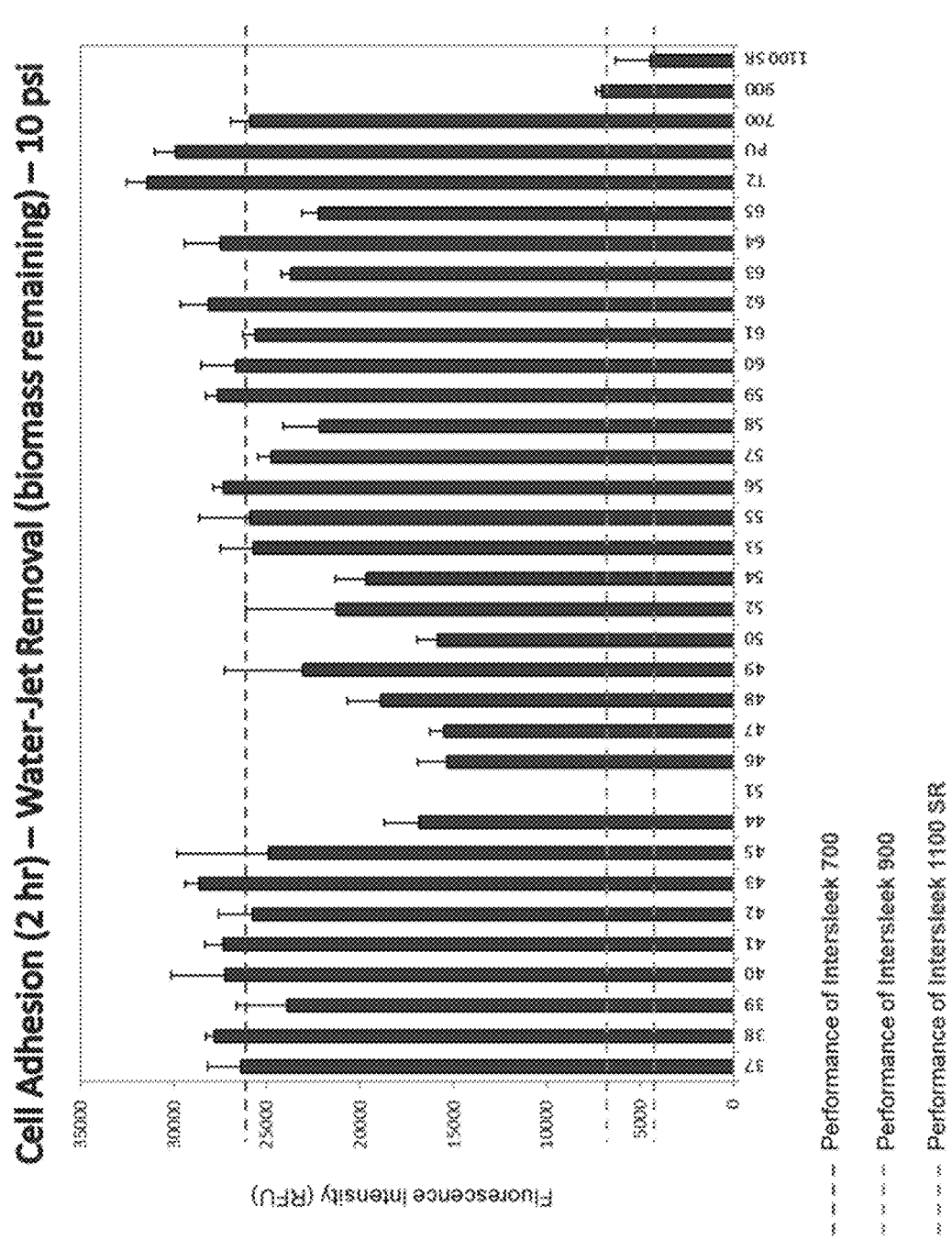
FIG. 29: Amount of *N. incerta* cells remaining after water-jetting at 10 psi for coatings formulations

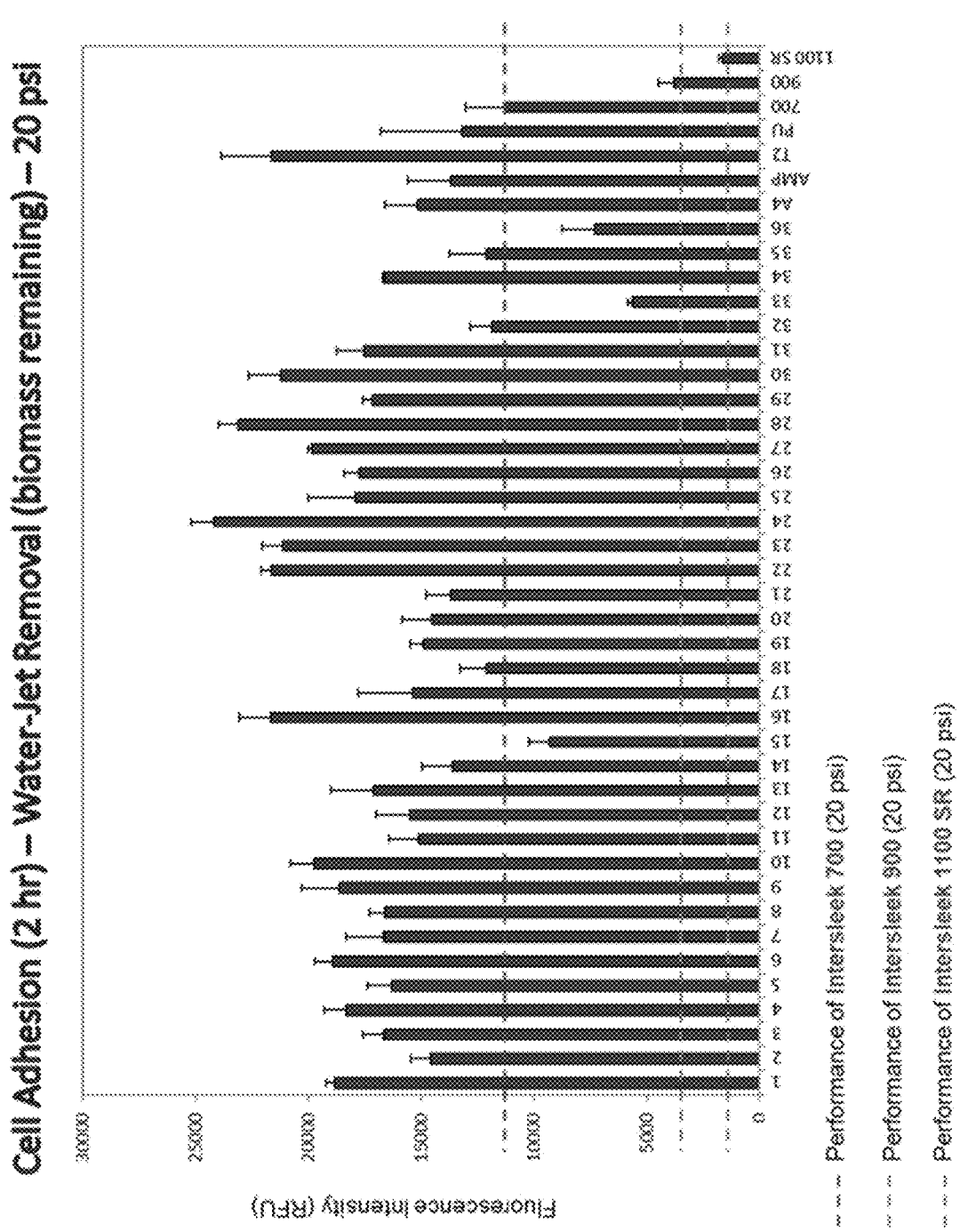
FIG. 30: Amount of *N. incerta* cells remaining after water-jetting at 20 psi for coatings formulations 1-36 from Table 3

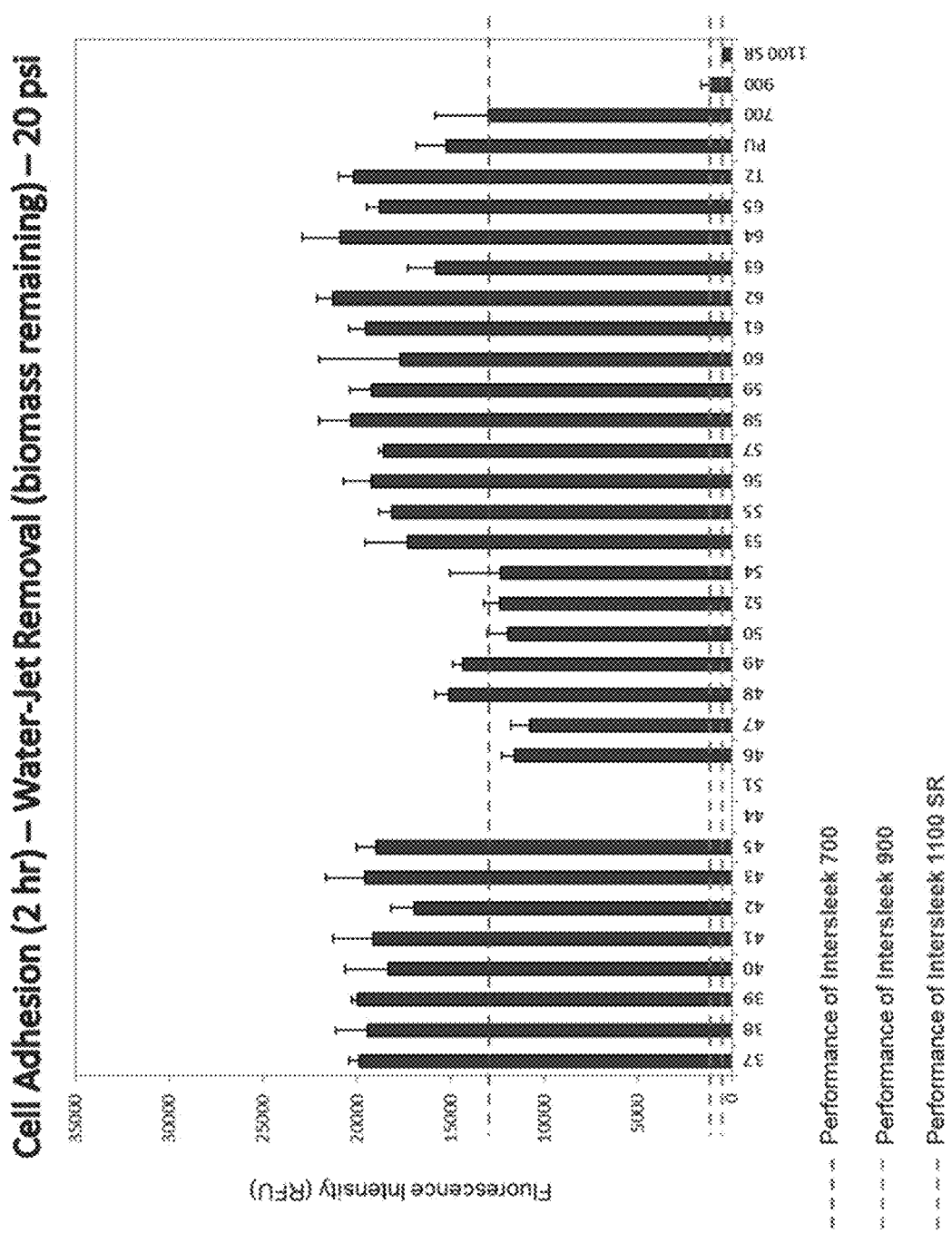
FIG. 31: Amount of *N. incerta* cells remaining after water-jetting at 20 psi for coatings formulations 37-65 from Table 3

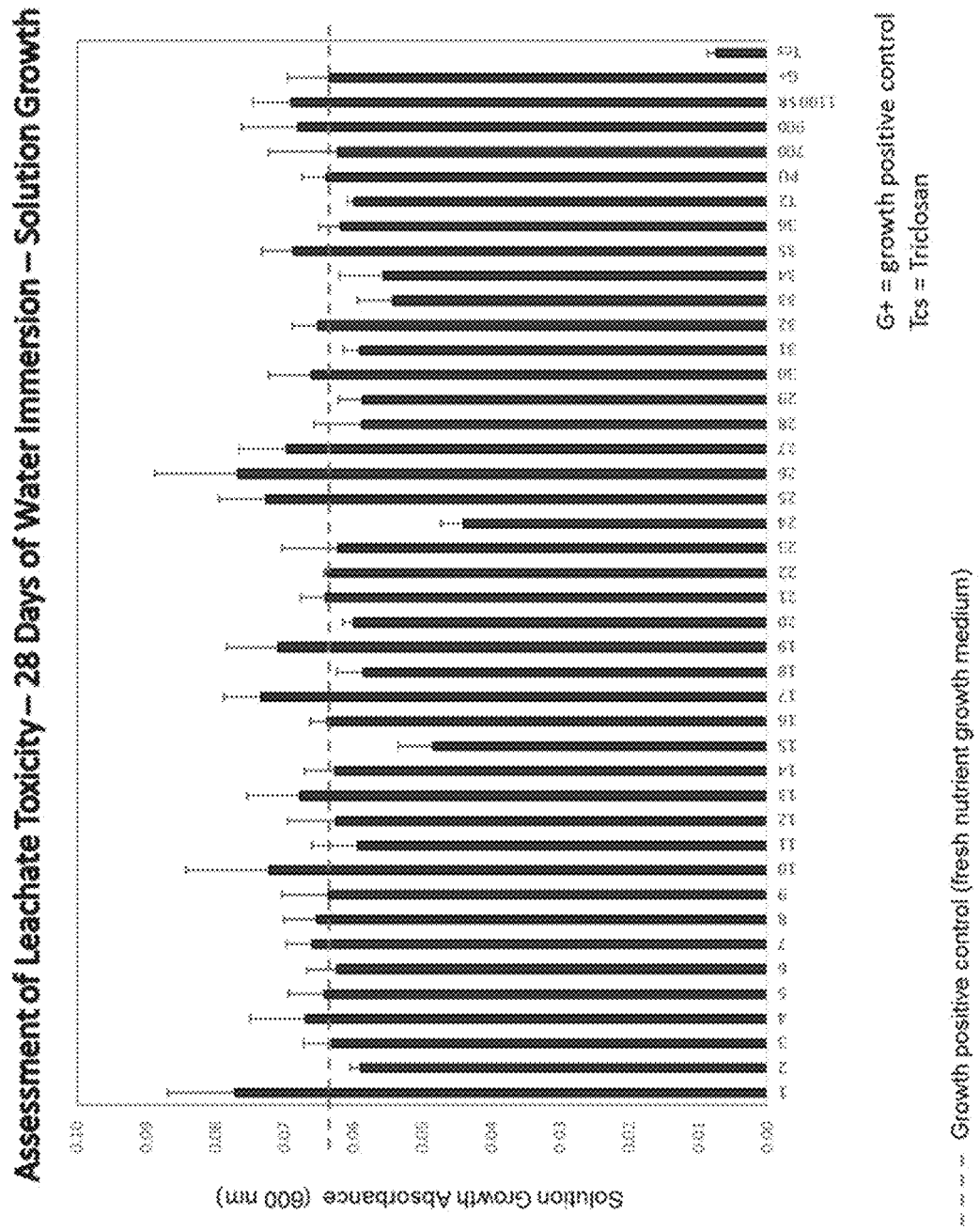
FIG. 32: Leachate toxicity (solution growth) of *C. lytica* for coatings formulations 1-36 from Table 3

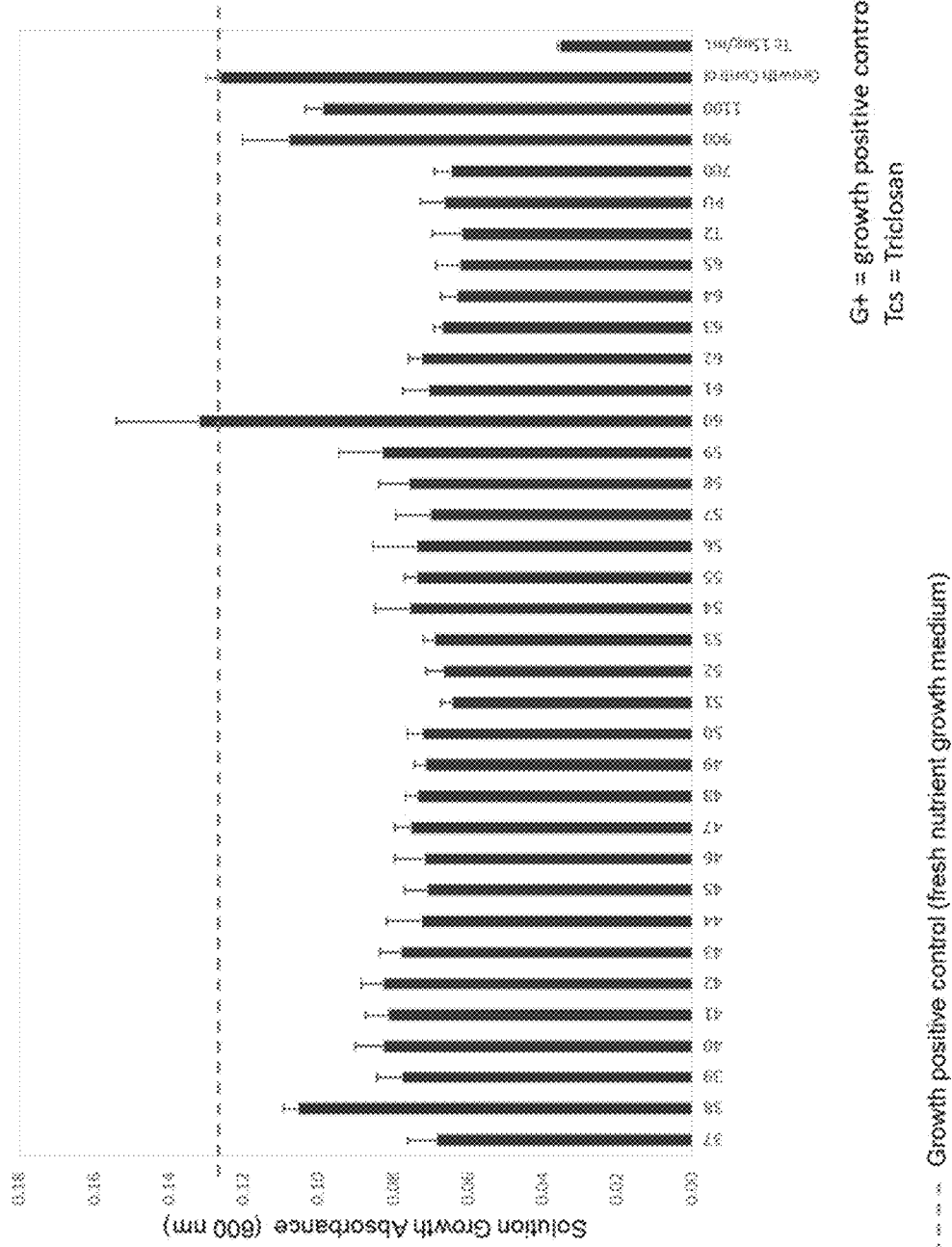
FIG. 33: Leachate toxicity (solution growth) of C. lytica for coatings formulations

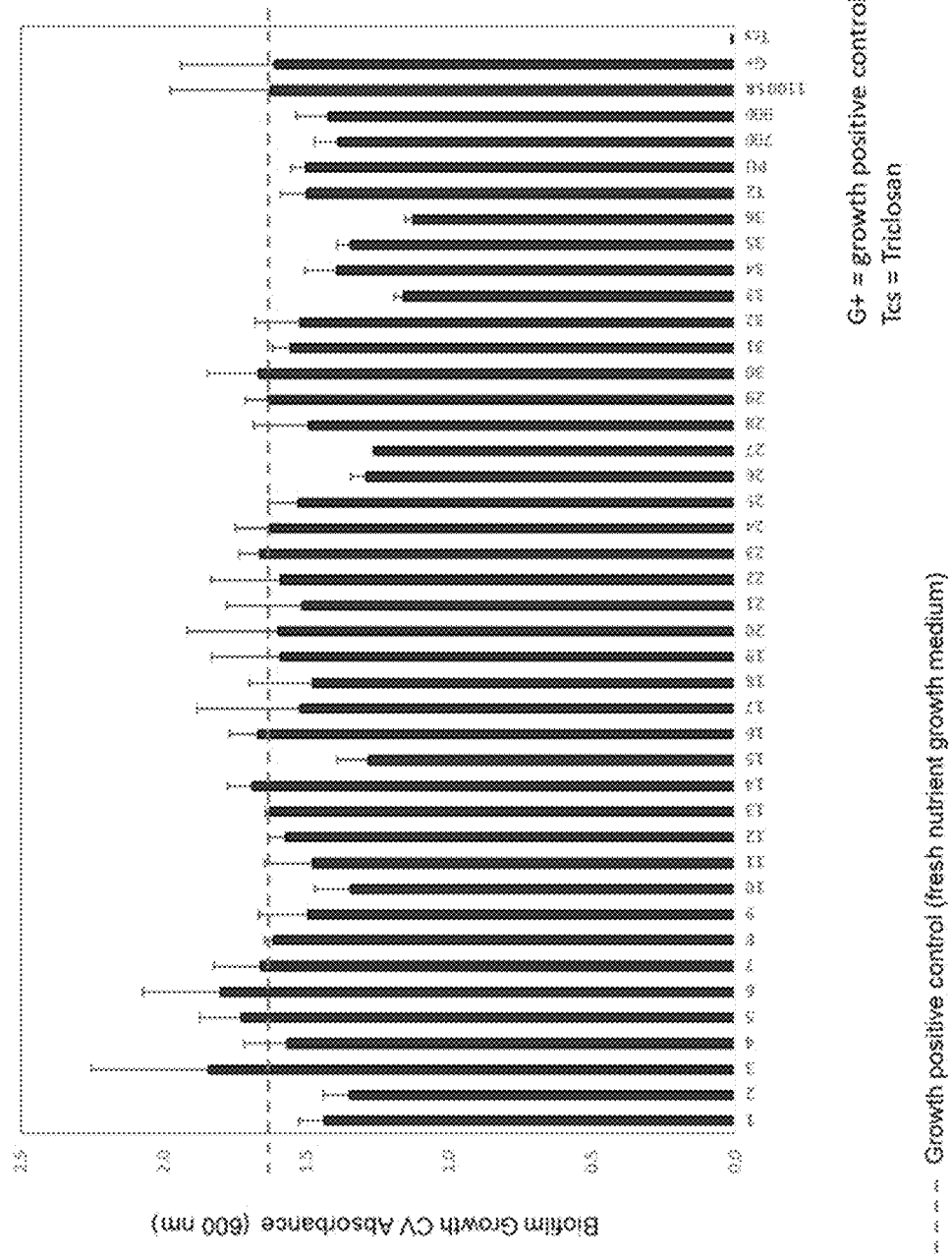
FIG. 34: Leachate toxicity (biofilm growth) of *C. lytica* for coatings formulations 1-36 from Table 3

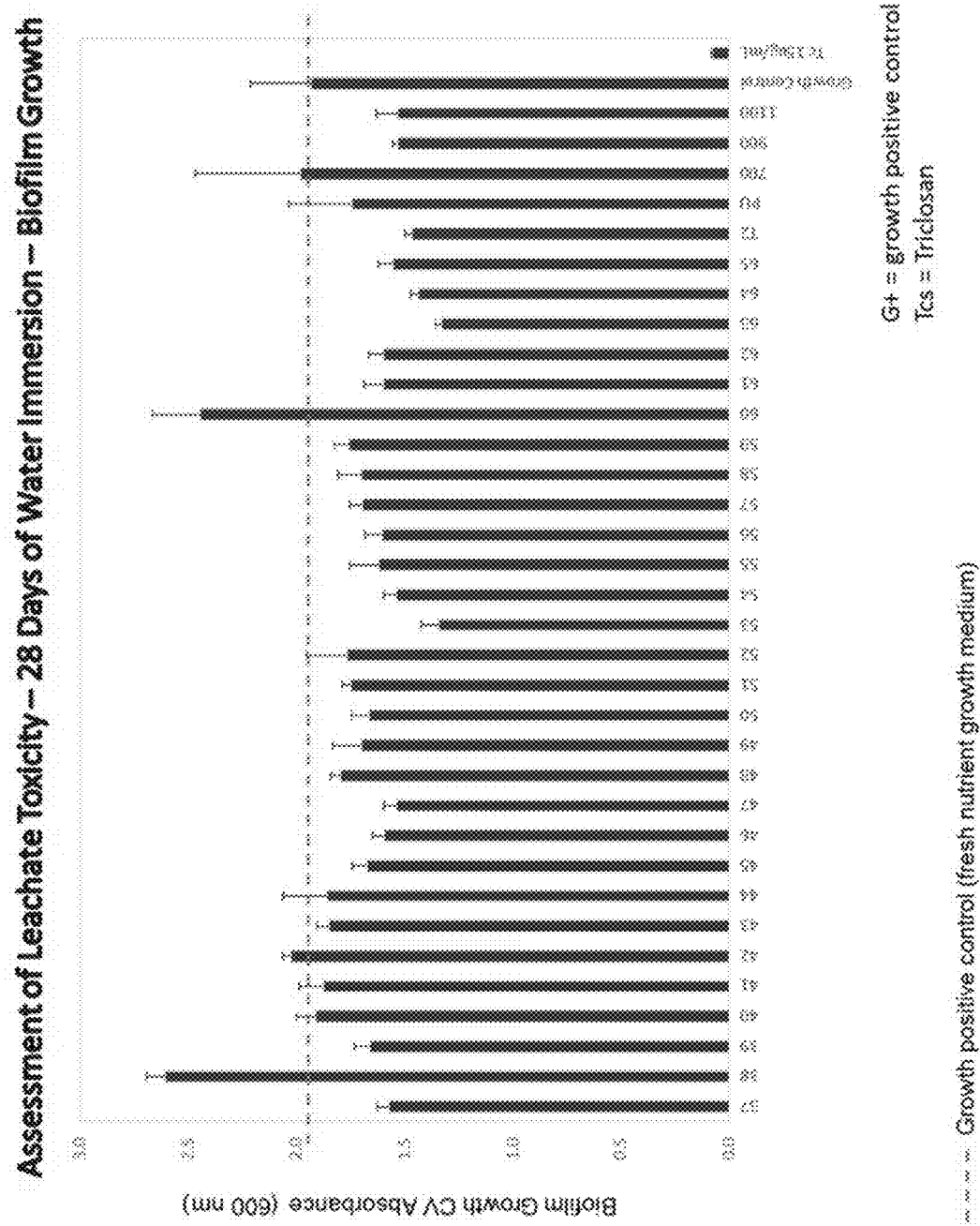
FIG. 35: Leachate toxicity (biofilm growth) of *C. lytica* for coatings formulations 37-65 from **

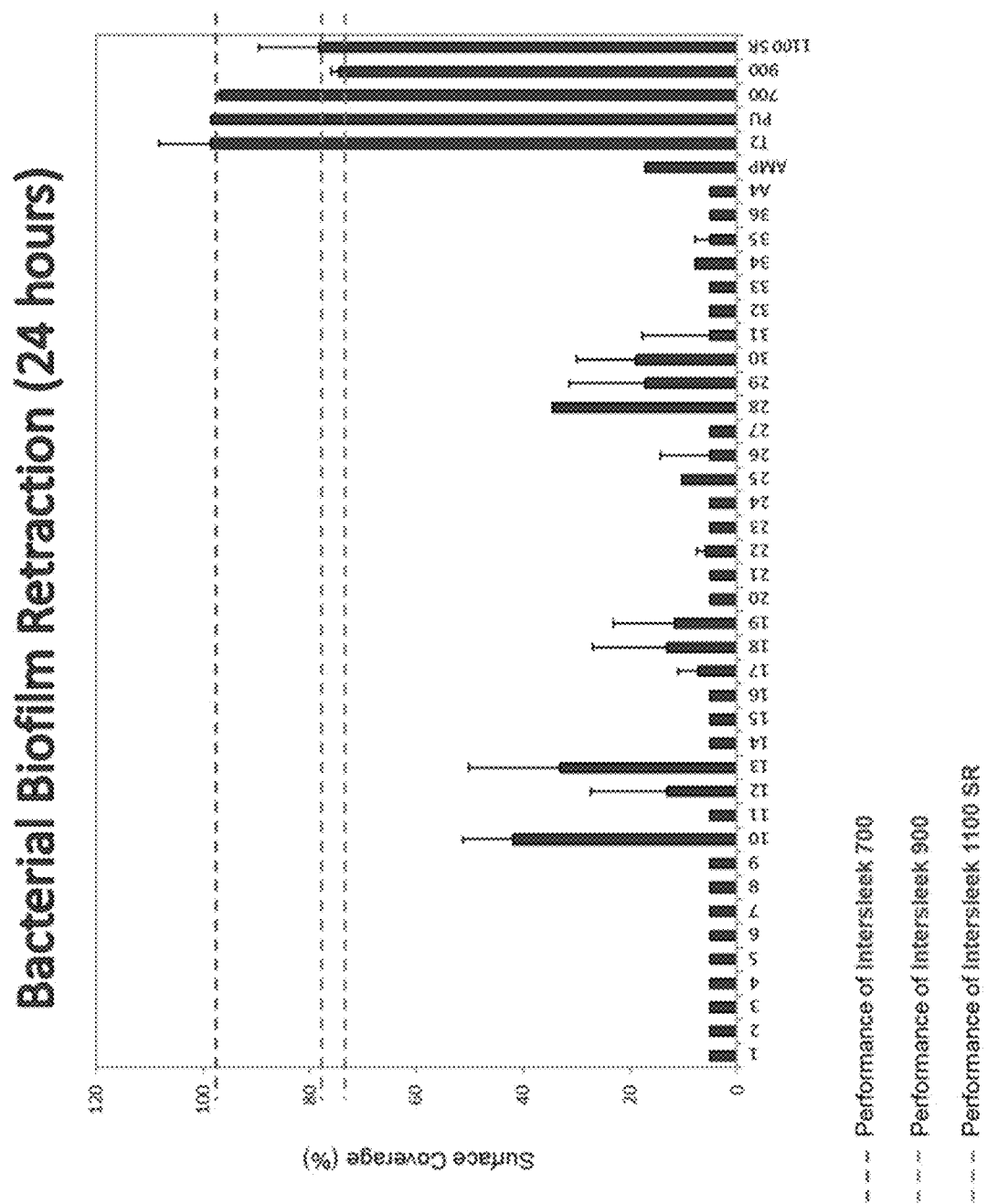
FIG. 36: Surface coverage of *C. lytica* for coatings formulations 1-36 from Table 3

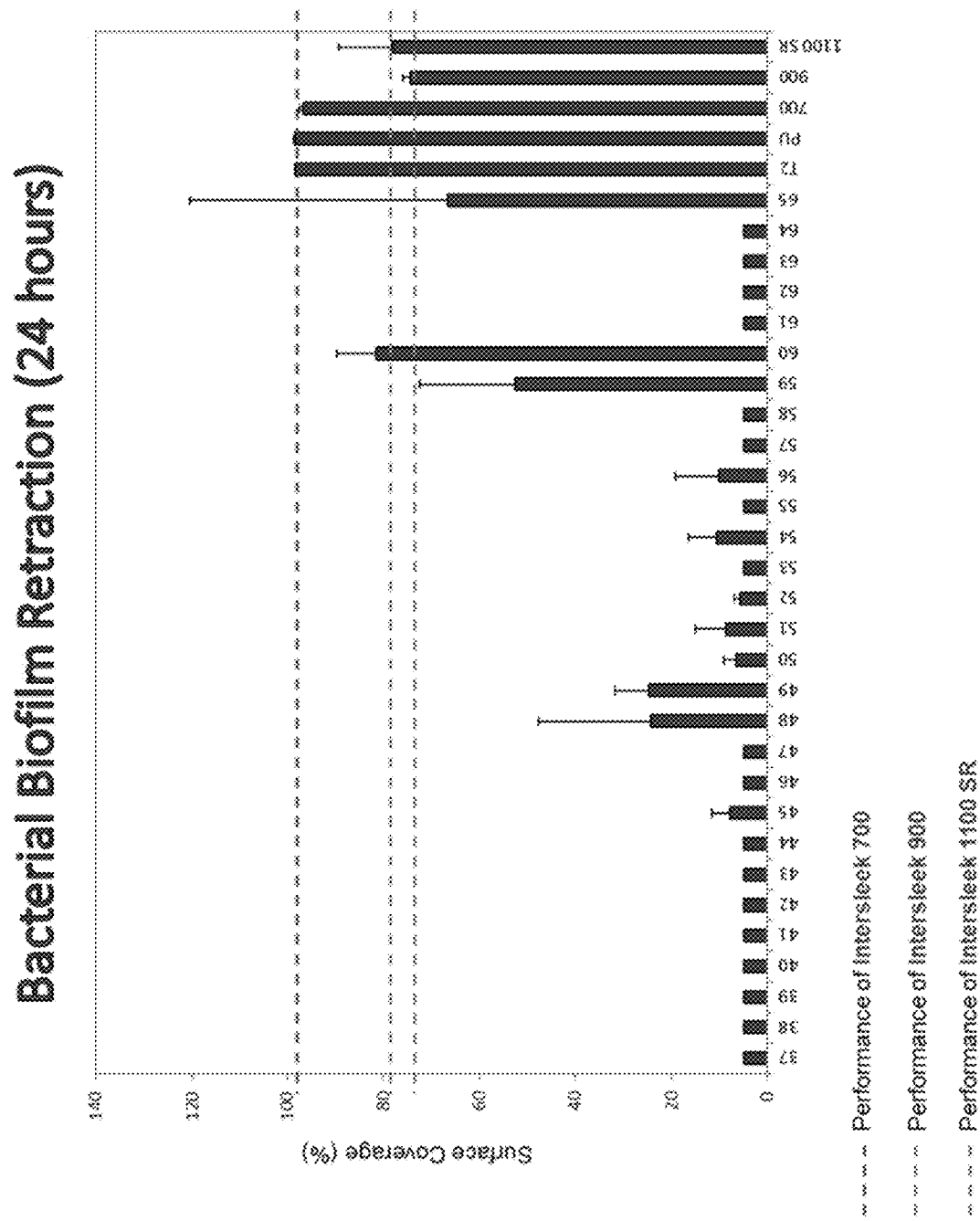
FIG. 37: Surface coverage of *C. lytica* for coatings formulations 37-65 from Table 3

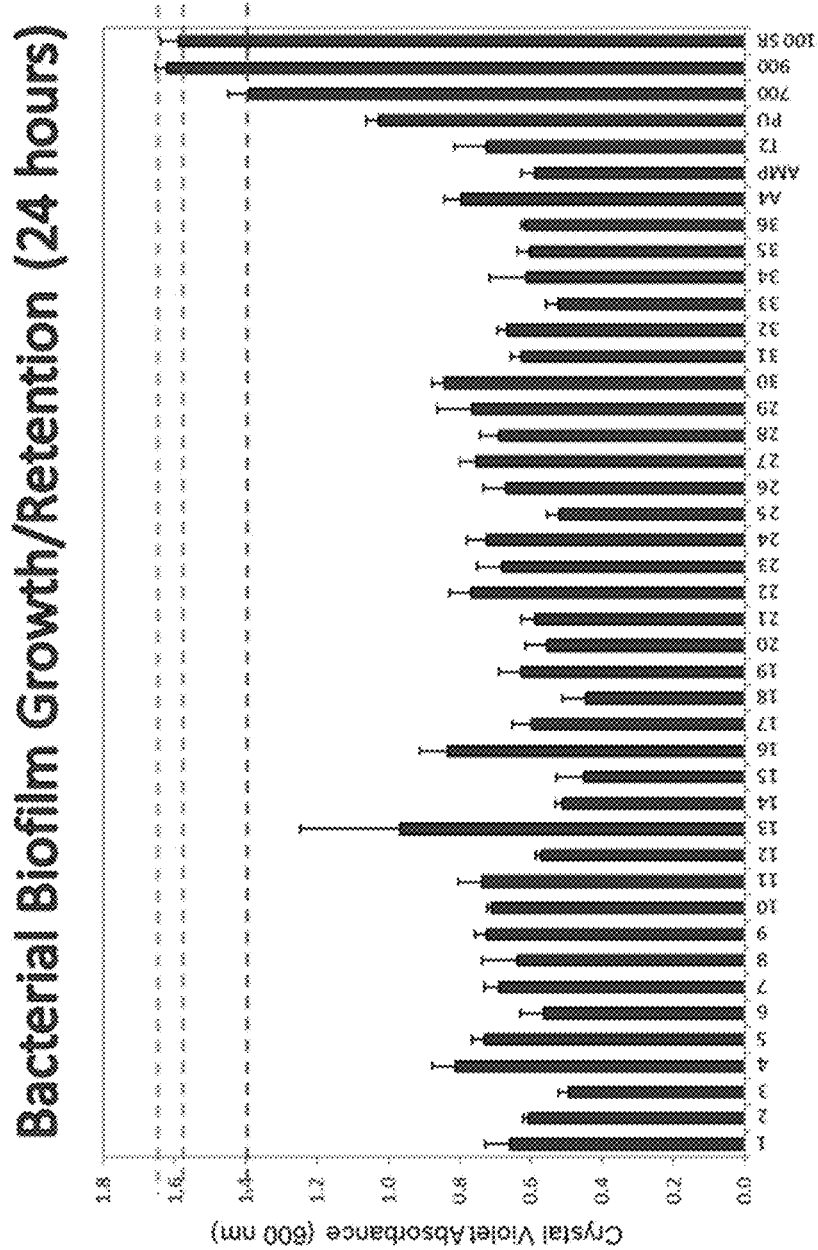
FIG. 38: Settlement of *C. lytica* on the coatings' surfaces of formulations 1-36 from Table 3

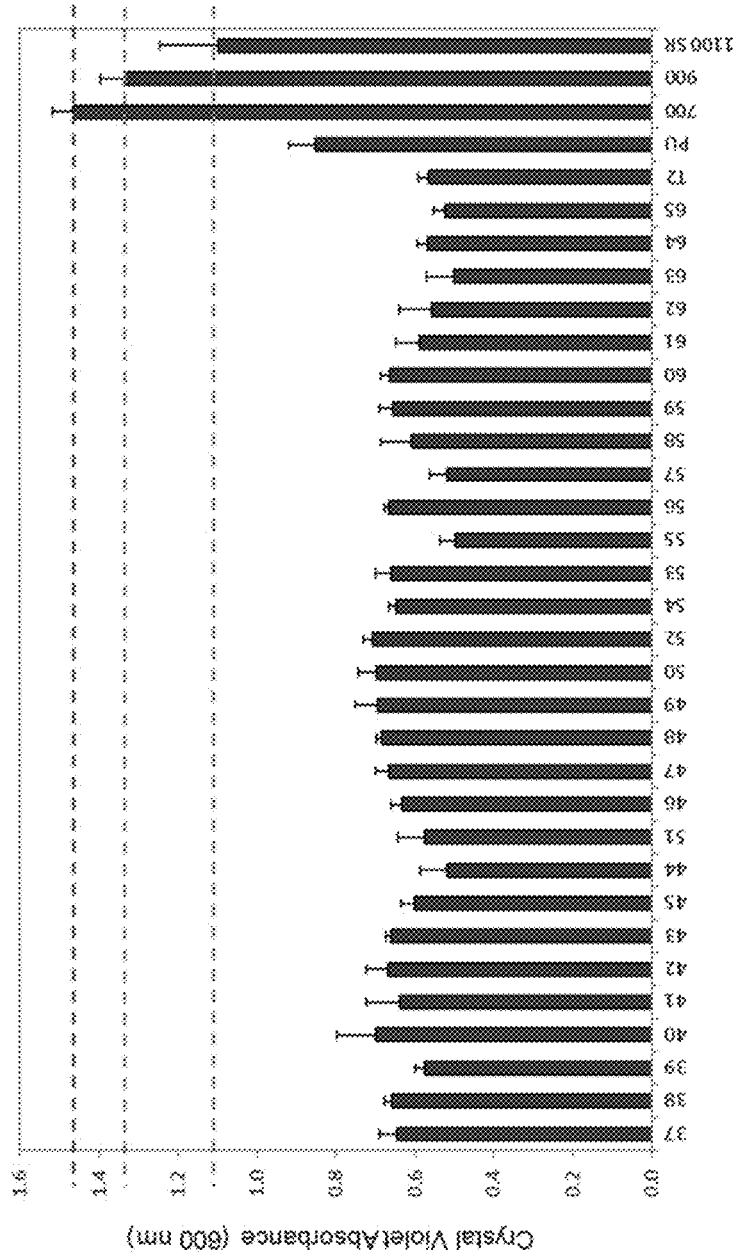
FIG. 39: Settlement of *C. lytica* on the coatings' surfaces of formulations 37-65 from Table 3

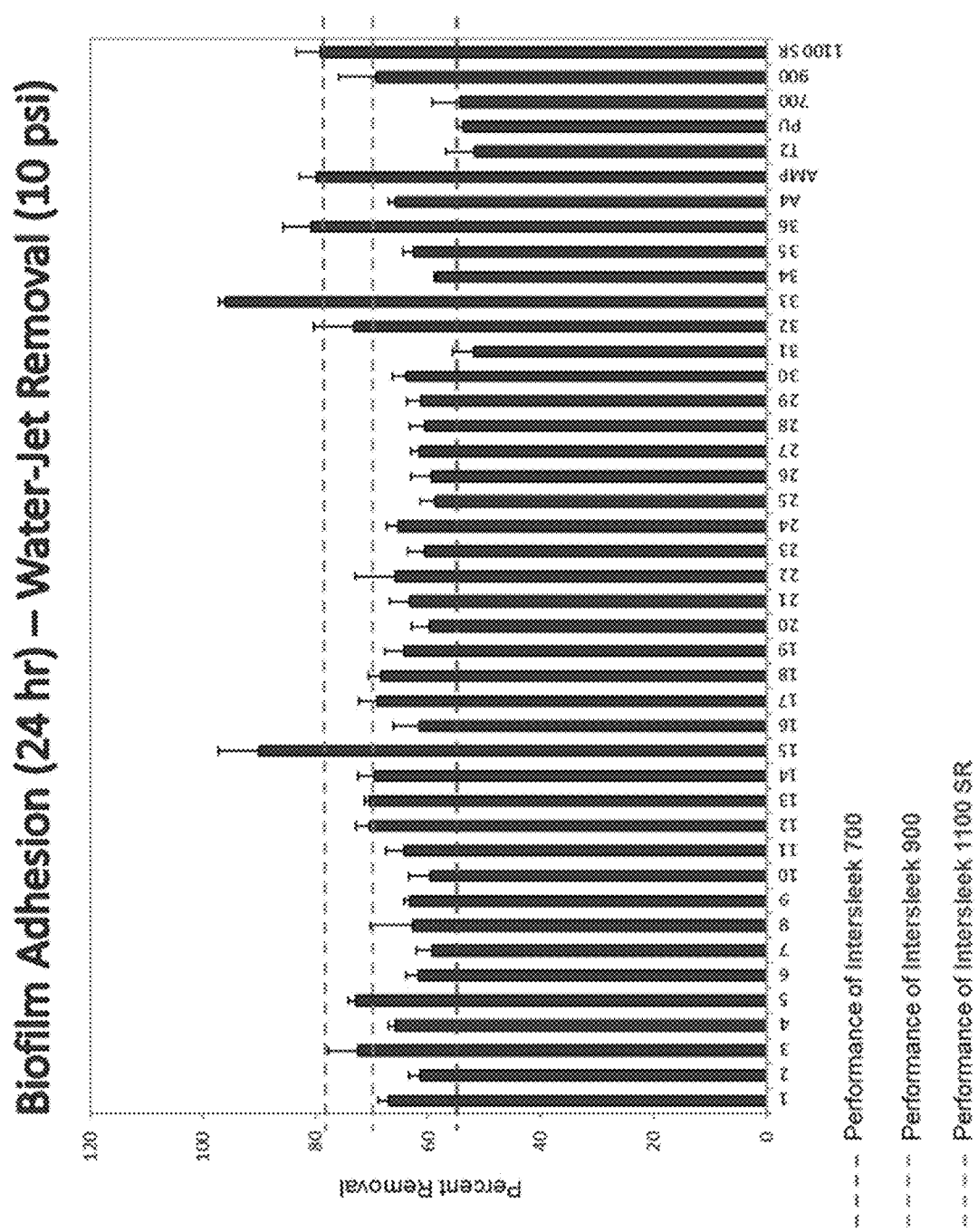
FIG. 40: Percent removal of *C. lytica* after water-jetting at 10 psi for coatings formulations 1-36 from Table 3

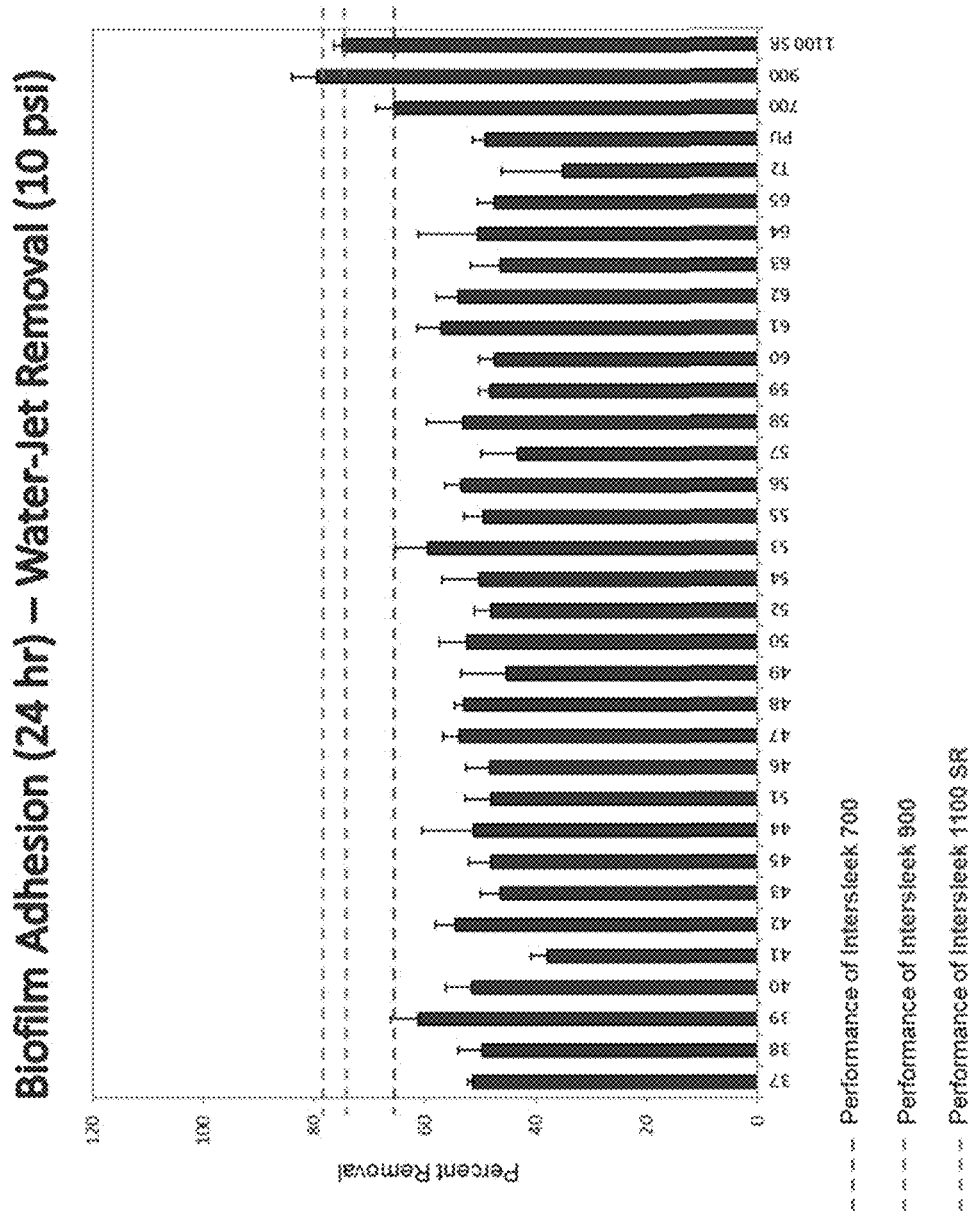
FIG. 41: Percent removal of *C. lytica* after water-jetting at 10 psi for coatings formulations

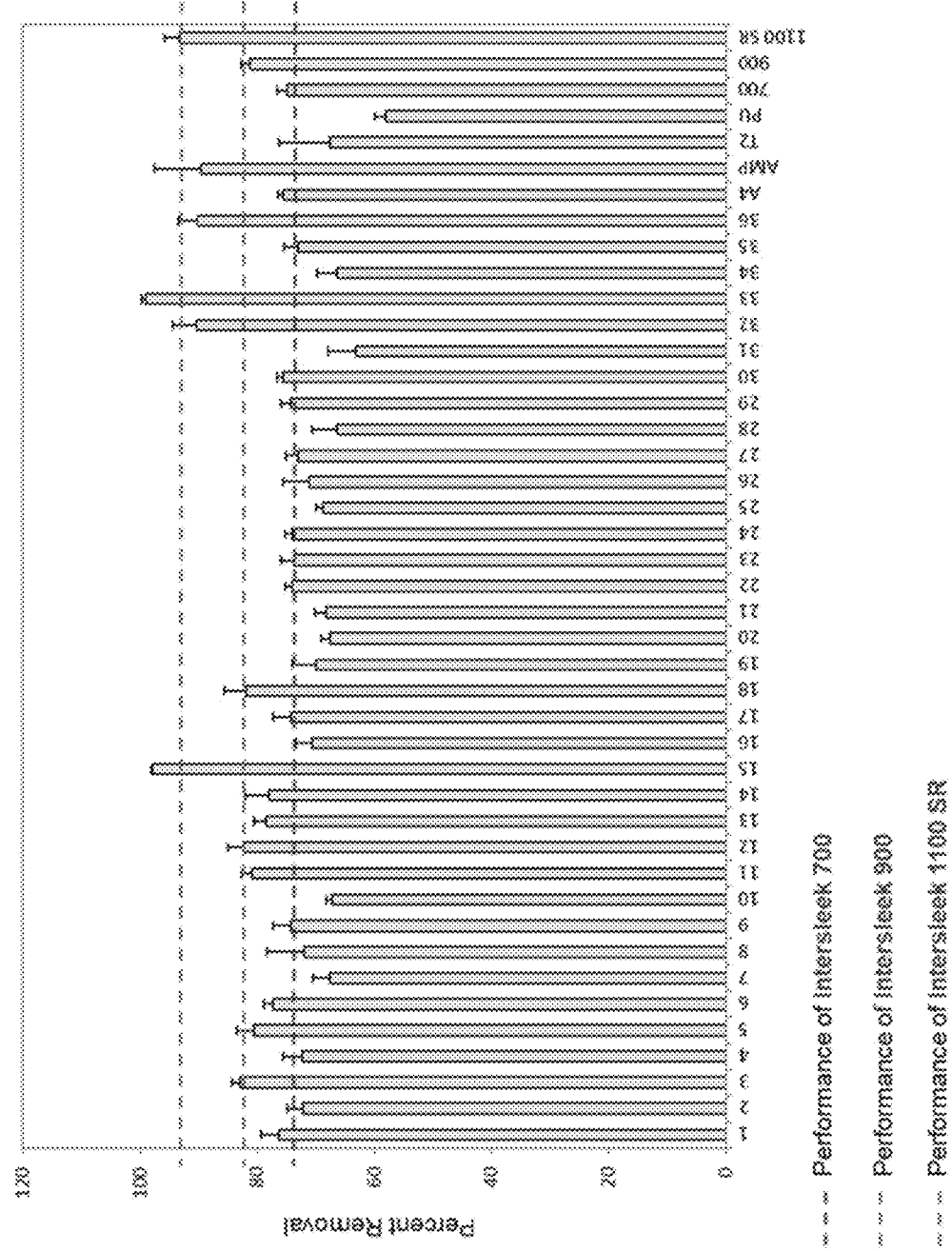
FIG. 42: Percent removal of *C. lytica* after water-jetting at 20 psi for coatings formulations 1-36 from Table 3

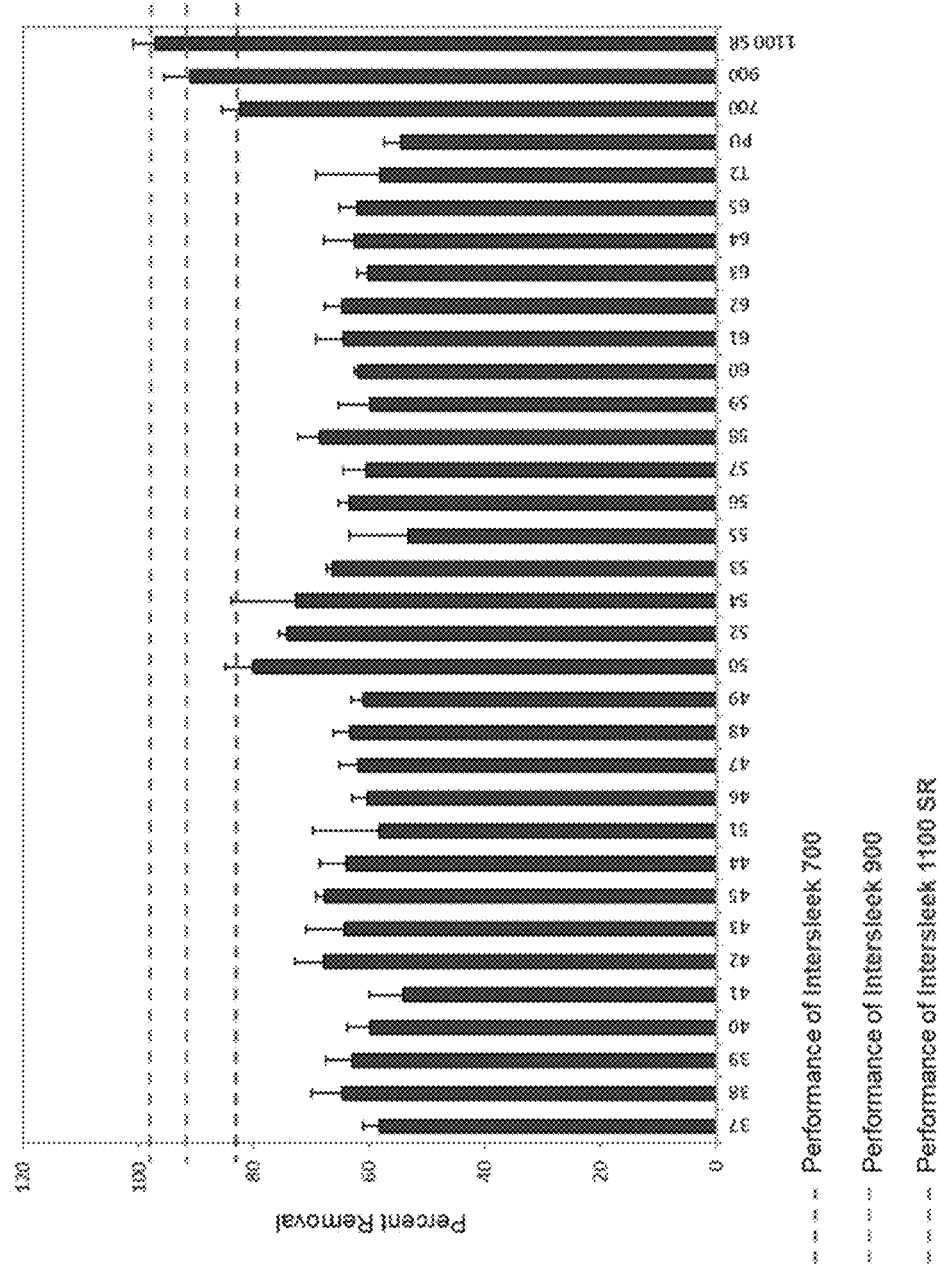
FIG. 43: Percent removal of *C. lytica* after water-jetting at 20 psi for coatings formulations 37-65 from Table 3

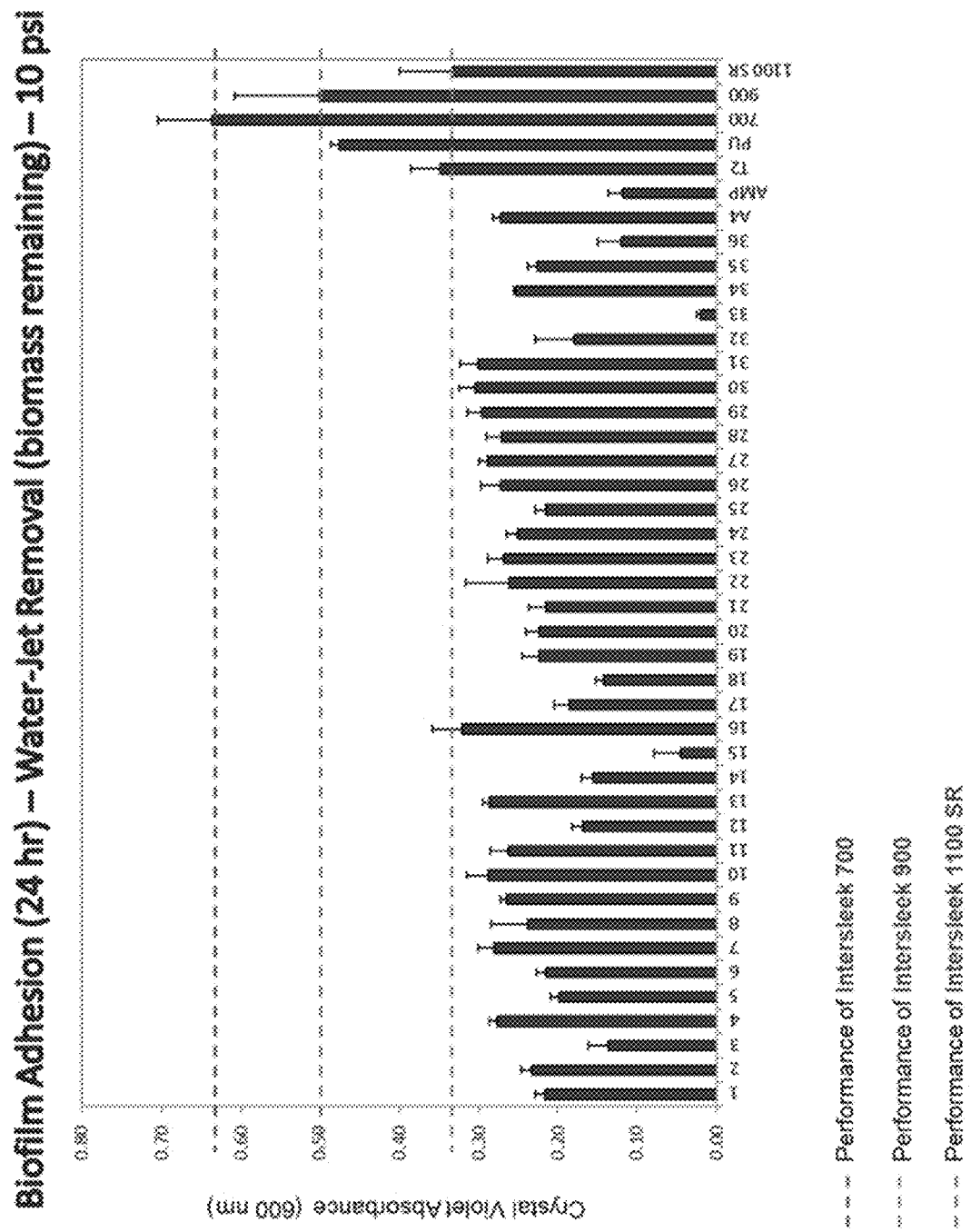
FIG. 44: Amount of *C. lytica* biofilm remaining after water-jetting at 10 psi for coatings formulations 1-36 from Table 3

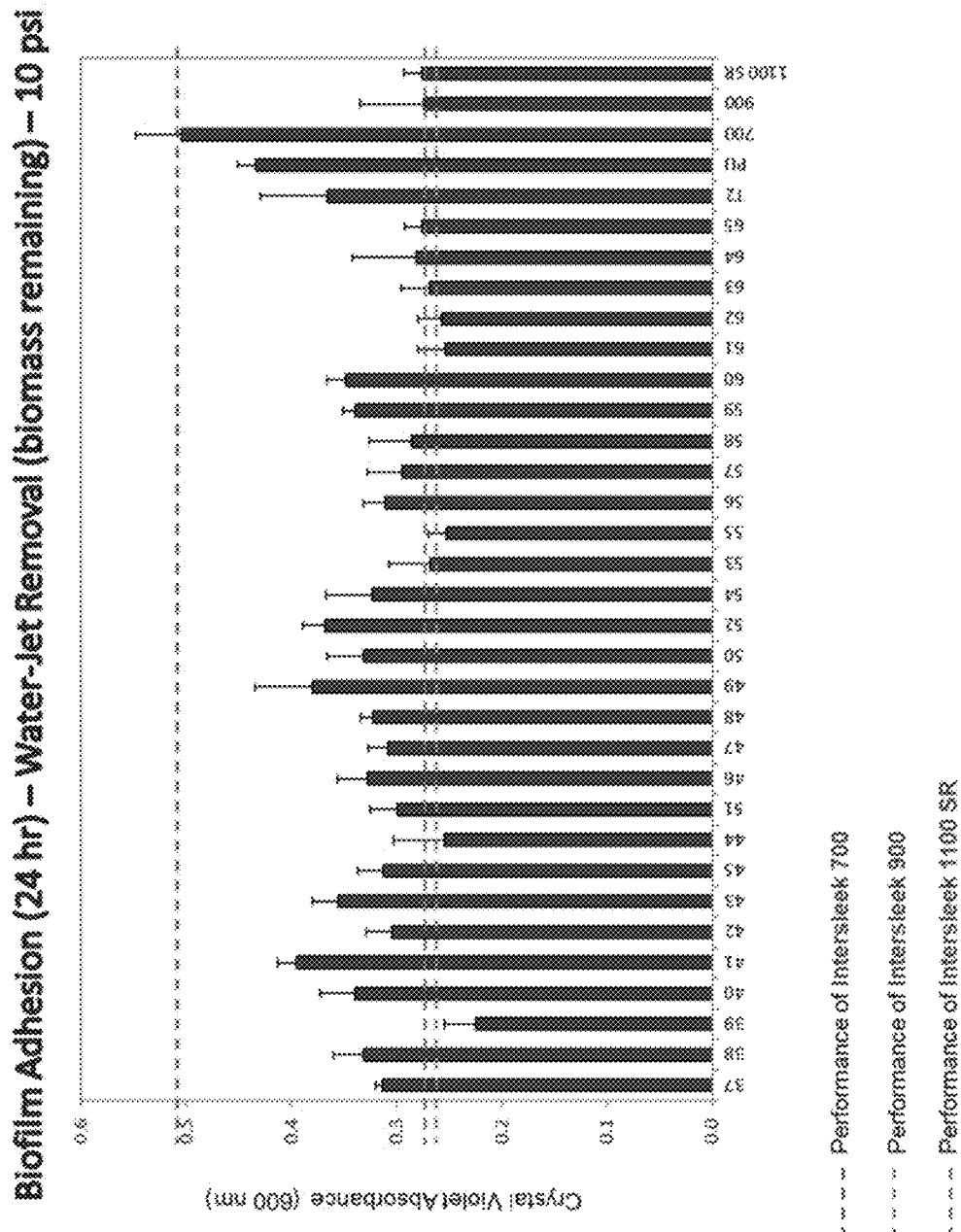
FIG. 45: Amount of C. lytica biofilm remaining after water-jetting at 10 psi for coatings formulations 37-65 from Table 3

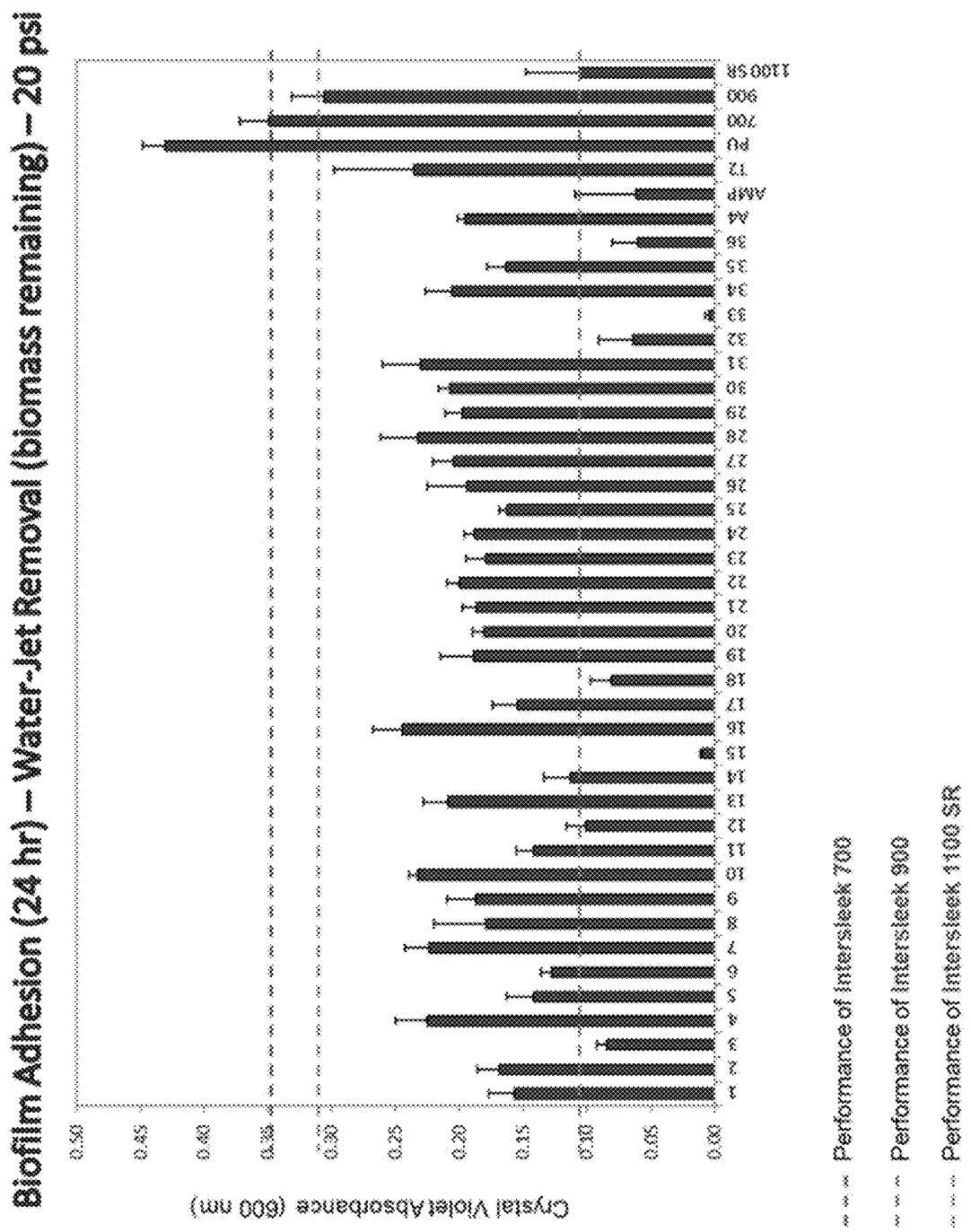
FIG. 46: Amount of *C. lytica* biofilm remaining after water-jetting at 20 psi for coatings formulations 1-36 from Table 3

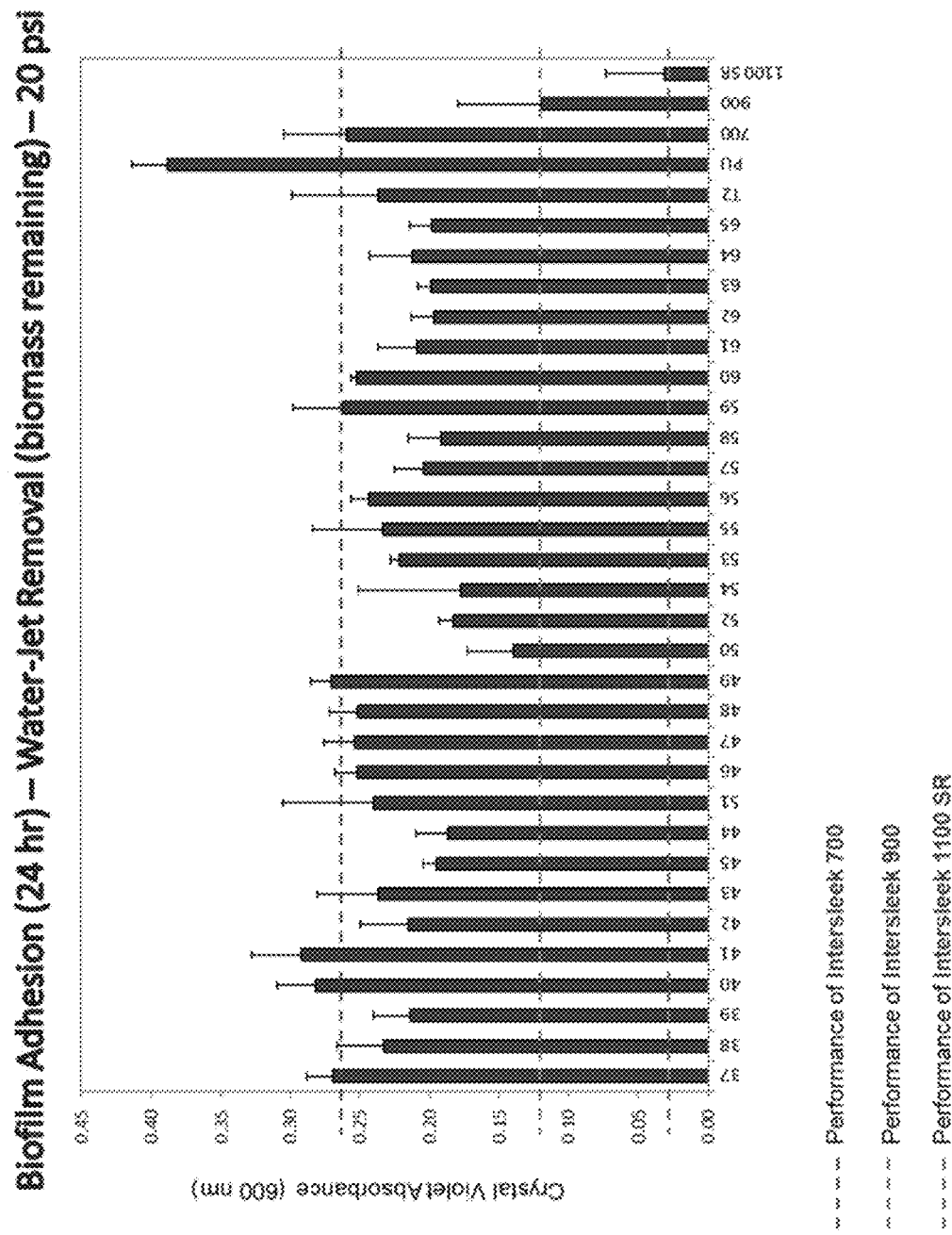
FIG. 47: Amount of C. lytica biofilm remaining after water-jetting at 20 psi for coatings formulations 37-65 from Table 3

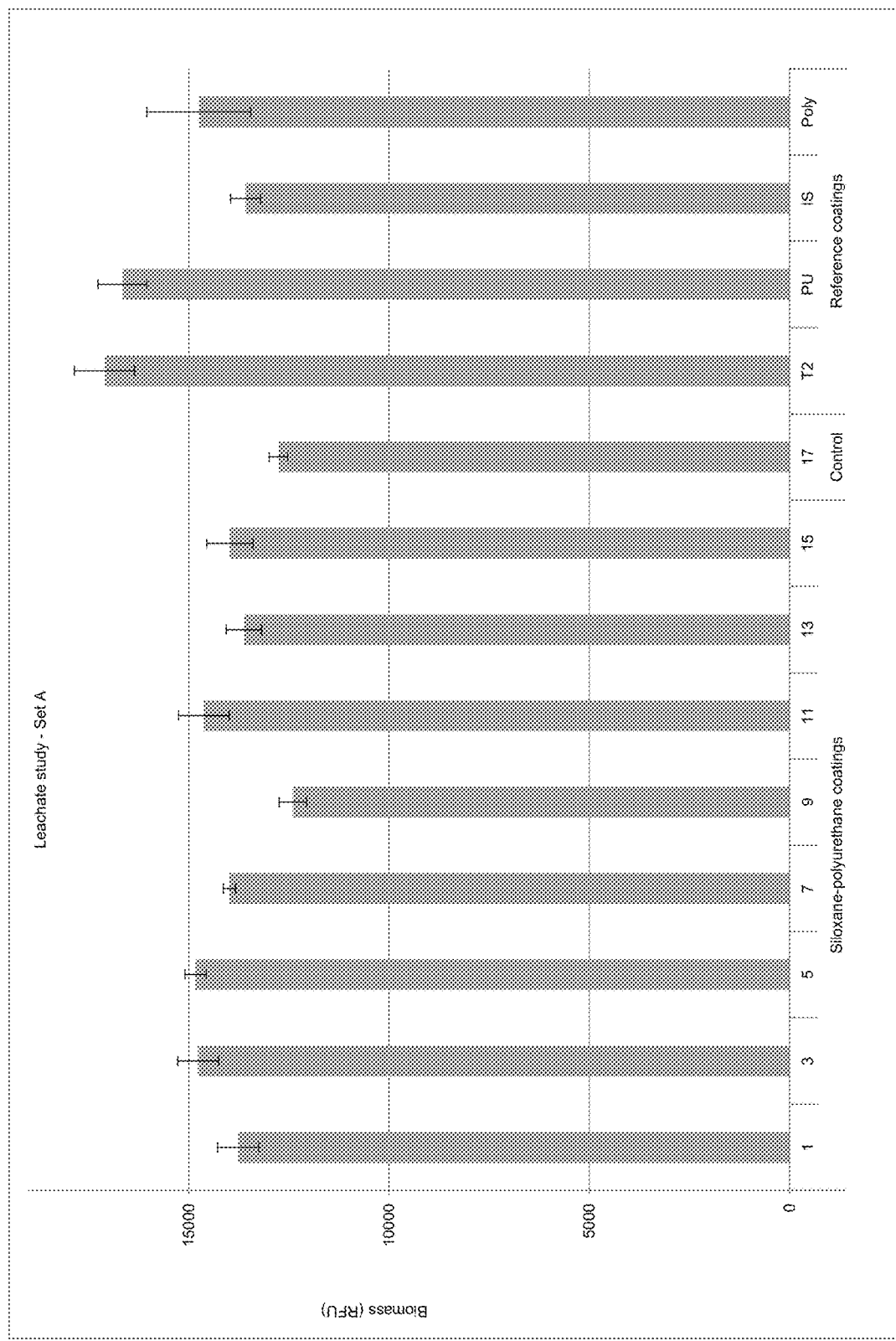
FIG. 48: Biomass generation of *U. linza* sporelings that were grown in leachates (6 replicates) from the experimental coatings in set A leachate toxicity. Biomass is represented as relative fluorescent units (RFU) measured of extracted chlorophyll.

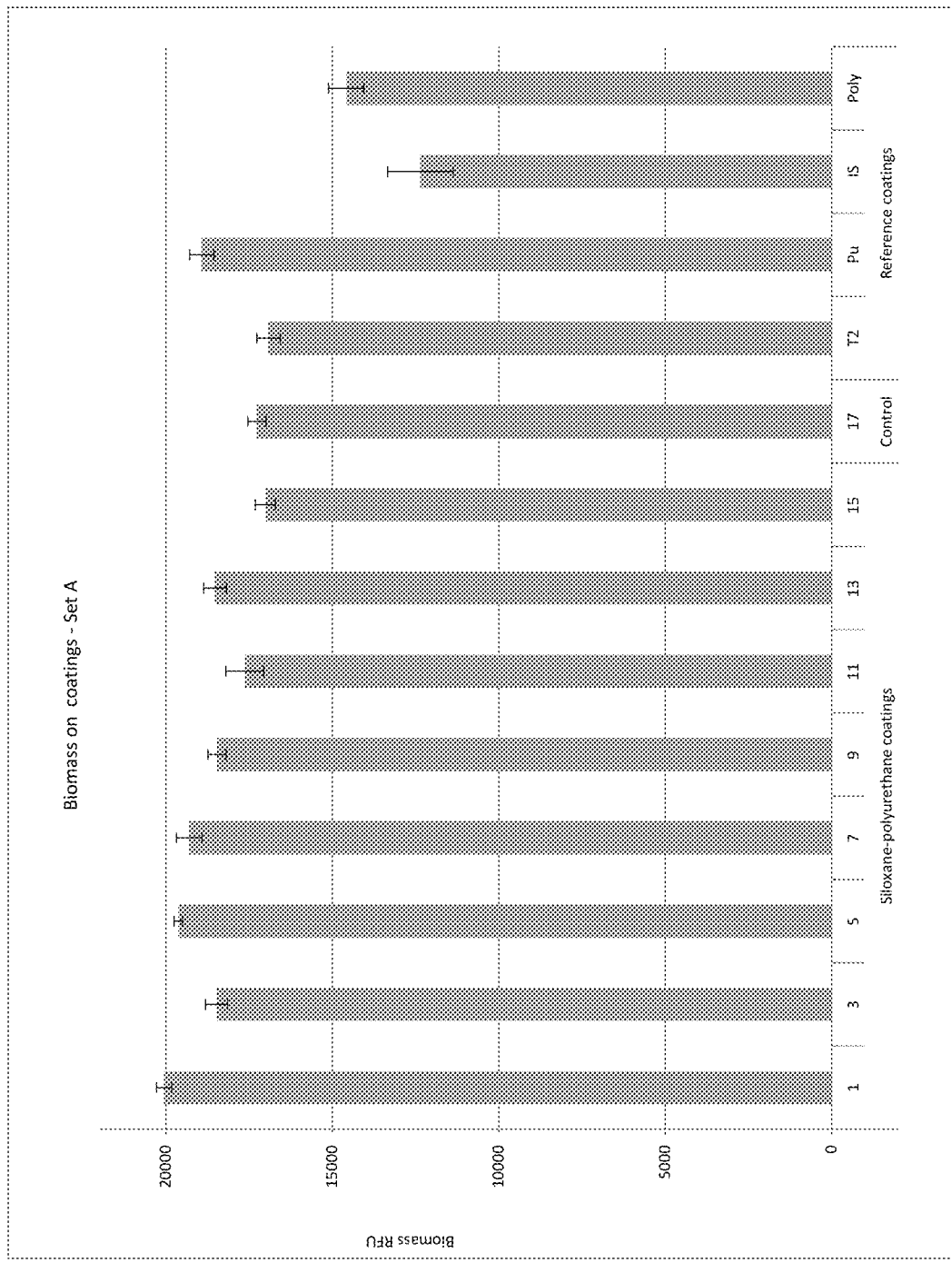
FIG. 49: Biomass generation of *U. linza* sporelings on experimental coatings in set A after 7 days growth. Biomass is represented as relative fluorescent units (RFU) measured of extracted chlorophyll.

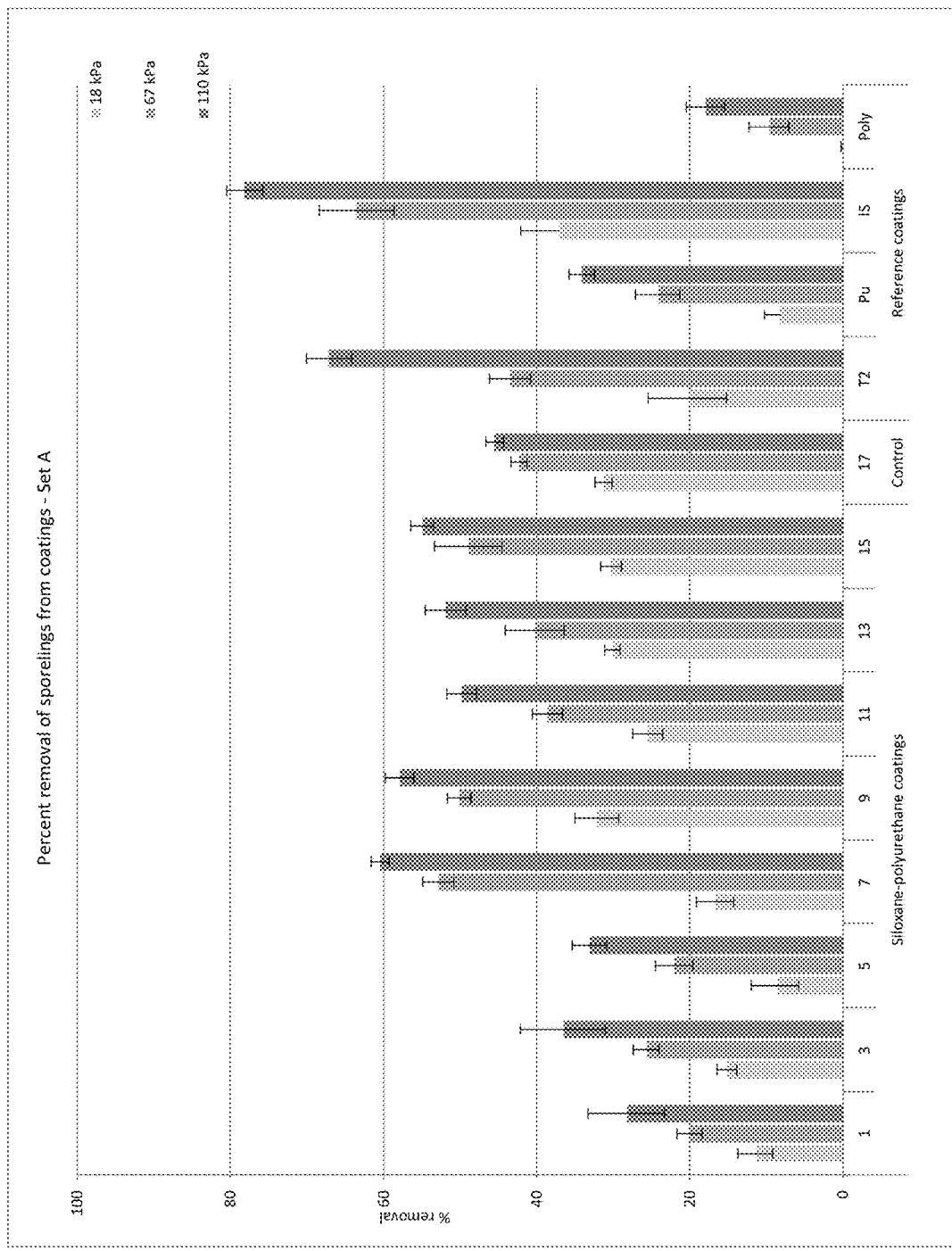
FIG. 50: Percentage removal of *U. linza* sporelings from experimental coatings of set A after 7 days growth and using spinjet pressures of 18, 67, and 110 kPa.

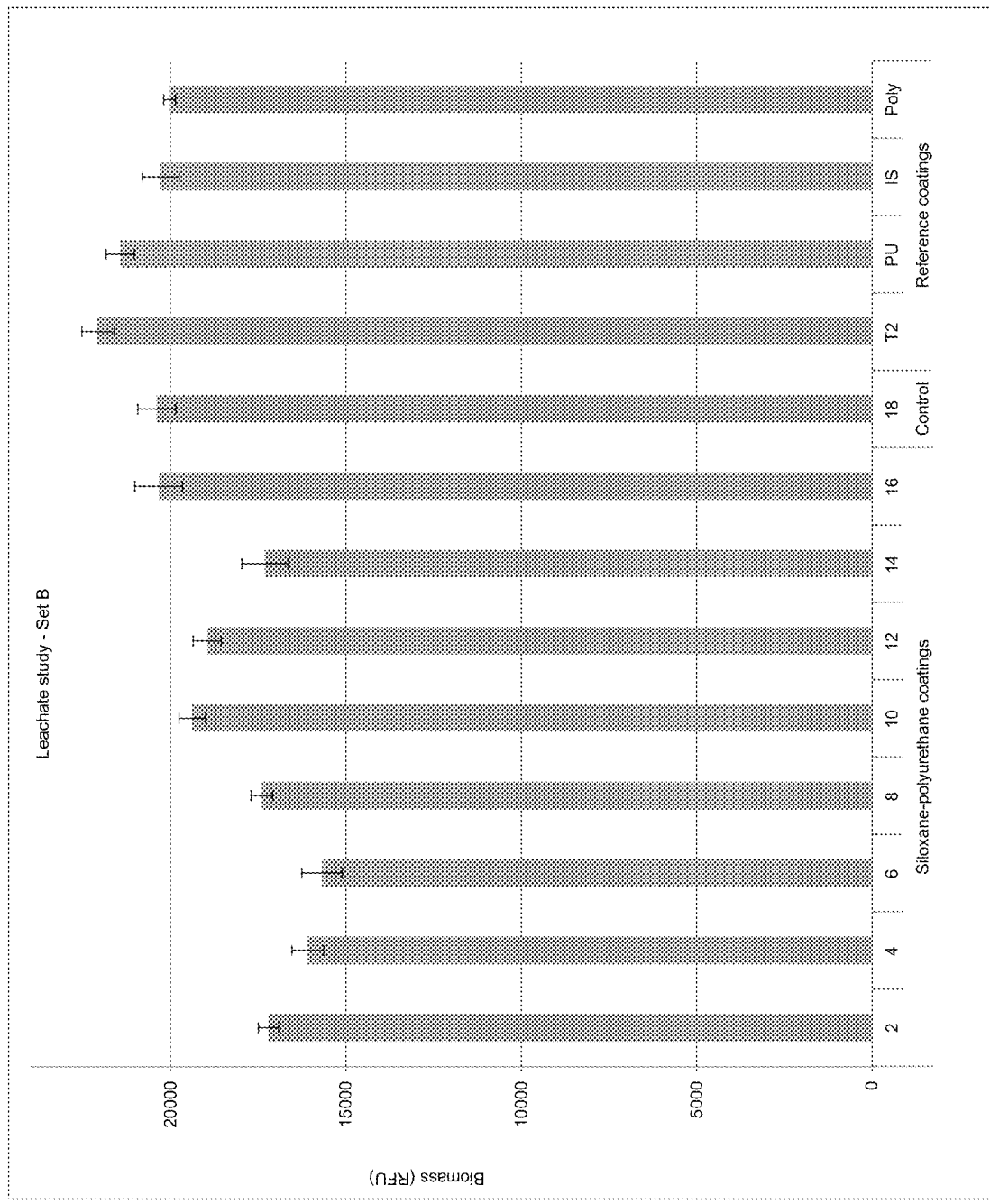
FIG. 51: Set B biomass generation of *U. linza* sporelings in leachate toxicity assay

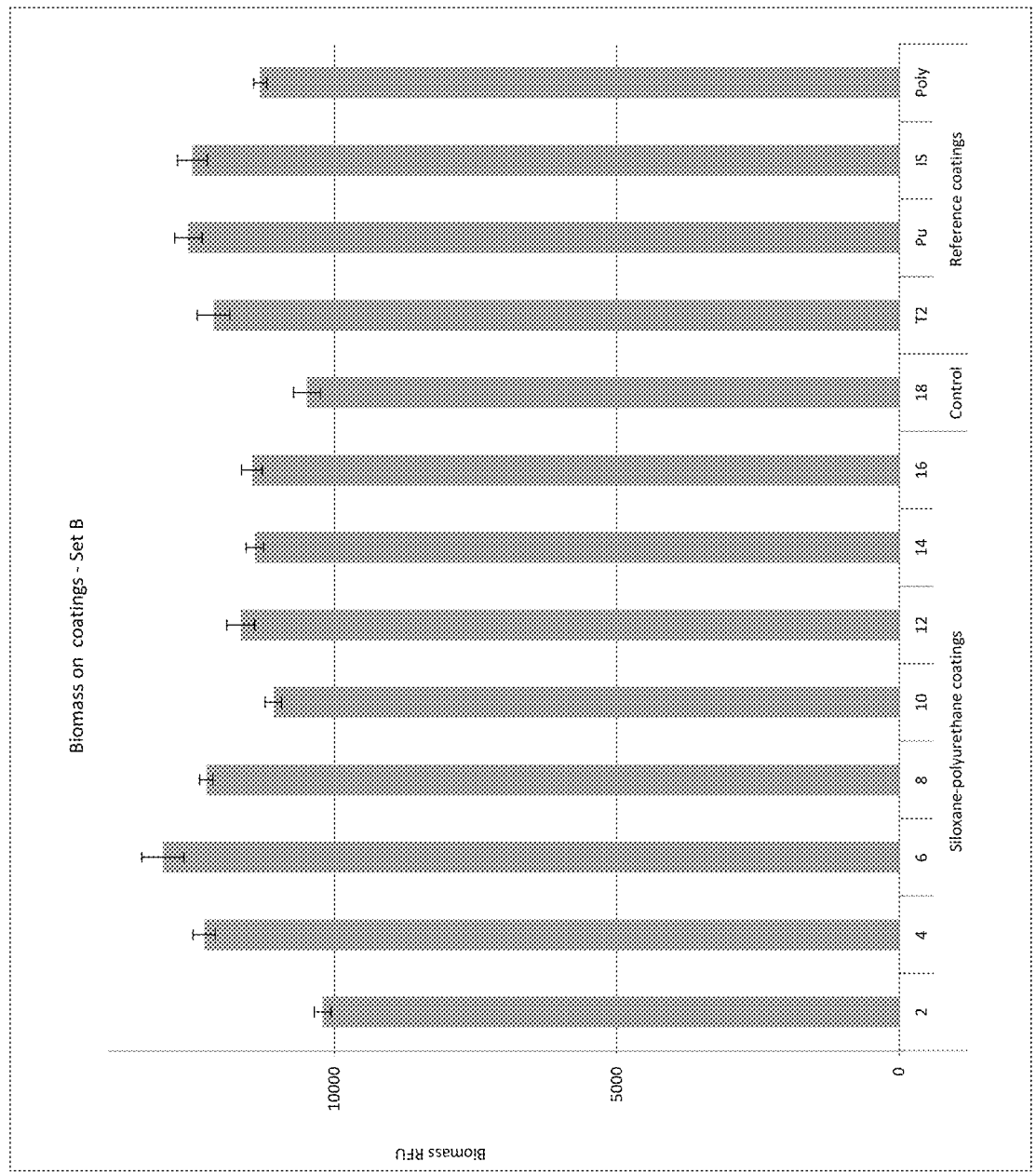
FIG. 52: Set B biomass generation of *U. linza* sporelings during sporeling growth assay

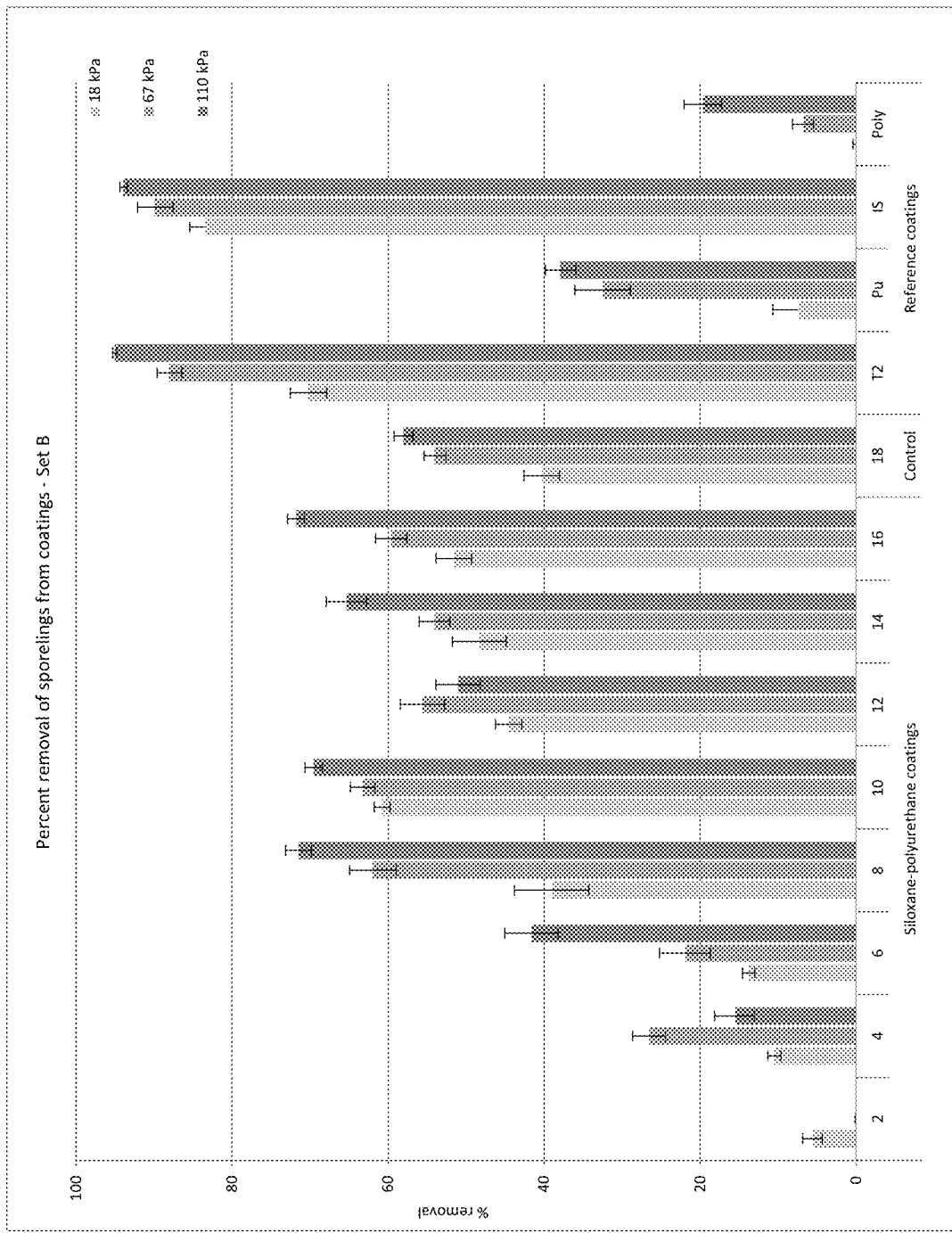
FIG. 53: Set B percentage removal of *U. linza* sporelings after 7 days growth and at 18, 67, and 110 kPa spinjet pressures

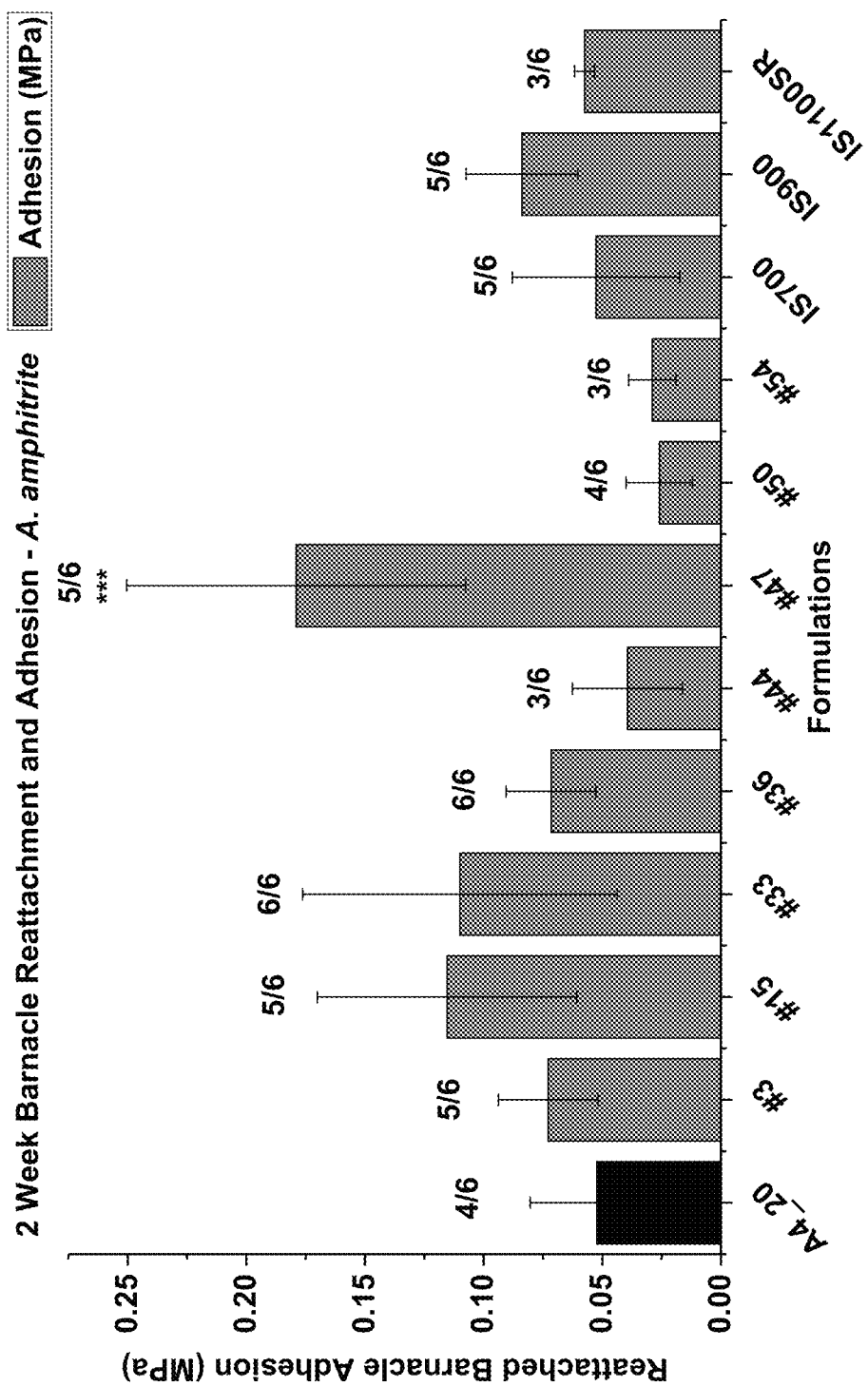
FIG. 54: Reattachment and adhesion values recorded from experimental coatings selected for further macrofouling analysis shown in Table 4. Adhesion strength is shown in MPa, with the number of barnacles reattached over total number of barnacles shown above the bars. *** pertains to a broken barnacle basal plate.

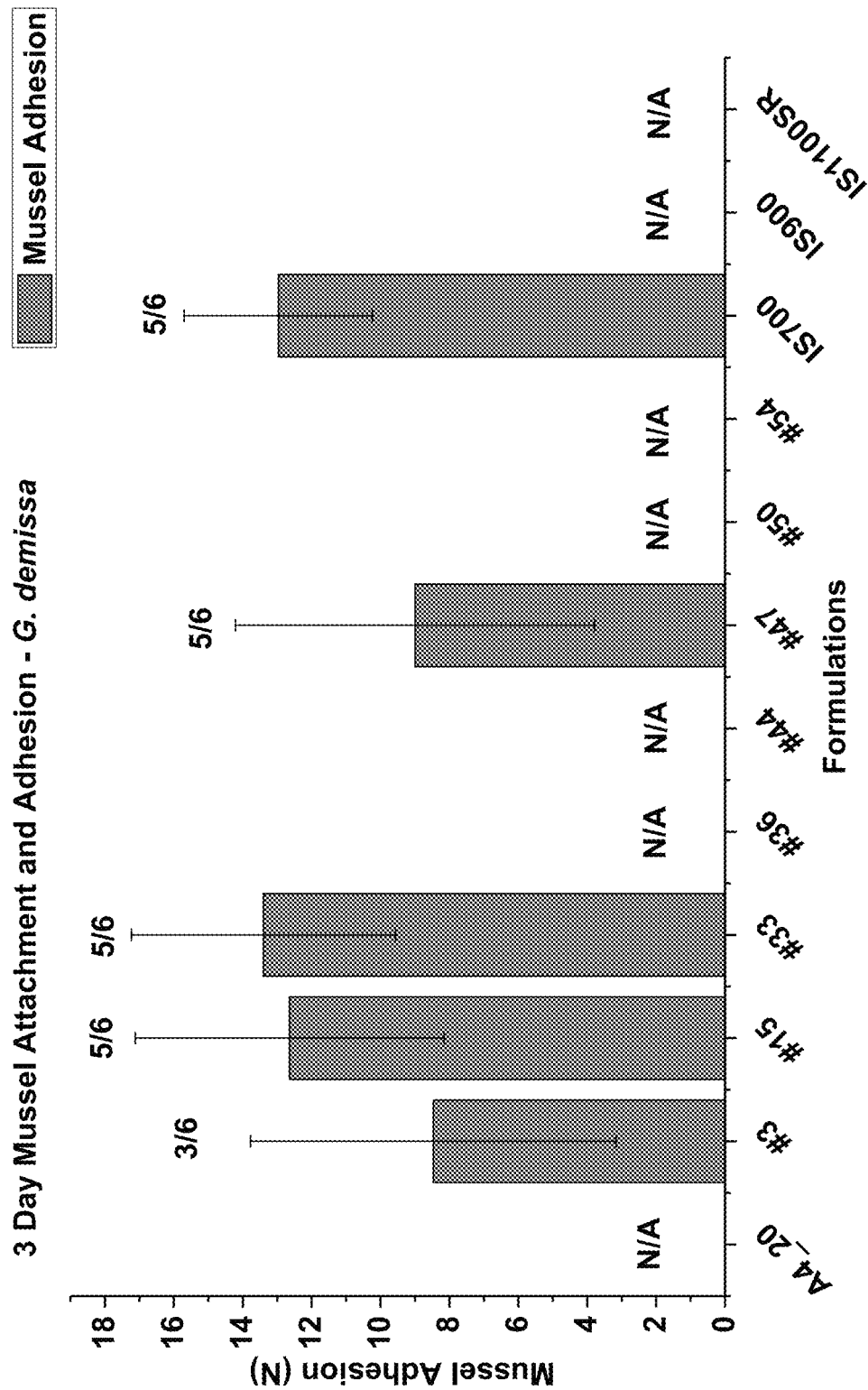
FIG. 55: Mussel adhesion (N) for selected experimental coatings for macrofouling shown in Table 4. The number of attached mussels over total number of mussels is shown above the bars. N/A pertains to no mussels attaching to the surface of the coatings.

USE OF AMPHIPHILIC SURFACE MODIFYING ADDITIVES TO IMPROVE PERFORMANCE OF SILOXANE-POLYURETHANE FOULING-RELEASE COATINGS

CROSS-REFERENCE TO RELATED APPLICATIONS

This application claims priority to U.S. Provisional Application Nos. 62/653,654, filed Apr. 6, 2018, the disclosure of which is incorporated herein by reference.

STATEMENT OF U.S. GOVERNMENT SUPPORT

This invention was made with government support under grant N00014-16-1-3064 awarded by the Office of Naval Research (ONR). The U.S. government has certain rights in the invention.

BACKGROUND

The undesirable accumulation of marine organisms on structures submerged in seawater is referred to as marine biofouling (Yebra et al., 2004). The process of marine biofouling may involve over 4000 different marine organisms with varying sizes and modes of adhesion, which makes dealing with this phenomenon very difficult (Lejars et al., 2012), (Hellio and Yebra, 2009), (Yebra et al., 2004). As a structure is submersed in seawater, proteins, nutrients, and other small molecules settle on the surface and form a conditioning film (Lejars et al., 2012). From this point, a highly complex, dynamic process of marine organism settlement is observed. Marine bacteria and other unicellular organisms are typically the first of many different organisms to adhere via reversible electrostatic mechanisms, and later, covalent interactions which ensure a permanent attachment to the substrate (Callow and Callow, 2011). Slightly larger organisms such as diatoms and algae spores are then seen to settle and adhere more readily to the substrate introducing even more diversity to complex biofilm formation. Lastly, larvae of barnacles, mussels, and tubeworms preferentially settle on substrates composed of these micro-foulant rich biofilms (Callow and Callow, 2011). Marine biofouling is often viewed as a linear chain of events, with biofilm and micro-foulant settlement occurring within seconds-days, and macro-foulant accumulation anywhere from days-months (Lejars et al., 2012). However, some organisms such as the barnacle *A. amphitrite* and green algae *U. linza* are shown to settle and adhere to clean or newly submersed substrates, making the process of marine biofouling harder to predict, and consequently, defend against (Lejars et al., 2012).

Aside from the negative aesthetic effects of marine biofouling, a major problem that needs to be addressed is the effect on overall performance marine vessels. The accumulation of marine organisms on ship hulls causes large decreases in ship maneuverability and speed (Schultz et al., 2011), (Callow and Callow, 2002). This leads to an increase in fuel consumption, and in turn, an increase in the production of harmful greenhouse gases. Additionally, it is estimated that marine biofouling potentially costs upwards of $1 billion for the US Navy, making research into combating this problem of great economic importance (Callow and Callow, 2002). Some of the earliest methods used over 2000 years ago include the use of lead and copper alloy sheathing on hulls largely consisting of wood (Hellio and Yebra, 2009). But as ship and material design advanced, iron ships began to dominate marine travel, requiring newer methods for the defense against marine biofouling. At the advent of the 20$^{th}$ century, petroleum based resin systems were being developed, and between 1960-1970s, triorganotin biocides such as tributyltin were incorporated into self-polishing copolymer coatings systems and greatly improved antifouling performance (Hellio and Yebra, 2009), (Yebra et al., 2004). However, the inadvertent ecological effects of these TBT-containing coatings proved harmful to marine environments resulting in restrictions on use and eventually a complete ban of these tin-containing coatings by the International Maritime Organization (IMO) in 2003 (Yebra et al., 2004). Although the use of inorganic and organic biocides in coatings systems is still the preferred method to combat biofouling, development of non-toxic, non-biocide containing anti-fouling (AF)/fouling-release (FR) coatings is now a major area of research and development.

Traditional FR coatings systems are mainly elastomers consisting of poly(dimethylsiloxane) (PDMS), or other silicones, as well as fluoropolymer based systems which result in low surface energy coatings (Lejars et al., 2012). These low surface energy coatings systems do not allow marine organisms to adhere strongly, and under hydrodynamic shear forces, organisms can be removed with little effort (Lejars et al., 2012). However, due to issues with mechanical durability, plus the need for a tie-coat to achieve proper adhesion to the substrate, superior FR coatings systems are being developed (Lejars et al., 2012), (Yebra et al., 2004). At North Dakota State Universities' Department of Coatings and Polymeric Materials, the Webster group has developed siloxane-polyurethane (SiPU) FR coatings. These SiPU coatings incorporate PDMS and polyurethane segments and exhibit self-stratifying behavior during curing. PDMS is present on the surface, due to its low surface energy, and offers FR performance comparable to commercially available FR coatings (Majumdar et al., 2007), (Webster et al., 2011), (Webster and Ekin, 2010). The coating composition consists of the polyurethane bulk, which offers superior adhesion and mechanical properties compared to conventional elastomeric coating systems. These SiPU FR coatings showed similar, in some cases superior, FR performance to commercial FR coatings (Ekin and Webster, 2007), (Bodkhe et al., 2012), (Sommer et al., 2010).

Much progress has been made developing FR coatings primarily based upon hydrophobic, low surface energy moieties with promising results. However, many marine organisms still find a way to settle and adhere to these coatings, leading to detrimental effects. Since the primary method of adhesion for marine organisms consists of the secretion of a proteinaceous substance that can later crosslink/solidify, methods in which to impart protein resistance to FR coatings systems are being investigated (Krishnan et al., 2006), (Martinelli et al., 2016), (Callow and Callow, 2011). Amphiphilic FR coatings contain chemical moieties that interfere with protein adhesion and are generally hydrophilic in nature. In this respect, poly(ethylene) glycol (PEG) is one of the most studied and has a low interfacial energy between water (<5 mN/m), forming a "hydration layer" of water molecules making it thermodynamically unfavorable for biomolecules, like proteins, to disrupt this layer, thus resisting adsorption (Andrade et al.). Other examples of these hydrophilic moieties include zwitterionic poly(sulfobetaine) methacrylate (pSBMA), polysaccharides, and peptide-mimic polymers (Martinelli et al., 2016). A major method of incorporating these moieties is that of copolymer networks, forming regions of heterogeneity. These systems typically include a hydrophobic backbone providing mechanical strength with side chains of the desired hydrophilic group, with these chains often being copolymers between fluoroalkyl or silicone containing groups (Callow and Callow, 2011), (Krishnan et al., 2006; Martinelli et al., 2016). Although these amphiphilic coatings systems offer positive FR performance, it is difficult to balance the amount of hydrophilic/hydrophobic content without compromising the coatings mechanical properties. To avoid this problem, amphiphilicity can also be achieved through incorporation of non-reactive, surface modifying amphiphilic additives (Martinelli et al., 2016).

The Grunlan research group at Texas A&M University's Department of Biomedical Engineering successfully synthesized surface modifying additives (SMA's) consisting of poly(ethylene) oxide (PEO) and oligomeric poly(dimethylsiloxane) (ODMS). The non-reactive SMA's varied in ODMS length, length of the PEO chain, and whether or not the SMA's were di- or triblock copolymers (Rufin et al., 2017). Small percentages of the additives compared to the bulk composition were blended with an RTV silicone elastomer. It was hypothesized that the SMA's would migrate to the air/solution interface with the hydrophilic PEO groups extending and presenting a protein resistant surface (Rufin et al., 2017). Water contact angle measurements showed rapid surface restructuring due to a drop in contact angle within 5 minutes to values <40°, pointing to a highly hydrophilic surface. Additionally, Human Fibrinogen (HF) absorption assays showed very little absorption in comparison to an unmodified silicone elastomer, concluding that a highly protein resistant surface was achieved through amphiphilic non-reactive SMA's (Rufin et al., 2017).

SUMMARY OF THE INVENTION

The invention relates to the use of non-reactive surface modifying amphiphilic additives (SMAA's) in a siloxane-polyurethane coating composition. Thus, the invention relates to a curable coating composition comprising, consisting essentially of, or consisting of: (1) the SMAA's of the invention; and (2) the siloxane-polyurethane coating composition of the invention.

The SMAA's used in the invention comprise, consist essentially of, or consist of a polydimethyl siloxane (PDMS) backbone to which is attached poly(ethylene glycol) chains. The siloxane-polyurethane coating composition used in the invention comprises, consists essentially of, or consists of: (1) an aminopropyl terminated polydimethyl siloxane; (2) a polyol; (3) a polyisocyanate crosslinker; and (4) optionally, additional additives, such as pigments, curing catalysts, pot-life extenders, and solvents.

The invention also relates to methods of making and using the curable coating composition of the invention.

The invention further relates to objects or substrates coated with the curable coating composition of the invention, which may then be cured to for a coating.

The invention also relates to a cured coating composition of the invention.

The invention also relates to a marine fouling-release coating comprising, consisting essentially of, or consisting of the curable coating composition of the invention.

The invention also relates to a method for reducing or preventing biofouling of a surface exposed to an aqueous environment comprising, consisting essentially of, or consisting of the steps of: (1) coating the surface with the curable coating composition of the invention to form a coated surface, and (2) curing the coating composition on the coated surface.

BRIEF DESCRIPTION OF THE FIGURES

FIG. 1 depicts a general reaction scheme for the synthesis of allyl terminated polyethylene glycol monomethyl ether.

FIG. 2 depicts a general reaction scheme for SMAA's synthesis.

FIG. 3 depicts, top (left to right): copolymer of methylhydro-dimethyl functional siloxane, polymethylhydrosiloxanes; bottom: D'4 hydride functional cyclosiloxane, X=grafted PEG.

FIG. 4 shows a $^{1}$H-NMR spectrum of APEG 750 with peak assignments.

FIG. 5 shows an FT-IR spectrum of APEG 750.

FIG. 6 shows a $^{1}$H-NMR spectrum for the SMAA 991-g-350.

FIG. 7 shows an FT-IR spectrum for the SMAA 991-g-350.

FIG. 8 shows the water contact angles for PMHS-g-PEG250 1%.

FIG. 9 shows the water contact angles for PMHS-g-PEG250 5%.

FIG. 10 shows the water contact angles for PMHS-g-PEG250 10%.

FIG. 11 shows the water contact angles for PMHS-g-PEG350 1%.

FIG. 12 shows the water contact angles for PMHS-g-PEG350 5%.

FIG. 13 shows the water contact angles for PMHS-g-PEG350 10%.

FIG. 14 shows the water contact angles for PMHS-g-PEG750 1%.

FIG. 15 shows the water contact angles for PMHS-g-PEG750 5%.

FIG. 16 shows the water contact angles for PMHS-g-PEG750 10%.

FIG. 17 shows the water contact angles for PMHS-g-PEG1100 1%.

FIG. 18 shows the water contact angles for PMHS-g-PEG1100 5%.

FIG. 19 shows the water contact angles for PMHS-g-PEG1100 5% and A4_20 SiPU control.

FIG. 20 shows the Leachate toxicity for *N. incerta* on coatings formulations 1-36 from Table 3.

FIG. 21 shows the Leachate toxicity for *N. incerta* on coatings formulations 37-65 from Table 3.

FIG. 22 shows the attachment of *N. incerta* cells on the coatings after two hours of settlement time for coatings formulations 1-36 from Table 3.

FIG. 23 shows the attachment of *N. incerta* cells on the coatings after two hours of settlement time for coatings formulations 37-65 from Table 3.

FIG. 24 shows the percent removal of *N. incerta* cells after water-jetting at 10 psi for coatings formulations 1-36 from Table 3.

FIG. 25 shows the percent removal of *N. incerta* cells after water-jetting at 10 psi for coatings formulations 37-65 from Table 3.

FIG. 26 shows the percent removal of *N. incerta* cells after water-jetting at 20 psi for coatings formulations 1-36 from Table 3.

FIG. 27 shows the percent removal of *N. incerta* cells after water-jetting at 20 psi for coatings formulations 37-65 from Table 3.

FIG. 28 shows the amount of N. incerta cells remaining after water-jetting at 10 psi for coatings formulations 1-36 from Table 3.

FIG. 29 shows the amount of N. incerta cells remaining after water-jetting at 10 psi for coatings formulations 37-65 from Table 3.

FIG. 30 shows the amount of N. incerta cells remaining after water-jetting at 20 psi for coatings formulations 1-36 from Table 3.

FIG. 31 shows the amount of N. incerta cells remaining after water-jetting at 20 psi for coatings formulations 37-65 from Table 3.

FIG. 32 shows the leachate toxicity of (solution growth) of C. lytica for coatings formulations 1-36 from Table 3.

FIG. 33 shows the leachate toxicity (solution growth) of C. lytica for coatings formulations 37-65 from Table 3.

FIG. 34 shows the leachate toxicity (biofilm growth) of C. lytica for coatings formulations 1-36 from Table 3.

FIG. 35 shows the leachate toxicity (biofilm growth) of C. lytica for coatings formulations 37-65 from Table 3.

FIG. 36 shows the surface coverage on of C. lytica for coatings formulations 1-36 from Table 3.

FIG. 37 shows the surface coverage of C. lytica for coatings formulations 37-65 from Table 3.

FIG. 38 shows the settlement of C. lytica on the coatings' surfaces of formulations 1-36 from Table 3.

FIG. 39 shows the settlement of C. lytica on the coatings' surfaces of formulations 37-65 from Table 3.

FIG. 40 shows the percent removal of C. lytica after water-jetting at 10 psi for coatings formulations 1-36 from Table 3.

FIG. 41 shows the percent removal of C. lytica after water-jetting at 10 psi for coatings formulations 37-65 from Table 3.

FIG. 42 shows the percent removal of C. lytica after water-jetting at 20 psi for coatings formulations 1-36 from Table 3.

FIG. 43 shows the percent removal of C. lytica after water-jetting at 20 psi for coatings formulations 37-65 from Table 3.

FIG. 44 shows the amount of C. lytica biofilm remaining after water-jetting at 10 psi for coatings formulations 1-36 from Table 3.

FIG. 45 shows the amount of C. lytica biofilm remaining after water-jetting at 10 psi for coatings formulations 37-65 from Table 3.

FIG. 46 shows the amount of C. lytica biofilm remaining after water-jetting at 20 psi for coatings formulations 1-36 from Table 3.

FIG. 47 shows the amount of C. lytica biofilm remaining after water-jetting at 20 psi for coatings formulations 37-65 from Table 3.

FIG. 48 shows the biomass generation of U. linza sporelings that were grown in leachates (6 replicates) from the experimental coatings in set A leachate toxicity. Biomass is represented as relative fluorescent units (RFU) measured of extracted chlorophyll.

FIG. 49 shows the biomass generation of U. linza sporelings on experimental coatings in set A after seven days growth. Biomass is represented as relative fluorescent units (RFU) measured of extracted chlorophyll.

FIG. 50 shows the percentage removal of U. linza sporelings from experimental coatings of set A after seven days growth and using spinjet pressures of 18, 67, and 110 kPa.

FIG. 51 shows the set B biomass generation of U. linza sporelings in leachate toxicity assay.

FIG. 52 shows the set B biomass generation of U. linza sporelings during sporeling growth assay.

FIG. 53 shows the set B percentage removal of U. linza sporelings after seven days growth and at 18, 67, and 110 kPa spinjet pressures.

FIG. 54 shows the reattachment and adhesion values recorded from experimental coatings selected for further macrofouling analysis shown in Table 4. Adhesion strength is shown in MPa, with the number of barnacles reattached over total number of barnacles shown above the bars. *** pertains to a broken barnacle basal plate.

FIG. 55 shows the mussel adhesion (N) for selected experimental coatings for macrofouling shown in Table 4. The number of attached mussels over total number of mussels is shown above the bars. N/A pertains to no mussels attaching to the surface of the coating.

DETAILED DESCRIPTION

The invention relates to the use of surface modifying amphiphilic additives (SMAA's) in a siloxane-polyurethane coating composition in order to improve the FR performance towards multiple organisms present in the marine environment. Thus, the invention relates to a curable coating composition comprising, consisting essentially of, or consisting of: (1) a SMAA; and (2) a siloxane-polyurethane coating composition of the invention. Preferably, the SMAA is incorporated into the siloxane-polyurethane coating composition in an amount ranging from 0.1-20 wt. % (of the total composition weight), such as, for example, 1, 5, or 10 wt. %.

The SMAA's used in the invention comprise, consist essentially of, or consist of a polydimethyl siloxane (PDMS) backbone to which is attached poly(ethylene glycol) chains. The SMAA's used may comprise, consist essentially of, or consist of the reaction product of: (1) at least one Si—H functional siloxane; (2) at least one allyl-functional poly (ethylene glycol) monomethyl ether; and (3) optionally, at least one catalyst, such as, for example, Karstedt's catalyst.

The Si—H functional siloxane may be a 100 mol % Si—H polymethylhydrosiloxane, a copolymer of methylhydrosiloxane-dimethylsiloxane of varying mol % Si—H, a tetra functional Si—H cyclosiloxane, and mixtures thereof. Preferably, the 100 mol % Si—H polymethylhydrosiloxane is at least one Si—H trimethylsiloxyl terminated polymethylhydrosiloxane, and has a molecular weight ranging from 1400-1800 g/mol, 1800-2100 g/mol, or 2100-2400 g/mol. Preferably, the copolymer of methylhydrosiloxane-dimethylsiloxane of varying mol % Si—H is at least one methylhydrosiloxane-dimethylsiloxane copolymer, and has 25-35 mol % Si—H and a molecular weight ranging from 1900-2000 g/mol, or 45-55 mol % Si—H and a molecular weight ranging from 900-1200 g/mol. Preferably, the tetra functional Si—H cyclosiloxane is Si—H functional 1,3,5,7-tetramethylcyclotetrasiloxane (D'4).

The allyl functional poly(ethylene glycol) monomethyl ether may be selected from at least one allyl-terminated poly(ethylene glycol) monomethyl ether. The allyl-terminated polyethylene glycol monomethyl ether may comprise, consist essentially of, or consist of the reaction product of a hydroxyl-terminated poly(ethylene glycol) monomethyl ether and allyl bromide. The allyl-terminated polyethylene glycol monomethyl ether may have a molecular weight ranging from about 200 g/mol to about 1,500 g/mol, such as 250 g/mol, 350 g/mol, 750 g/mol, or 1,100 g/mol.

Preferably, the Si—H functional siloxane and the allyl functional poly(ethylene glycol) monomethyl ether are present in a ratio of 1.0:1.0.

The siloxane-polyurethane coating composition used in the invention comprises, consists essentially of, or consists of: (1) an aminopropyl terminated polydimethyl siloxane; (2) a polyol; (3) a polyisocyanate crosslinker; and (4) optionally, additional additives, such as pigments, curing catalysts, pot-life extenders, and solvents. Exemplary siloxane-polyurethane coating compositions that can be used in the invention are disclosed in U.S. Pat. Nos. 7,989,074; 8,299,200; 8,604,152; 9,169,359; WO 2016/196565, each of which is incorporated herein by reference.

The aminopropyl terminated polydimethyl siloxane may be at least one aminopropyl-terminated polydimethyl siloxane. The aminopropyl terminated polydimethyl siloxane may also have a molecular weight of 20,000 g/mol.

The polyol may be an acrylic polyol, a polyester polyol, a polycarbonate polyol, a polyether polyol, or mixtures thereof. The polyol may also not be an acrylic polyol or a polyether polyol.

The polyisocyanate crosslinker may be a polyisocyanate derived from isophorone diisocyanate, hexamethylene diisocyanate, or methylene diphenyl diisocyanate.

Preferably, the polyisocyanate crosslinker is a polyisocyanate derived from isophorone diisocyanate and the polyol is an acrylic polyol. The polyisocyanate crosslinker may also consist of a polyisocyanate derived from methylene diphenyl diisocyanate and the polyol consists of a polyether polyol.

The invention also relates to methods of using the curable coating composition of the invention. For example, the invention relates to methods of making a cured coating composition using the curable coating composition of the invention.

The invention further relates to objects or substrates coated with the curable coating composition of the invention, which may then be cured to for a coating.

The invention also relates to a cured coating composition of the invention.

The invention also relates to a marine fouling-release coating comprising, consisting essentially of, or consisting of the curable coating composition of the invention.

The invention also relates to a method for reducing or preventing biofouling of a surface exposed to an aqueous environment comprising, consisting essentially of, or consisting of the steps of: (1) coating the surface with the curable coating composition of the invention to form a coated surface, and (2) curing the coating composition on the coated surface.

EXAMPLES

Materials

Solvents used in experiments included tetrahydrofuran (THF), toluene, chloroform, acetone, and methyl amyl ketone (MAK) purchased from Sigma Aldrich with the drying of solvents facilitated by 4 Å molecular sieves also purchased from Sigma Aldrich. 750 molecular weight hydroxyl terminated polyethylene glycol monomethyl ether, allyl bromide, a 60% w/w dispersion of sodium hydride in mineral oil, and anhydrous magnesium sulfate used in the synthesis of 750 molecular weight allyl terminated polyethylene glycol monomethyl ether (750 MW APEG) were purchased from Sigma Aldrich. Three other molecular weight allyl terminated polyethylene glycol monomethyl ethers (Polyglykol 250 AM, Polyglykol 350 AM, and Polyglykol 1000 AM) were provided by Clariant. Karstedt's Catalyst (Pt ~2% in xylenes), acetylacetone, d-chloroform 1% v/v TMS, and dibutyltin diacetate (DBTDAc) were also purchased from Sigma Aldrich. Potassium bromide crystal optic disks were used during FT-IR experiments and were purchased from Alfa Aesar. Three different 100 mol % Si—H trimethylsiloxyl terminated polymethylhydrosiloxanes (PMHS) with molecular weight ranges (HMS-991: 1400-1800, HMS-992:1800-2100, and HMS-993: 2100-2400 g/mol) were purchased from Gelest Inc. Additionally two different methylhydrosiloxane-dimethylsiloxane copolymers with different molecular weights and mol % of Si—H functionality (HMS-301: 25-35 mol % Si—H, 1900-2000 g/mol, and HMS-501: 45-55 mol % Si—H, 900-1200 g/mol), along with Si—H functional 1,3,5,7-tetramethylcyclotetrasiloxane (D'4) were purchased from Gelest Inc. Polyisocyanate Desmodur Z 4470 BA was provided by Covestro LLC. An 80% butyl acrylate and 20% 2-hydroxyethyl acrylate acrylic polyol, 50% by wt. in toluene, was synthesized via free-radical polymerization. 20,000 g/mol aminopropyl-terminated polydimethyl siloxane (APT-PDMS) was synthesized via a ring-opening equilibration reaction. More in-depth descriptions of acrylic polyol and APT-PDMS syntheses can be found in (Bodkhe et al., 2012).

Intersleek 700 (IS 700), Intersleek 900 (IS 900), Intersleek 1100SR (IS 1100SR), and Intergard 264 were provided by AkzoNobel International Paint. Hempasil X3 was provided by Hempasil, and Silastic T2 silicone elastomer was provided by Dow Corning. Aluminum panels (3"×6" A 3003 H14) purchased from Q-Lab were sandblasted and primed with Intergard 264 via air-assisted spray before coating application. Falcon sterile polystyrene 24-multiwell plates were purchased from VWR International.

To synthesize the SMAA's, three different siloxane structures were chosen: a 100 mol % Si—H polymethylhydrosiloxanes (PMHS) of varying molecular weight, a copolymer of methylhydrosiloxane-dimethylsiloxane of varying mol % Si—H, and tetra functional Si—H cyclosiloxane. Hydrosilylation was then performed between allyl functional poly(ethylene glycol) monomethyl ethers of 250, 350, 750, and 1100 molecular weights and the selected Si—H functional siloxanes using Karstedt's catalyst (1.0:1.0 eq). A total of 24 different additives were synthesized and incorporated into siloxane-polyurethane formulations (A4_20) at 1, 5, and 10 wt. % total formulation, cast on 3"×6" primed aluminum panels, cured, and left for 1 week. To observe surface restructuring, water contact angle analysis was performed before and after water immersion for 28 days in circulating artificial seawater tanks. After water immersion, small disks were punched from the coated panels and glued in plastic 24 well plates. These well plates were then used in laboratory biological assays to assess the AF/FR performance towards the marine bacterium *Cellulophaga lytica* and microalgae *Navicula incerta*.

Synthesis of 750 MW APEG

The effects of surface modifying amphiphilic additives when incorporated into siloxane-polyurethane (SiPU) fouling release (FR) coatings involves the usage of allyl-terminated polyethylene glycol monomethyl ethers (APEG). Four different molecular weight APEG monomethyl ethers (250, 350, 750, 1100) were selected, with molecular weights 250, 350, and 1100 being provided by Clariant. Therefore, a 750 MW APEG monomethyl ether was synthesized following previous literature described in FIG. 1. First, 750 MW hydroxyl PEG monomethyl ether (45.78 g) was added to a 3-neck 500 mL RB-flask and dissolved in anhydrous THF (~160 mL). To a 20 mL glass vial, NaH 60% w/w dispersion in mineral oil (2.9212 g) was added, followed by ~10 mL of anhydrous THF. This NaH/THF mixture was added dropwise to the reaction mixture, which was being stirred and cooled in an ice bath to ~0° C. After dropwise addition, the reaction mixture was stirred for 2 hours at ~0° C. A mixture of allyl bromide (8.7520 g) in 80 mL of anhydrous THF was then added dropwise to the reaction mixture, warmed to RT, and stirred for 24 hours. The reaction mixture was then filtered to remove any precipitate and NaH residue, and any THF was removed under reduced pressure. This yielded a colorless/yellow oil that was dissolved in water (150-200 mL) and extracted with 3×75 mL of toluene to remove unreacted alcohol. The desired product was then extracted into chloroform (3×200 mL), dried with anhydrous magnesium sulfate, filtered, and solvent removed under reduced pressure. FT-IR and $^1$H-NMR were performed to detect the presence of the allyl group and disappearance of hydroxyl.

Synthesis of SMAA's (Surface Modifying Amphiphilic Additives)

An experimental design for the different additives was developed. A total of 24 different additives were synthesized using combinations of Si—H functional siloxanes and varying molecular weights of allyl PEG which is summarized in Table 1 below. Sample names for these additives begin with the PMHS, followed by the graft/g co-polymer notation, ending with the molecular weight APEG used (Ex: 991-graft-350).

TABLE 1

Summary of Synthesized Additives

| Siloxanes | M.W. (g/mol) | Functionality | Allyl PEG |
|---|---|---|---|
| HMS-991 | 1400-1800 | 100 mol % Si—H | 4 different |
| HMS-992 | 1800-2100 | 100 mol % Si—H | M.W.: 250, |
| HMS-993 | 2100-2400 | 100 mol % Si—H | 350, 750, |
| HMS-301 | 1900-2000 | 25-35 mol % Si—H | and 1100 |
| HMS-501 | 900-1200 | 45-55 mol % Si—H | |
| D'4 | 240.51 | Cyclosiloxane, Si—H functionality = 4 | |

These additives were synthesized via hydrosilylation using a solution of Karstedt's catalyst (Pt ~2%) with 1.0:1.0 equivalents of PMHS and APEG (Rufin et al., 2017), described in FIG. 2. The following is a general procedure used to synthesize 991-graft-350, as well as the other SMAA's. The 350 MW APEG was dried in an oven at >100° C. for at least 1 hour before addition. A 100 mL RB-flask was equipped with a thermocouple, nitrogen inlet, and Teflon coated stir bar. To this flask, HMS-991 (0.9722 g), APEG350 (5.0080 g), and ~30 mL of anhydrous toluene was added. The reaction mixture was allowed to homogenize for 15 minutes whilst heating to 80° C. A solution of Karstedt's catalyst in anhydrous toluene was prepared by adding 25 µL (0.0214 g) of the catalyst to 5 mL of anhydrous toluene. Once the temperature of the reaction mixture had reached ~80° C., the catalyst solution was added dropwise, waiting until bubble formation had stopped between additions. This reaction was stirred for at least 16 hours, and then ~2 small scoops of activated charcoal (60 mesh) was added, with the temperature increased to 90° C. for 2 hours. After 2 hours, the reaction mixture was cooled to RT, filtered, and any toluene was removed under reduced pressure. FT-IR and $^1$H-NMR were performed to confirm the disappearance of the double bond from APEG, the disappearance of the Si—H bond from the PMHS, and the appearance of new proton peaks from the PEG chains. These additives all had as much solvent removed under reduced pressure before addition into the siloxane-polyurethane coating formulations. FIG. 3 details the different graft copolymers formed from these hydrosilylation reactions.

Coating Formulation

Once all SMAA's had been synthesized, formulations were made incorporating these additives into NDSU's A4_20 SiPU FR coating. Three different loading percentages, 1, 5, and 10% by wt. of total SiPU formulation were considered for a total of 72 formulations. A summary of these formulations is described in Table 2 below. First, 3"×6" aluminum panels were sandblasted and primed with Intergard 264 via air-assisted spray. A general procedure used for all 72 formulations is as follows. For 991-g-350 at 1 wt. % of total formulation, 20K g/mol APT-PDMS (1.1298 g), acetylacetone (0.5297 g), and acrylic polyol (5.5377 g) were added to a 20 mL glass vial, vortexed for 3-5 minutes, and then stirred for 24 hours at RT. The next day, isocyanate Desmodur Z 4470 BA (1.8428 g), and a solution of DBT-DAc 1% in MAK (0.2670) were added to the vial, vortexed, and then stirred for 30 minutes, after which 991-g-350 (0.0859 g) was added, vortexed again and stirred for an additional 30 minutes. The formulations were then cast on 2 3"×6" primed aluminum panels using a #80 Gardco wire draw down bar. These panels were left at ambient conditions for 24 hours, then cured at 80° C. for 45 minutes. After curing, 1 week was allowed before water contact angle analysis. Additionally, a formulation consisting of the siloxane-polyurethane without the addition of SMAA (A4_20) was cast on 2 primed aluminum panels with omission of any additive.

TABLE 2

Formulation compositions where each additive described in Table 1 is formulated at 1, 5, and 10 wt. % of total formulation weight.

| Formulation # | Sample ID | Siloxane Backbone | PEG Molecular Weight g/mol | Wt. % Additive |
|---|---|---|---|---|
| 1 | 991-g-250-1% | HMS-991 | 250 | 1 |
| 2 | 991-g-250-5% | HMS-991 | 250 | 5 |
| 3 | 991-g-250-10% | HMS-991 | 250 | 10 |
| 4 | 992-g-250-1% | HMS-992 | 250 | 1 |
| 5 | 992-g-250-5% | HMS-992 | 250 | 5 |
| 6 | 992-g-250-10% | HMS-992 | 250 | 10 |
| 7 | 993-g-250-1% | HMS-993 | 250 | 1 |
| 8 | 993-g-250-5% | HMS-993 | 250 | 5 |
| 9 | 993-g-250-10% | HMS-993 | 250 | 10 |
| 10 | 301-g-250-1% | HMS-301 | 250 | 1 |
| 11 | 301-g-250-5% | HMS-301 | 250 | 5 |
| 12 | 301-g-250-10% | HMS-301 | 250 | 10 |
| 13 | 501-g-250-1% | HMS-501 | 250 | 1 |
| 14 | 501-g-250-5% | HMS-501 | 250 | 5 |
| 15 | 501-g-250-10% | HMS-501 | 250 | 10 |
| 16 | D'4-g-250-1% | D'4 | 250 | 1 |
| 17 | D'4-g-250-5% | D'4 | 250 | 5 |
| 18 | D'4-g-250-10% | D'4 | 250 | 10 |
| 19 | 991-g-350-1% | HMS-991 | 350 | 1 |
| 20 | 991-g-350-5% | HMS-991 | 350 | 5 |
| 21 | 991-g-350-10% | HMS-991 | 350 | 10 |
| 22 | 992-g-350-1% | HMS-992 | 350 | 1 |
| 23 | 992-g-350-5% | HMS-992 | 350 | 5 |
| 24 | 992-g-350-10% | HMS-992 | 350 | 10 |
| 25 | 993-g-350-1% | HMS-993 | 350 | 1 |
| 26 | 993-g-350-5% | HMS-993 | 350 | 5 |
| 27 | 993-g-350-10% | HMS-993 | 350 | 10 |
| 28 | 301-g-350-1% | HMS-301 | 350 | 1 |
| 29 | 301-g-350-5% | HMS-301 | 350 | 5 |
| 30 | 301-g-350-10% | HMS-301 | 350 | 10 |
| 31 | 501-g-350-1% | HMS-501 | 350 | 1 |
| 32 | 501-g-350-5% | HMS-501 | 350 | 5 |
| 33 | 501-g-350-10% | HMS-501 | 350 | 10 |
| 34 | D'4-g-350-1% | D'4 | 350 | 1 |
| 35 | D'4-g-350-5% | D'4 | 350 | 5 |

TABLE 2-continued

Formulation compositions where each additive described in Table 1 is formulated at 1, 5, and 10 wt. % of total formulation weight.

| Formulation # | Sample ID | Siloxane Backbone | PEG Molecular Weight g/mol | Wt. % Additive |
|---|---|---|---|---|
| 36 | D'4-g-350-10% | D'4 | 350 | 10 |
| 37 | 991-g-750-1% | HMS-991 | 750 | 1 |
| 38 | 991-g-750-5% | HMS-991 | 750 | 5 |
| 39 | 991-g-750-10% | HMS-991 | 750 | 10 |
| 40 | 992-g-750-1% | HMS-992 | 750 | 1 |
| 41 | 992-g-750-5% | HMS-992 | 750 | 5 |
| 42 | 992-g-750-10% | HMS-992 | 750 | 10 |
| 43 | 993-g-750-1% | HMS-993 | 750 | 1 |
| 44 | 993-g-750-5% | HMS-993 | 750 | 5 |
| 45 | 993-g-750-10% | HMS-993 | 750 | 10 |
| 46 | 301-g-750-1% | HMS-301 | 750 | 1 |
| 47 | 301-g-750-5% | HMS-301 | 750 | 5 |
| 48 | 301-g-750-10% | HMS-301 | 750 | 10 |
| 49 | 501-g-750-1% | HMS-501 | 750 | 1 |
| 50 | 501-g-750-5% | HMS-501 | 750 | 5 |
| 51 | 501-g-750-10% | HMS-501 | 750 | 10 |
| 52 | D'4-g-750-1% | D'4 | 750 | 1 |
| 53 | D'4-g-750-5% | D'4 | 750 | 5 |
| 54 | D'4-g-750-10% | D'4 | 750 | 10 |
| 55 | 991-g-1100-1% | HMS-991 | 1100 | 1 |
| 56 | 991-g-1100-5% | HMS-991 | 1100 | 5 |
| 57 | 991-g-1100-10% | HMS-991 | 1100 | 10 |
| 58 | 992-g-1100-1% | HMS-992 | 1100 | 1 |
| 59 | 992-g-1100-5% | HMS-992 | 1100 | 5 |
| 60 | 992-g-1100-10% | HMS-992 | 1100 | 10 |
| 61 | 993-g-1100-1% | HMS-993 | 1100 | 1 |
| 62 | 993-g-1100-5% | HMS-993 | 1100 | 5 |
| 63 | 993-g-1100-10% | HMS-993 | 1100 | 10 |
| 64 | 301-g-1100-1% | HMS-301 | 1100 | 1 |
| 65 | 301-g-1100-5% | HMS-301 | 1100 | 5 |
| 66 | 301-g-1100-10% | HMS-301 | 1100 | 10 |
| 67 | 501-g-1100-1% | HMS-501 | 1100 | 1 |
| 68 | 501-g-1100-5% | HMS-501 | 1100 | 5 |
| 69 | 501-g-1100-10% | HMS-501 | 1100 | 10 |
| 70 | D'4-g-1100-1% | D'4 | 1100 | 1 |
| 71 | D'4-g-1100-5% | D'4 | 1100 | 5 |
| 72 | D'4-g-1100-10% | D'4 | 1100 | 10 |

FT-IR/$^1$H-NMR Instrumentation

As previously stated, once synthesis of both 750 MW APEG and PMHS-graft-PEG copolymers had finished, FT-IR and $^1$H-NMR spectroscopy was utilized to confirm their structures. A Thermo Scientific Nicolet 8700 FT-IR spectrometer was used, with the sample being spread over a KBr crystal optic disk to obtain the spectrums. To obtain $^1$H-NMR spectrums, a small amount of sample was added to a vial and dissolved with d-chloroform 1% v/v TMS. This solution was added to NMR sample tubes and a 400 MHz JEOL spectrometer was utilized to obtain spectrums.

Water Contact Angle Analysis

To observe possible surface restructuring caused by SMAA's, water contact angle measurements were gathered for all formulations using a First Ten Angstroms dynamic contact angle analyzer, with non-spherical fit/sessile drop profile modes. This was achieved by taking one 3"×6" coated panel and placing a small droplet of DI water on the middle (bulk) of the coating. Contact angles were taken at 2-minute intervals over the course of 10 minutes. After the panels had been immersed in artificial seawater (ASW), for 28 days, contact angle measurements were again obtained.

Water Ageing

After all coated panels were analyzed via water contact angle analysis, they were preleached in tanks of ASW, circulating every 4 hours. These panels were left immersed for 28 days, then rinsed, and water contact angles were immediately obtained. Circular disks were then punched from these preleached panels for use in biological assay testing.

Results/Characterization:

The characteristic peaks of polyethylene glycol monomethyl ether appear at proton locations d (3.56 ppm) and e (3.29 ppm) from FIG. 4. Additionally, after reaction with allyl bromide, with reducing agent NaH 60% w/w in mineral oil, ally group peaks appear at proton locations a (5.83 ppm), b (5.15 ppm), and c (3.94 ppm). These peak positions, coupled with the fact that a hydroxyl proton peak is not seen, helps confirm the successful conversion of hydroxyl terminated polyethylene glycol monomethyl ether to the allyl terminated derivative.

In FIG. 5 two important peaks appear ~3080 and 1640 cm$^{-1}$. These are associated with stretching of the unsaturated carbon hydrogen bonds and the stretching between the unsaturated carbons themselves. The other significant peaks appear ~2900 and 1100 cm$^{-1}$ and are associated with the C—H and C—O stretching along the chain. The FT-IR spectrum in addition to $^1$H-NMR both confirm the disappearance of the hydroxyl group, and the occurrence of ally groups terminating the 750 MW polyethylene glycol monomethyl ether.

As seen in FIG. 6, there are no peaks associated with the allyl group of APEG as seen in FIG. 4 at positions a (5.83 ppm) and b (5.15 ppm). Additionally, a characteristic Si—H proton peak that normally appears ~4.7 ppm is almost undetectable. This, along with the appearance of proton peaks a (0.45 ppm), b (1.56 ppm), PEG protons c+e (3.35 ppm), d (3.60 ppm), and methyl groups along a PDMS backbone f (0.04 ppm) help confirm that the hydrosilylation between APEG and PMHS reactants has successfully taken place.

The C—H stretching shown ~2870 cm$^{-1}$ is indicative of methyl groups situated along PEG and siloxane chains. A small, weak peak seen ~2156 cm$^{-1}$ is indicative of some remaining Si—H groups in the SMAA. This was also seen in $^1$H-NMR, but the amount is low enough to be considered negligible in affecting properties of the additive. Two more significant peaks occur very close to each other, ~1106 and 1029 cm$^{-1}$, and are characteristic of C—O—C and Si—O—Si stretching of PEG and siloxane chains respectively. As shown in both FIGS. 6 and 7, the SMAA 991-g-350 was successfully synthesized, but an insignificant amount of unreacted PMHS still remains that is not anticipated to interfere with incorporation into coatings formulations.

After synthesis of SMAA's, they were incorporated into the SiPU formulations to be cast on primed aluminum panels for water contact angle and biological assay measurements to be performed. FIG. 8-19 include all water contact angle measurements for formulations 1-72 including the A4_20 SiPU control. Due to some delamination issues, some coatings were not able to be characterized after 28 days water immersion in circulating tanks of ASW.

Biological Assay Testing

Microalgae Growth and Release (*Navicula incerta*)

Methods used to perform the growth and release studies of the microalgae *N. incerta* are reported in (Casse, Franck et al., 2007), (Callow et al., 2014). Plastic multiwell plates with glued disks of coated aluminum primed panels were used throughout these assays. A 1 mL suspension of the diatom *N. incerta* with a concentration of 4×10$^5$ cells/mL in Guillard's F2 medium was transferred to each well. These plates were incubated at ambient temperature for a period of 2 hours and then the suspension was removed. Water jet treatments were performed, having 3 replicate wells being untreated while the remaining columns were subjected to water pressure of 20 psi (138 KPa) for 10 s.) 0.5 mL of DMSO was then used to extract chlorophyll to quantify the biomass remaining measuring the fluorescence with an excitation wavelength of 360 nm and an emission wavelength of 670 nm. The remaining algal biomass on the coating panel before and after water jet treatment was directly proportional to the relative fluorescence and the percent removal was determined through the relative fluorescence between water jet treated vs. untreated wells.

Bacterial Biofilm Adhesion (*Cellulophaga lytica*)

Evaluation of anti-fouling/fouling release performance of coatings pertaining to the marine bacterium *C. lytica* are covered in detail by (Callow et al., 2014), (Stafslien et al., 2007). A 1 mL suspension of *C. lytica* ($10^7$ cells/mL) in FSW containing 0.5 g/L of peptone and 0.1 g/L of yeast extract was added to individual wells of the plate. These plates were incubated at 37° C. for a period of 24 hours and then rinsed with DI water to remove any unattached bacterium. One column was left untreated, while the remaining columns experienced water jet treatment for 5 s at 20 psi (138 KPa). After water jet treatment, wells were stained with 0.3% crystal violet in DI water, extracted with 33% acetic acid solution, and absorbance measurements were made of 0.15 mL aliquots of the extracted eluates at 600 nm. Absorbance values were directly proportional to the amount of bacterial biofilm mass remaining on the coatings while the relative absorbance values between water jet treated and untreated wells determined biofilm removal from the coatings.

Selected siloxane-polyurethane coatings containing SMAA's described in Table 2 were evaluated for marine biofouling. Table 3 below shows the coatings tested.

TABLE 3

Siloxane-polyurethane coatings containing SMAA's tested for marine biofouling.

| Formulation # | Sample ID | Siloxane Backbone | PEG Molecular Weight g/mol | Wt. % Additive |
|---|---|---|---|---|
| 1 | 991-g-250-1% | HMS-991 | 250 | 1 |
| 2 | 991-g-250-5% | HMS-991 | 250 | 5 |
| 3 | 991-g-250-10% | HMS-991 | 250 | 10 |
| 4 | 992-g-250-1% | HMS-992 | 250 | 1 |
| 5 | 992-g-250-5% | HMS-992 | 250 | 5 |
| 6 | 992-g-250-10% | HMS-992 | 250 | 10 |
| 7 | 993-g-250-1% | HMS-993 | 250 | 1 |
| 8 | 993-g-250-5% | HMS-993 | 250 | 5 |
| 9 | 993-g-250-10% | HMS-993 | 250 | 10 |
| 10 | 301-g-250-1% | HMS-301 | 250 | 1 |
| 11 | 301-g-250-5% | HMS-301 | 250 | 5 |
| 12 | 301-g-250-10% | HMS-301 | 250 | 10 |
| 13 | 501-g-250-1% | HMS-501 | 250 | 1 |
| 14 | 501-g-250-5% | HMS-501 | 250 | 5 |
| 15 | 501-g-250-10% | HMS-501 | 250 | 10 |
| 16 | D'4-g-250-1% | D'4 | 250 | 1 |
| 17 | D'4-g-250-5% | D'4 | 250 | 5 |
| 18 | D'4-g-250-10% | D'4 | 250 | 10 |
| 19 | 991-g-350-1% | HMS-991 | 350 | 1 |
| 20 | 991-g-350-5% | HMS-991 | 350 | 5 |
| 21 | 991-g-350-10% | HMS-991 | 350 | 10 |
| 22 | 992-g-350-1% | HMS-992 | 350 | 1 |
| 23 | 992-g-350-5% | HMS-992 | 350 | 5 |
| 24 | 992-g-350-10% | HMS-992 | 350 | 10 |
| 25 | 993-g-350-1% | HMS-993 | 350 | 1 |
| 26 | 993-g-350-5% | HMS-993 | 350 | 5 |
| 27 | 993-g-350-10% | HMS-993 | 350 | 10 |
| 28 | 301-g-350-1% | HMS-301 | 350 | 1 |
| 29 | 301-g-350-5% | HMS-301 | 350 | 5 |
| 30 | 301-g-350-10% | HMS-301 | 350 | 10 |
| 31 | 501-g-350-1% | HMS-501 | 350 | 1 |
| 32 | 501-g-350-5% | HMS-501 | 350 | 5 |
| 33 | 501-g-350-10% | HMS-501 | 350 | 10 |
| 34 | D'4-g-350-1% | D'4 | 350 | 1 |
| 35 | D'4-g-350-5% | D'4 | 350 | 5 |
| 36 | D'4-g-350-10% | D'4 | 350 | 10 |
| 37 | 991-g-750-1% | HMS-991 | 750 | 1 |
| 38 | 991-g-750-5% | HMS-991 | 750 | 5 |
| 39 | 991-g-750-10% | HMS-991 | 750 | 10 |
| 40 | 992-g-750-1% | HMS-992 | 750 | 1 |
| 41 | 992-g-750-5% | HMS-992 | 750 | 5 |
| 42 | 992-g-750-10% | HMS-992 | 750 | 10 |
| 43 | 993-g-750-1% | HMS-993 | 750 | 1 |
| 44 | 993-g-750-5% | HMS-993 | 750 | 5 |
| 45 | 993-g-750-10% | HMS-993 | 750 | 10 |
| 46 | 301-g-750-1% | HMS-301 | 750 | 1 |
| 47 | 301-g-750-5% | HMS-301 | 750 | 5 |
| 48 | 301-g-750-10% | HMS-301 | 750 | 10 |
| 49 | 501-g-750-1% | HMS-501 | 750 | 1 |
| 50 | 501-g-750-5% | HMS-501 | 750 | 5 |
| 51 | 501-g-750-10% | HMS-501 | 750 | 10 |
| 52 | D'4-g-750-1% | D'4 | 750 | 1 |
| 53 | D'4-g-750-5% | D'4 | 750 | 5 |
| 54 | D'4-g-750-10% | D'4 | 750 | 10 |
| 55 | 992-g-1100-1% | HMS-992 | 1100 | 1 |
| 56 | 993-g-1100-1% | HMS-993 | 1100 | 1 |
| 57 | 993-g-1100-5% | HMS-993 | 1100 | 5 |
| 58 | 993-g-1100-10% | HMS-993 | 1100 | 10 |
| 59 | 301-g-1100-1% | HMS-301 | 1100 | 1 |
| 60 | 301-g-1100-5% | HMS-301 | 1100 | 5 |
| 61 | 501-g-1100-1% | HMS-501 | 1100 | 1 |
| 62 | 501-g-1100-5% | HMS-501 | 1100 | 5 |
| 63 | 501-g-1100-10% | HMS-501 | 1100 | 10 |
| 64 | D'4-g-1100-1% | D'4 | 1100 | 1 |
| 65 | D'4-g-1100-5% | D'4 | 1100 | 5 |

In addition to these experimental coatings, 6 more control coatings, A4_20, T2, PU, IS700, IS970, and IS1100SR, were evaluated.

Evaluation with the Marine Fouling Microalgae, *N. incerta*: Leachate Toxicity Assessment and 2 Hour Cell Attachment and Adhesion Procedure and Results:

1. Microalgae analysis was carried out after 28 days of water immersion.
2. Leachate toxicity was assessed by introducing algae into overnight extracts (artificial sea water with nutrients) of treatment and evaluating growth after 48 hours via fluorescence of chlorophyll. Growth in coating leachates was reported as a fluorescence ratio to a positive growth control (fresh nutrient medium). See FIGS. 20 and 21. A negative growth controls (medium+bacteria+triclosan) was also included in the analysis.
3. Initial cell attachment of algae was assessed before water jet adhesion analysis. Algae were diluted to and OD of 0.03 at 660 nm in artificial sea water (ASW) supplemented with nutrients. 1 ml was added to each well of the plate and allowed to incubate statically for 2 hours to facilitate cell attachment. Algal cell attachment was quantified by fluorescence measurement of DMSO extracts of chlorophyll. Cell attachment was reported as fluorescence intensity (relative fluorescence units). See FIGS. 22 and 23. Error bars represent one standard deviation of the mean.
4. Water jet adhesion was carried out after 2 hrs of initial cell attachment. See FIG. 24-27. The first column of each plate was not treated and served as the measure of cell attachment after 2 hrs. The second and third column of each coating was jetted for 10 seconds at a pressure of 10 psi and 20 psi, respectively. Algal adhesion was reported as a function of biomass remaining on the material surface after treatment with each pressure indicated above. See FIG. 28-31. Error bars represent one standard deviation of the mean.

Evaluation with the Marine Bacterium, *C. lytica*: Leachate Toxicity Assessment and 24 Hour Biofilm Growth and Adhesion Procedure and Results:

1. Bacterial analysis was carried out after 28 days of water immersion preconditioning.
2. Leachate toxicity was assessed by introducing the bacterium into overnight extracts (artificial sea water with nutrients) of each coating and evaluating growth after 24 hours via a crystal violet colorimetric assay. Growth in coating leachates was reported as an absorbance ratio (600 nm) to a growth control. See FIG. 32-35. A series of negative growth controls (medium+bacteria+triclosan) was also included in the analysis.
3. *C. lytica* biofilm retention analysis was assessed by a crystal violet colorimetric assay. A 5% suspension of *C. lytica* in ASW+nutrients (~$10^7$ cells·ml$^{-1}$) was prepared and 1 ml was added to each well of the coating plate. Plates were incubated statically at 28° C. for 24 hours to facilitate bacterial attachment and colonization. Plates were rinsed three times with DI water and stained with crystal violet. Images were taken after staining, and then the crystal violet was extracted in 33% acetic acid (AA) and the resulting eluates were measured for absorbance at 600 nm. See FIG. 36-39. Biofilm retention was reported as the mean absorbance value of three replicate samples. Error bars represent one standard deviation of the mean.
4. Water jet adhesion was carried out after 24 hrs of bacterial biofilm growth. See FIG. 40-43. The first column of each plate was not treated and served as the measure of biofilm growth before water jetting. The second and third column of each coating was jetted for 5 seconds at a pressure of 10 psi and 20 psi, respectively. Biofilm adhesion was reported as a function of biomass remaining on the material surface after treatment with each pressure indicated above. See FIG. 44-47. Error bars represent one standard deviation of the mean.

Selection of Experimental Formulations for Macrofouling Biological Assays

After performing microfouling assays such as biofilm growth and adhesion of *C. lytica* and settlement and removal of diatom *N. incerta*, the better performing experimental formulations were chosen for macrofouling assays. These assays involve sporeling growth and release of the green macroalgae Ulva linza in 24-well plastic plates, attachment and adhesion of marine barnacle *Amphibalanus amphitrite*, and attachment and adhesion of marine mussel Geukensia demissa, both on a single primed and coated 4×8" aluminum panel after 28 days water ageing. The main criterion for selecting experimental formulations for these assays was superior attachment or growth as well as removal from both microfoulants. These experimental formulations are shown below in Table 4. The formulation numbers in Table 4 correspond to the formulations in Table 2.

TABLE 4

Experimental formulations selected for further macrofouling assays

| Formulation # | ID | Mol % Si—H | MW PEG |
|---|---|---|---|
| 3 | JB__991__250__10% | 100 | 250 |
| 15 | JB__501__250__10% | 45-55 | 250 |
| 33 | JB__501__350__10% | 45-55 | 350 |
| 36 | JB__D'4__350__10% | f = 4 | 350 |
| 44 | JB__993__750__5% | 100 | 750 |

TABLE 4-continued

Experimental formulations selected for further macrofouling assays

| Formulation # | ID | Mol % Si—H | MW PEG |
|---|---|---|---|
| 47 | JB__301__750__5% | 25-35 | 750 |
| 50 | JB__501__750__5% | 45-55 | 750 |
| 54 | JB__D'4__750__10% | f = 4 | 750 |

Macroalgae Sporeling Growth and Release (*U. linza*)

A brief summary of the experimental methods for this assay is as follows, with a more detailed procedure outlined in (Casse, F. et al., 2007). Before sporeling growth and attachment testing, a leachate toxicity procedure was performed. To the wells, 1 mL of 0.22 am filtered artificial seawater (FSW) was added to each well plate and gently shaken (60 rpm) for 18 h. Six replicates of 1 mL leachate were taken from each well and deposited in new 24-well plates. To these new well plates, 1 mL suspension of *U. linza* spores was added and adjusted to 0.05 OD at absorbance 660 nm ($3.3 \times 10^5$ spores ml$^{-1}$) in double strength enriched seawater medium. These plates were incubated for 2 h in darkness at room temperature, and then transferred to an illuminated incubator at 18° C. with a 16:8 light:dark cycle with photon flux density of 45 mol·m$^{-2}$·s$^{-1}$. Seven days were allowed for growth, then, the seawater medium was removed from the wells and the chlorophyll extracted from any attached biomass with 1 mL DMSO. The chlorophyll fluorescence was determined in a Tecan plate reader using excitation 360 nm and emission 670 nm wavelengths.

After leachate toxicity analysis, sporeling growth was assessed. The experimental 24-well plates were equilibrated in 0.22 am FSW for 2 h in Newcastle, UK before the start of the experiment. After 2 h, 1 mL of *U. linza* spore suspension was added to the 24-well plates and adjusted to 0.05 OD at absorbance 660 nm ($3.3 \times 10^5$ spores mL$^{-1}$) in single strength enriched seawater medium. The spores were allowed to settle on the plates and grown for seven days inside an illuminated incubator at 18° C. with a 16:8 light:dark cycle at photon flux density of 45 µmol·m$^{-2}$·s$^{-1}$ with nutrients being renewed every 72 hours. After seven days, generated biomass was assessed from a single row of wells from each plate. The chlorophyll was again extracted and analyzed via the same methods in the leachate toxicity assessment.

Once sporeling growth had been analyzed, sporeling release experiments were performed. In the three remaining rows of cells in the 24-well plates, three different pressures from a spinjet apparatus were applied: 18, 67, and 110 kPa. See FIG. 53. From any remaining biomass, chlorophyll was extracted as mentioned above and compared with the unsprayed wells subjected to sporeling growth assessment. Each of these experiments (leachate toxicity, sporeling growth, and sporeling removal) were performed on duplicate well plates for each formulation. The samples evaluated for *U. linza* analysis are shown in Table 5. The formulation numbers in Table 5 correspond to the formulations in Table 2. The results for each set of coatings are shown in FIG. 48-52.

TABLE 5

Selected experimental coatings from microfouling assays to undergo further *U. linza* macroalgae biological assays.

| Plate No. Set A | Plate No. Set B | Formulation No. | Identification No. | Backbone | MW PEG | Mol % Si H |
|---|---|---|---|---|---|---|
| 1 | 2 | 3 | JB_991_250_10% | Polysiloxane | 250 | 100 |
| 3 | 4 | 15 | JB_501_250_10% | Polysiloxane | 250 | 45-55 |
| 5 | 6 | 33 | JB_501_350_10% | Polysiloxane | 350 | 45-55 |
| 7 | 8 | 36 | JB_D'4_350_10% | Cyclosiloxane | 350 | f = 4 |
| 9 | 10 | 44 | JB_993_750_5% | Polysiloxane | 750 | 100 |
| 11 | 12 | 47 | JB_301_750_5% | Polysiloxane | 750 | 25-35 |
| 13 | 14 | 50 | JB_501_750_5% | Polysiloxane | 750 | 45-55 |
| 15 | 16 | 54 | JB_D'4_750_10% | Cyclosiloxane | 750 | f = 4 |
| 17 | 18 | Control | JB_A4_20 | Polysiloxane | — | — |

Barnacle 2-Week Attachment and Adhesion (*Amphibalanus amphitrite*)

In order to assess marine barnacle (*A. amphitrite*) attachment and adhesion, a procedure outlined by (Stafslien et al., 2012) was performed. After 28 days preleaching in circulating water tanks, adult barnacles (~5 mm in diameter) attached to silicone substrates (n=6) were removed and immobilized onto the surface of the experimental coatings. Barnacles could reattach and grow for two weeks while immersed in ASW tank systems with daily feeding of brine shrimp. After two weeks, barnacles were pushed off with shear force using a handheld force gauge mounted on a semiautomated device. The peak force of removal for each barnacle was recorded, along with using Sigma Scan Pro 5.0 image analysis software used to quantify the base plate area of each dislodged barnacle. The adhesion strength (MPa) of each barnacle was calculated by taking the ratio of the force for removal to basal plate area and the average adhesion strength for each coating was reported as the total number of barnacles removed with a measurable force. Adult barnacles were provided by Duke University Marine Library, Beaufort, N.C., USA. The results from the adhesion assay are shown in FIG. 54.

Mussel Attachment and Adhesion (*G. demissa*)

To perform marine mussel (*G. demissa*) attachment and adhesion measurements, mussels were obtained from Duke University Marine Laboratory in Beaufort, N.C., USA. These mussels then had a 4-cm-long acetal plastic rod attached via 3M® acrylic adhesive perpendicular to the ventral edge. The modified mussels were then immobilized onto each experimental coating surface followed by placing custom PVC sheets against the plastic rods to keep the mussels in contact with the surface. These coatings were then placed in ASW circulating tanks and fed DT's Premium Reef Blend Phytoplankton daily. After three days, the coatings were removed and the total number of mussels with byssus threads attached to each experimental coating was recorded. Next, the plastic rod from each mussel was attached to an individual load cell of 5 N that was part of a custom-built force gauge where the mussels were then pulled off at a rate of 1 mm/s. The force required for detachment of the byssus thread was averaged and the pull-off value for each coating was recorded. Any non-attached mussels were recorded as well. The results for the mussel adhesion assay are shown in FIG. 55.

REFERENCES

ANDRADE, J. D. et al. Surface characterization of poly (hydroxyethyl methacrylate) and related polymers. I. Contact angle methods in water. 1: Wiley Online Library, 1979. p. 313-336.

BODKHE, R. B. et al. The Effect of Formulation Variables on Fouling-Release Performance of Stratified Siloxane-Polyurethane Coatings. Journal of Coatings Technology Research, v. 9, n. 3, p. 235, 2012.

CALLOW, J. A.; CALLOW, M. E. Trends in the development of environmentally friendly fouling-resistant marine coatings. Nature Communications, v. 2, p. 244, 03/22/online 2011. Available at: <http://dx.doi.org/10.1038/ncomms1251>.

CALLOW, M. E.; CALLOW, J. A. Marine Biofouling: A Sticky Problem. Biologist, v. 49, n. 1, p. 10, 2002.

CALLOW, M. E. et al. Biofouling Methods. 2014. 291.

CASSE, F. et al. Laboratory Screening of Coating Libraries for Algal Adhesion. Biofouling, v. 23, n. 4, p. 267, 2007.

CASSE, F. et al. Combinatorial materials research applied to the development of new surface coatings V. Application of a spinning water-jet for the semi-high throughput assessment of the attachment strength of marine fouling algae. Biofouling, v. 23, n. 2, p. 121-130, 2007. ISSN 0892-7014.

EKIN, A.; WEBSTER, D. C. Combinatorial and High-Throughput Screening of the Effect of Siloxane Composition on the Surface Properties of Crosslinked Siloxane-Polyurethane Coatings. J. Comb. Chem., v. 9, n. 1, p. 178, 2007.

HELLIO, C.; YEBRA, D. M. Advances in Marine Antifouling Coatings and Technologies. 2009.

KRISHNAN, S. et al. Comparison of the Fouling Release Properties of Hydrophobic Fluorinated and Hydrophilic Pegylated Block Copolymer Surfaces: Attachment Strength of the Diatom *Navicula* and the Green Alga Ulva. Biomacromolecules, v. 7, n. 5, p. 1449, 2006.

LEJARS, M. N.; MARGAILLAN, A.; BRESSY, C. Fouling release coatings: a nontoxic alternative to biocidal antifouling coatings. Chemical reviews, v. 112, n. 8, p. 4347-4390, 2012. ISSN 0009-2665.

MAJUMDAR, P.; EKIN, A.; WEBSTER, D. C. Thermoset Siloxane-Urethane Fouling Release Coatings. In: (Ed.): ACS Publications, 2007. ISBN 1947-5918.

MARTINELLI, E. et al. Amphiphilic modified-styrene copolymer films: Antifouling/fouling release properties against the green alga Ulva linza. Progress in Organic Coatings, v. 90, p. 235-242, 2016/01/01/2016. ISSN 0300-9440. Available at: <http://www.sciencedirect.com/science/article/pi/S030094401530182X>.

RUFIN, M. A. et al. Antifouling silicones based on surface-modifying additive amphiphiles. Green Materials, v. 5, n. 1, p. 4-13, 2017. ISSN 2049-1220.

SCHULTZ, M. P. et al. Economic Impact of Biofouling on a Naval Surface Ship. Biofouling, v. 27, n. 1, p. 87, 2011.

SOMMER, S. et al. A Preliminary Study on the Properties and Fouling-Release Performance of Siloxane-Polyurethane Coatings Prepared from Pdms Macromers. Biofouling, v. 26, n. 8, p. 961, 2010.

STAFSLIEN, S. J. et al. An Improved Laboratory Reattachment Method for the Rapid Assessment of Adult Barnacle Adhesion Strength to Fouling-Release Marine Coatings. Journal of Coatings Technology and Research, v. 9, n. 6, p. 651, 2012.

STAFSLIEN, S. J. et al. Combinatorial materials research applied to the development of new surface coatings VI: An automated spinning water jet apparatus for the high-throughput characterization of fouling-release marine coatings. Review of Scientific Instruments, v. 78, n. 7, p. 072204, 2007. ISSN 0034-6748.

WEBSTER, D. C.; EKIN, A. Functionalized polysiloxane polymers: Google Patents 2010.

WEBSTER, D. C.; PIEPER, R. J.; EKIN, A. Thermoset siloxane-urethane fouling release coatings: Google Patents 2011.

YEBRA, D. M.; KIIL, S. K.; DAM-JOHANSEN, K. Antifouling Technology-Past, Present and Future Steps Towards Efficient and Environmentally Friendly Antifouling Coatings. Prog. Org. Coat., v. 50, n. 2, p. 75, 2004.

The claimed invention is:

1. A method for reducing or preventing biofouling of a surface exposed to an aqueous environment comprising the steps of:
   coating the surface with a curable coating composition to form a coated surface, and
   curing the coating composition on the coated surface,
   wherein the curable coating composition comprises:
   a) at least one surface modifying amphiphilic additive consisting of the reaction product of
      a1) at least one Si—H functional siloxane; and
      a2) at least one allyl-functional poly(ethylene glycol) monomethyl ether; and
   b) at least one siloxane-polyurethane coating composition comprising the reaction product of
      b1) at least one aminopropyl terminated polydimethyl siloxane;
      b2) at least one polyol; and
      b3) at least one polyisocyanate crosslinker; and
   c) optionally, at least one additive;
   wherein the curable coating composition comprises 0.1-10 wt. % of the at least one surface modifying amphiphilic additive, based on the total weight of the curable coating composition,
   wherein the Si—H functional siloxane is a tetra functional Si—H cyclosiloxane.

2. The method of claim 1, wherein the tetra functional Si—H cyclosiloxane is selected from Si—H functional 1,3,5,7-tetramethylcyclotetrasiloxane (D'4).

3. The method of claim 1, wherein the allyl functional poly(ethylene glycol) monomethyl ether is selected from at least one allyl-terminated poly(ethylene glycol) monomethyl ether.

4. The method of claim 1, wherein the Si—H functional siloxane and the allyl functional poly(ethylene glycol) monomethyl ether are present in a molar ratio of 1.0: 1.0.

5. The method of claim 1, wherein the polyol is an acrylic polyol, a polyester polyol, a polycarbonate polyol, a polyether polyol, or mixtures thereof.

6. The method of claim 1, wherein the polyol is a polyether polyol.

7. The method of claim 1, wherein the polyisocyanate crosslinker is selected from the group consisting of isophorone diisocyanate, hexamethylene diisocyanate, methylene diphenyl diisocyanate, and derivatives thereof.

8. The method of claim 1, wherein the polyisocyanate crosslinker is isophorone diisocyanate or a derivative thereof and the polyol is an acrylic polyol.

9. The method of claim 1, wherein the polyisocyanate crosslinker is methylene diphenyl diisocyanate or a derivative thereof and the polyol is a polyether polyol.

10. The method of claim 1, wherein the curable coating composition comprises 5-10 wt. % of the at least one surface modifying amphiphilic additive, based on the total weight of the curable coating composition.

11. The method of claim 1, wherein the surface modifying amphiphilic additive consists of poly(ethylene glycol) chains attached to the backbone of the Si—H functional siloxane.

12. The method of claim 1, wherein the curable coating composition comprises 1-10 wt. % of the at least one surface modifying amphiphilic additive, based on the total weight of the curable coating composition.

13. The method of claim 3, wherein the at least one allyl-terminated poly(ethylene glycol) monomethyl ether has a molecular weight ranging from about 200 g/mol to about 1,500 g/mol.

14. The method of claim 1, wherein the surface is present on the hull of a marine vessel.

15. The method of claim 1, wherein the surface is present on a structure submerged in seawater.

16. The method of claim 1, wherein the additive is selected from the group consisting of pigments, curing catalysts, pot-life extenders, solvents, and mixtures thereof.

17. The method of claim 1, wherein the curable coating composition comprises 0.1-5 wt. % of the at least one surface modifying amphiphilic additive, based on the total weight of the curable coating composition.

18. The method of claim 1, wherein:
   the tetra functional Si—H cyclosiloxane is selected from Si—H functional 1,3,5,7-tetramethylcyclotetrasiloxane (D'4);
   the allyl functional poly(ethylene glycol) monomethyl ether is selected from at least one allyl-terminated poly(ethylene glycol) monomethyl ether;
   the Si—H functional siloxane and the allyl functional poly(ethylene glycol) monomethyl ether are present in a molar ratio of 1.0: 1.0;
   the polyol is an acrylic polyol, a polyester polyol, a polycarbonate polyol, a polyether polyol, or mixtures thereof; and
   the polyisocyanate crosslinker is selected from the group consisting of isophorone diisocyanate, hexamethylene diisocyanate, methylene diphenyl diisocyanate, and derivatives thereof.

19. The method of claim 18, wherein the at least one allyl-terminated poly(ethylene glycol) monomethyl ether has a molecular weight ranging from about 200 g/mol to about 1,500 g/mol.

20. The method of claim 18, wherein the polyisocyanate crosslinker is isophorone diisocyanate or a derivative thereof and the polyol is an acrylic polyol.

21. The method of claim 18, wherein the polyisocyanate crosslinker is methylene diphenyl diisocyanate or a derivative thereof and the polyol is a polyether polyol.

22. A curable coating composition comprising:
a) at least one surface modifying amphiphilic additive consisting of the reaction product of
   a1) at least one Si—H functional siloxane; and
   a2) at least one allyl-functional poly(ethylene glycol) monomethyl ether; and
b) at least one siloxane-polyurethane coating composition comprising the reaction product of
   b1) at least one aminopropyl terminated polydimethyl siloxane;
   b2) at least one polyol; and
   b3) at least one polyisocyanate crosslinker; and
c) optionally, at least one additive;

wherein the curable coating composition comprises 0.1-10 wt. % of the at least one surface modifying amphiphilic additive, based on the total weight of the curable coating composition, wherein the Si—H functional siloxane is a tetra functional Si—H cyclosiloxane.

* * * * *